(12) United States Patent
Nivala

(10) Patent No.: US 12,303,066 B2
(45) Date of Patent: May 20, 2025

(54) TEMPERATURE SENSING DEVICES AND WIRELESS COMMUNICATION IMPROVEMENTS FOR COOKING APPLIANCES

(71) Applicant: Apption Labs Limited, Leicester (GB)

(72) Inventor: Teemu Nivala, Salt Lake City, UT (US)

(73) Assignee: Apption Labs Limited, Leicester (GB)

( * ) Notice: Subject to any disclaimer, the term of this patent is extended or adjusted under 35 U.S.C. 154(b) by 0 days.

(21) Appl. No.: 18/347,369

(22) Filed: Jul. 5, 2023

(65) Prior Publication Data

US 2023/0346159 A1    Nov. 2, 2023

Related U.S. Application Data

(60) Division of application No. 16/729,030, filed on Dec. 27, 2019, now Pat. No. 11,723,489, which is a
(Continued)

(51) Int. Cl.
*H05B 6/64* (2006.01)
*A47J 36/32* (2006.01)
(Continued)

(52) U.S. Cl.
CPC .......... *A47J 36/321* (2018.08); *G08B 21/182* (2013.01); *H01Q 1/24* (2013.01); *H04B 7/15* (2013.01)

(58) Field of Classification Search
CPC A47J 36/321; A47J 37/0786; G01K 2207/06; G08B 21/182; G08B 21/24;
(Continued)

(56) References Cited

U.S. PATENT DOCUMENTS 3,815,113 A    6/1974  Welch
4,230,731 A   10/1980  Tyler
(Continued)

FOREIGN PATENT DOCUMENTS

CN    103792859 A    5/2014
CN    105768844 A    7/2016
(Continued)

OTHER PUBLICATIONS

Canadian Office Action for Application No. 3, 148,697 dated Apr. 4, 2023, 3 pages.
(Continued)

*Primary Examiner* — Quang T Van
(74) *Attorney, Agent, or Firm* — TraskBritt

(57) ABSTRACT

A temperature sensing device includes a temperature sensor to measure a temperature of a cooking chamber of a cooking appliance. A housing of the temperature sensing device is configured to be mounted on the cooking appliance. A Printed Circuit Board Assembly (PCBA) inside the housing is coupled to the temperature sensor, and an insulating layer is located outside an interior wall of the housing. In one aspect, an antenna is coupled to the PCBA to wirelessly transmit data from the temperature sensing device indicating the measured temperature. In another aspect, the temperature sensing device includes a temperature gauge with a needle to indicate the measured temperature, and a motor inside the housing to actuate the needle. According to another aspect, the temperature sensing device is a wireless signal repeater including an exterior antenna and an interior antenna to transmit signals through a wall of the cooking appliance.

28 Claims, 32 Drawing Sheets

Related U.S. Application Data continuation-in-part of application No. 15/996,339, filed on Jun. 1, 2018, now Pat. No. 11,056,763.

(60) Provisional application No. 62/894,661, filed on Aug. 30, 2019, provisional application No. 62/513,921, filed on Jun. 1, 2017.

(51) Int. Cl.
  *G08B 21/18* (2006.01)
  *H01Q 1/24* (2006.01)
  *H04B 7/15* (2006.01)
  *H05B 6/66* (2006.01)

(58) Field of Classification Search
  CPC . G08B 25/10; G08B 3/10; H01Q 1/22; H01Q 1/24; H01Q 13/10; H01Q 25/005; H01Q 9/42; H04B 7/15; H04B 7/15507
  USPC ....... 219/710, 748, 711, 712, 713, 750, 751, 219/778, 779
  See application file for complete search history.

(56) References Cited

U.S. PATENT DOCUMENTS

| | | | |
|---|---|---|---|
| 4,297,557 A | 10/1981 | Tyler et al. | |
| 4,301,509 A | 11/1981 | Haase et al. | |
| 4,475,024 A | 10/1984 | Tateda | |
| 5,194,857 A | 3/1993 | Gomez | |
| 5,272,302 A | 12/1993 | Dudley et al. | |
| 6,080,972 A | 6/2000 | May | |
| 6,486,453 B1 | 11/2002 | Bales et al. | |
| 6,550,963 B2 | 4/2003 | Daily et al. | |
| 6,568,848 B1 | 5/2003 | Chapman et al. | |
| 6,587,739 B1 | 7/2003 | Abrams et al. | |
| 6,712,505 B2 | 3/2004 | Chapman et al. | |
| 6,750,433 B2 | 6/2004 | Guenther et al. | |
| 6,753,027 B1 | 6/2004 | Greiner et al. | |
| 6,759,635 B2 | 7/2004 | Lile | |
| 6,809,301 B1 | 10/2004 | McIntyre et al. | |
| 6,949,729 B1 | 9/2005 | Ishikawa et al. | |
| 7,075,442 B2 | 7/2006 | Lion et al. | |
| 7,092,988 B1 | 8/2006 | Bogatin et al. | |
| 7,102,107 B1 | 9/2006 | Chapman | |
| 7,109,445 B2 * | 9/2006 | Patterson | A47J 36/321 219/494 |
| 7,128,466 B2 | 10/2006 | Chang et al. | |
| 7,129,834 B2 | 10/2006 | Naruse et al. | |
| 7,201,099 B2 | 4/2007 | Harris et al. | |
| 7,202,454 B2 | 4/2007 | Wiedemann et al. | |
| 7,372,368 B2 | 5/2008 | Chapman et al. | |
| 7,381,933 B2 | 6/2008 | Cristiani | |
| 7,703,389 B2 | 4/2010 | McLemore et al. | |
| 7,964,824 B2 | 6/2011 | Moon | |
| 8,145,854 B1 | 3/2012 | Lee | |
| 8,188,409 B2 | 5/2012 | Baier | |
| 8,222,578 B2 | 7/2012 | Beier | |
| 8,556,502 B2 | 10/2013 | Austen et al. | |
| 8,557,317 B2 | 10/2013 | Sonnendorfer | |
| 8,715,204 B2 | 5/2014 | Webster et al. | |
| 8,730,038 B2 | 5/2014 | Durian | |
| 8,931,400 B1 | 1/2015 | Allen | |
| 9,411,989 B2 | 8/2016 | Wild | |
| 9,799,199 B2 | 10/2017 | Allen | |
| 10,067,004 B1 | 9/2018 | Allen | |
| 10,388,141 B2 | 8/2019 | Allen, Sr. | |
| 10,667,638 B2 | 6/2020 | Sun et al. | |
| 2003/0127451 A1 | 7/2003 | Lile | |
| 2004/0001334 A1 | 1/2004 | Choi et al. | |
| 2007/0215599 A1 | 9/2007 | Kahler | |
| 2008/0259995 A1 | 10/2008 | Kuhn | |
| 2009/0188396 A1 | 7/2009 | Hofmann et al. | |
| 2010/0012645 A1 | 1/2010 | Baier | |
| 2012/0203082 A1 | 8/2012 | Livneh et al. | |
| 2012/0225170 A1 | 9/2012 | Sonnendorfer | |
| 2013/0206015 A1 | 8/2013 | Jacoby et al. | |
| 2013/0269539 A1 | 10/2013 | Polt | |
| 2013/0277353 A1 | 10/2013 | Joseph et al. | |
| 2014/0049376 A1 | 2/2014 | Ng | |
| 2014/0137751 A1 | 5/2014 | Bellm | |
| 2014/0348987 A1 | 11/2014 | Cheng et al. | |
| 2015/0064314 A1 | 3/2015 | Manuel et al. | |
| 2016/0051078 A1 | 2/2016 | Jenkins et al. | |
| 2016/0069853 A1 | 3/2016 | Mitchell | |
| 2016/0238459 A1 | 8/2016 | Koetz et al. | |
| 2016/0327279 A1 | 11/2016 | Bhogal et al. | |
| 2016/0374510 A1 * | 12/2016 | Albizuri Landazabal | F23N 1/007 99/330 |
| 2016/0377490 A1 | 12/2016 | Nivala et al. | |
| 2017/0138798 A1 | 5/2017 | Brown et al. | |
| 2017/0150841 A1 | 6/2017 | Johncock et al. | |
| 2017/0248474 A1 | 8/2017 | Nielsen et al. | |

FOREIGN PATENT DOCUMENTS

| | | | |
|---|---|---|---|
| CN | 205433271 U | 8/2016 | |
| CN | 206261474 U | 6/2017 | |
| DE | 4421373 A1 | 12/1995 | |
| DE | 102008054905 A1 * | 8/2009 | ............ B60K 35/00 |
| DE | 102009019613 A1 | 11/2010 | |
| DE | 202010016860 U1 | 3/2011 | |
| DE | 102009047418 A1 | 6/2011 | |
| DE | 102010063474 A1 | 6/2012 | |
| DK | 178659 B1 | 10/2016 | |
| EP | 1081476 A1 | 3/2001 | |
| EP | 1577653 A1 | 9/2005 | |
| EP | 1624724 A1 | 2/2006 | |
| EP | 1646851 A1 | 4/2006 | |
| EP | 2116829 A1 | 11/2009 | |
| GB | 2203320 A | 10/1988 | |
| GB | 2206222 A | 12/1988 | |
| JP | 58-135428 A | 8/1983 | |
| JP | 2003-110333 A | 4/2003 | |
| TW | M502428 U | 6/2015 | |
| WO | 01/70087 A2 | 9/2001 | |
| WO | 2010/023237 A1 | 3/2010 | |
| WO | 2011/067176 A1 | 6/2011 | |
| WO | 2015/170229 A1 | 11/2015 | |
| WO | 2016/210356 A1 | 12/2016 | |
| WO | 2018/037174 A1 | 3/2018 | |
| WO | 2018/220440 A2 | 12/2018 | |
| WO | 2019/012324 A1 | 1/2019 | |
| WO | 2019/052613 A1 | 3/2019 | |

OTHER PUBLICATIONS

Chinese First Office Action for Application No. 202080059853.6 dated Sep. 26, 2023, 3 pages.

International Search Report for International Application No. PCT/IB2020/058074, mailed Feb. 8, 2021, 6 pages.

International Written Opinion for International Application No. PCT/IB2020/058074, mailed Feb. 8, 2021, 15 pages.

Taiwanese Office Action for Application No. 11320136080 dated Feb. 5, 2024, 8 pages with machine translation.

Bluetooth BBQ Thermometer—Cappec—Consumer Electronics, accessed Jun. 8, 2015 at http://cappec.com/product/bluetooth-bbq-thermometer/3 pages.

Brookstone Grill Alert Talking Remote Meat Thermometer, accessed Jun. 8, 2015 at http://brookstone.com/grill-alert-talking-remote-meat-thermometer- s 2 pages.

Grill Thermometer, accessed Jun. 8, 2015 at http://idevicesinc.com/igrill 5 pages.

International Search Report and Written Opinion dated Apr. 21, 2021 from International Application No. PCT/IB2020/062410, 13 pages.

Pending U.S. Appl. No. 15/996,339, filed Jun. 1, 2018, entitled "Wireless Communication Improvements for Cooking Appliances", Teemu Nivala et al.

(56) References Cited

OTHER PUBLICATIONS

Tappecue Temperature Monitoring System, accessed Jun. 8, 2015 at http://www.tappecue.com 1 page.

* cited by examiner

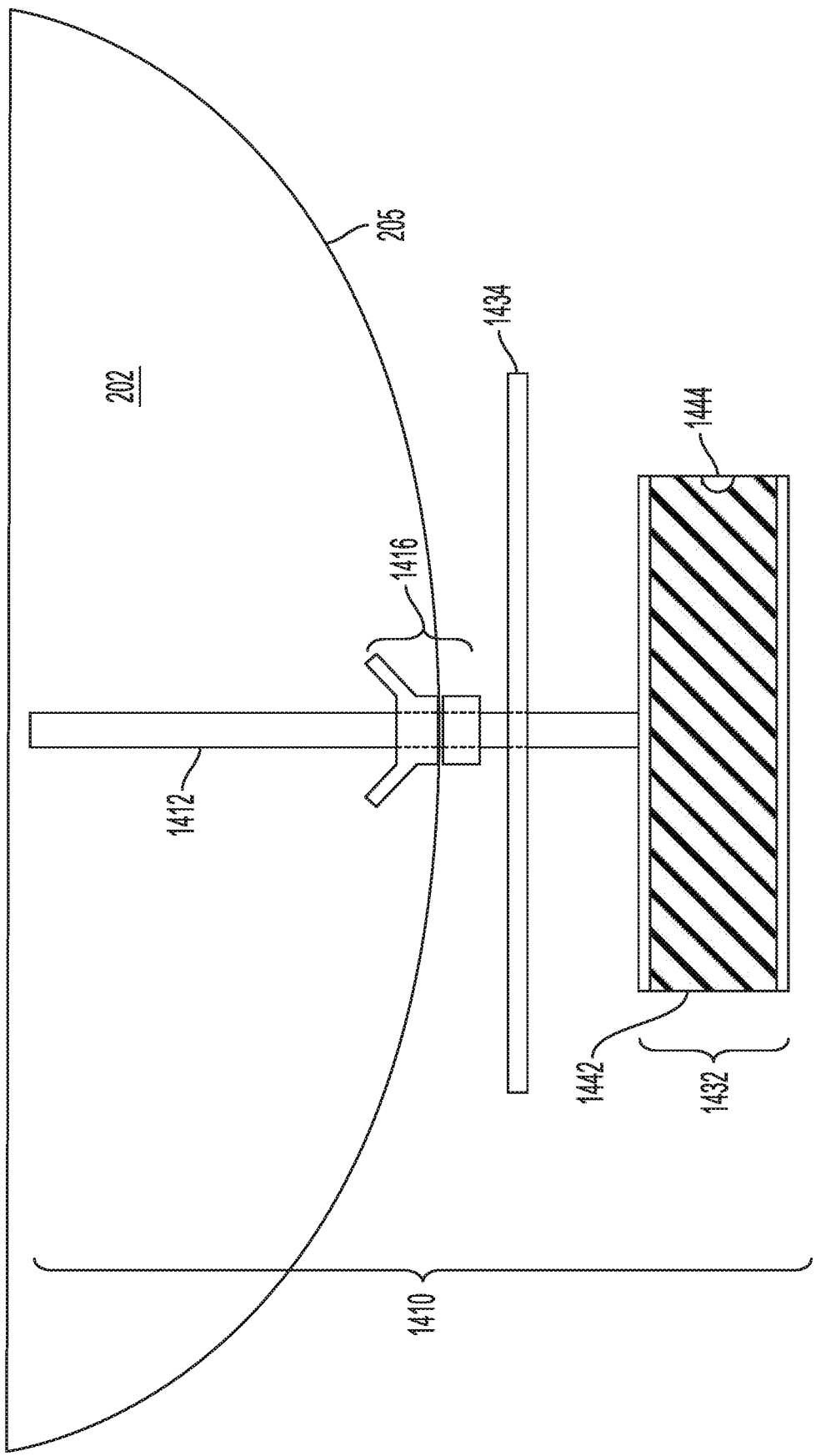

TEMPERATURE SENSING DEVICES AND WIRELESS COMMUNICATION IMPROVEMENTS FOR COOKING APPLIANCES

CROSS-REFERENCE TO RELATED APPLICATIONS

This application is a divisional of U.S. patent application Ser. No. 16/729,030, filed Dec. 27, 2019, now U.S. Pat. No. 11,723,489, issued Aug. 15, 2023, which is a continuation-in-part of U.S. application Ser. No. 15/996,339, filed on Jun. 1, 2018, now U.S. Pat. No. 11,056,763, issued Jul. 6, 2021, and entitled "WIRELESS COMMUNICATION IMPROVEMENTS FOR COOKING APPLIANCES," which claims the benefit of Provisional Application No. 62/513,921, filed on Jun. 1, 2017, and entitled "WIRELESS SIGNAL REPEATER FOR COOKING APPLIANCES," and also claims the benefit Provisional Application No. 62/894,661, filed on Aug. 30, 2019, and entitled "SMART GAUGE TEMPERATURE SENSING DEVICE FOR COOKING APPLIANCES," which is hereby incorporated by reference in its entirety.

BACKGROUND

Wireless food thermometers have recently been developed to provide information to a remote device, such as a smartphone, remote station, or tablet. Examples of such wireless food thermometers are provided in U.S. Pat. No. 10,024,736, entitled "FOOD THERMOMETER AND METHOD OF USING THEREOF." and filed on Jun. 24, 2016, the contents of which are hereby incorporated by reference in their entirety. The information provided to the remote device or devices may include, for example, a cooking temperature of food being cooked, an estimated time until the food has been cooked to a preferred doneness, or cooking instructions such as when to adjust a cooking temperature.

Unfortunately, most cooking appliances, such as barbeques, smokers, ovens, and grills can act as a Faraday cage or at least attenuate the wireless signal transmitted by a wireless food thermometer or another wireless device inside the cooking appliance. In addition, there is a need for more accurate measurement of the ambient temperature inside a cooking chamber of the cooking appliance.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of the claims.

FIG. 14B is a side view of the temperature sensing device of FIG. 14A according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
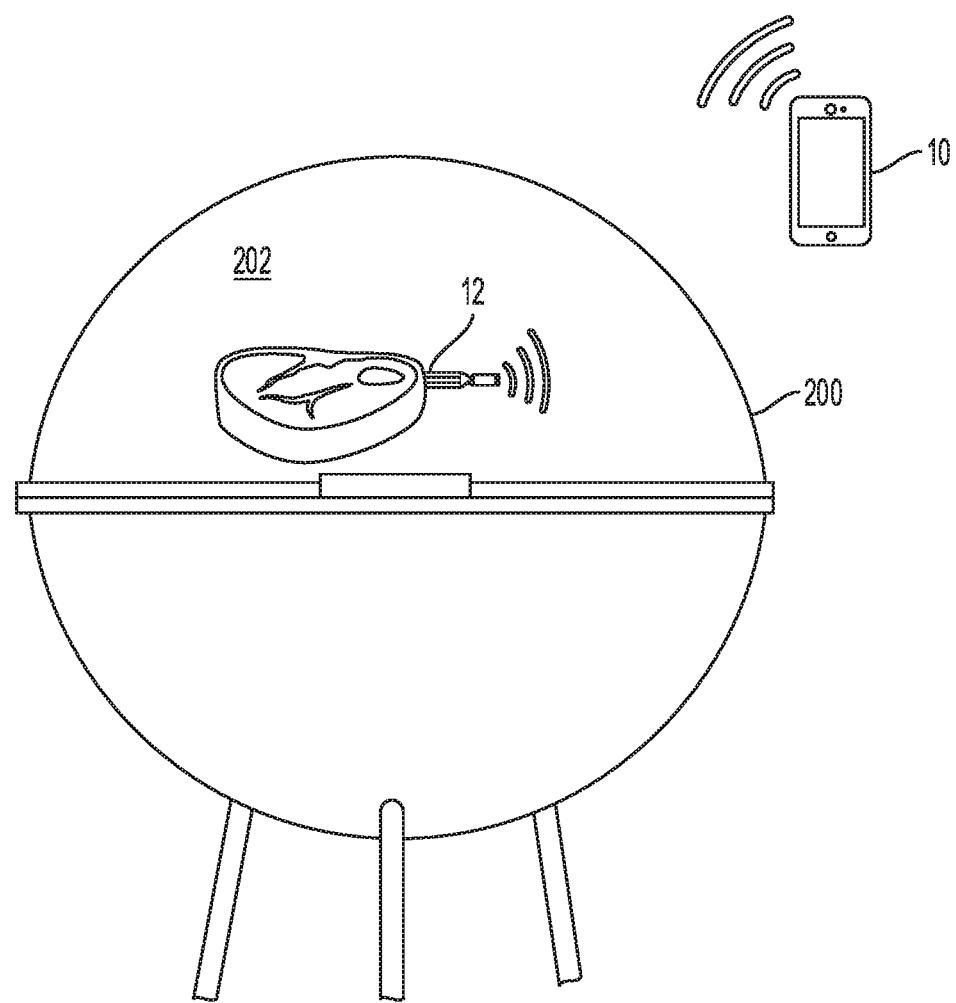
FIG. 1 illustrates an example of a wireless device inside a cooking appliance and a remote device outside of the cooking appliance for receiving a wireless signal from the wireless device.

FIG. 1 illustrates an example of wireless device 12 inside cooking appliance 200 and remote device 10 outside of cooking appliance 200 for receiving a wireless signal from wireless device 12 inside cooking chamber 202 of cooking appliance 200. In some implementations, wireless device 12 can include a wireless food thermometer, such as a wireless meat thermometer. As shown in FIG. 1, wireless device 12 transmits a wireless signal for reception by remote wireless device 10 outside of cooking appliance 200. In some implementations, the wireless signal can include a Radio Frequency (RF) signal such as, for example, a BLUETOOTH® signal, or other wireless communication signal. Remote device 10 can include, for example, a smartphone, a laptop, a tablet, a smart watch, a desktop computer, or user interface for wireless device 12. In some implementations, remote device 10 can include a gateway device, such as a BLUETOOTH® to Wi-Fi bridge, which may or may not include a user interface.

Figure 2:
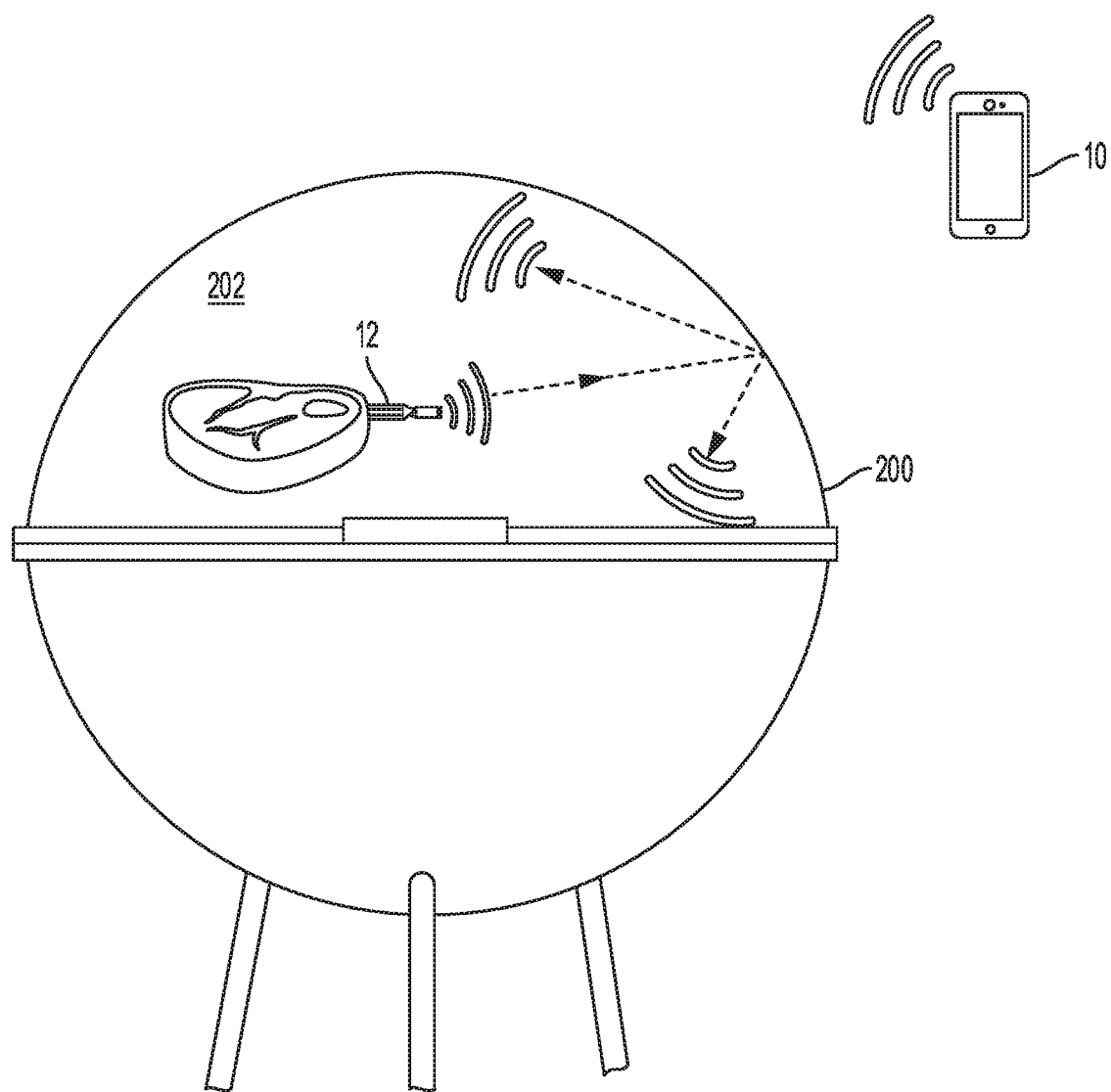
FIG. 2 illustrates the reflection of wireless signals inside of a cooking appliance.

However, as shown in FIG. 2, some or all of the wireless signal may be reflected back into cooking chamber 202 of cooking appliance 200 instead of passing through cooking appliance 200 to be received by remote device 10. In this regard, a signal radiates from wireless device 12 inside the cooking appliance (e.g., a wireless meat thermometer in the example of FIG. 2) and spreads in a three-dimensional space from an antenna of wireless device 12. Objects such as a metal cover or lid of cooking appliance 200 can disturb or interfere with radiation of the signal, thereby attenuating the wireless signal. The wireless signal generally cannot pass through a metal wall of cooking appliance 200 or is at least partially blocked by the walls of cooking appliance 200.

Some slots, air vents, or other openings in cooking appliance 200 can allow for some of the signal to travel outside of cooking appliance 200, but these openings are typically relatively small compared to the overall internal surface area of cooking chamber 202. This can result in a much weaker or lower power wireless signal outside of cooking appliance 200 and may greatly reduce the communication range or the distance at which remote device 10 may need to be located in order to effectively receive the wireless signal from wireless device 12 inside cooking appliance 200.

Figure 3:
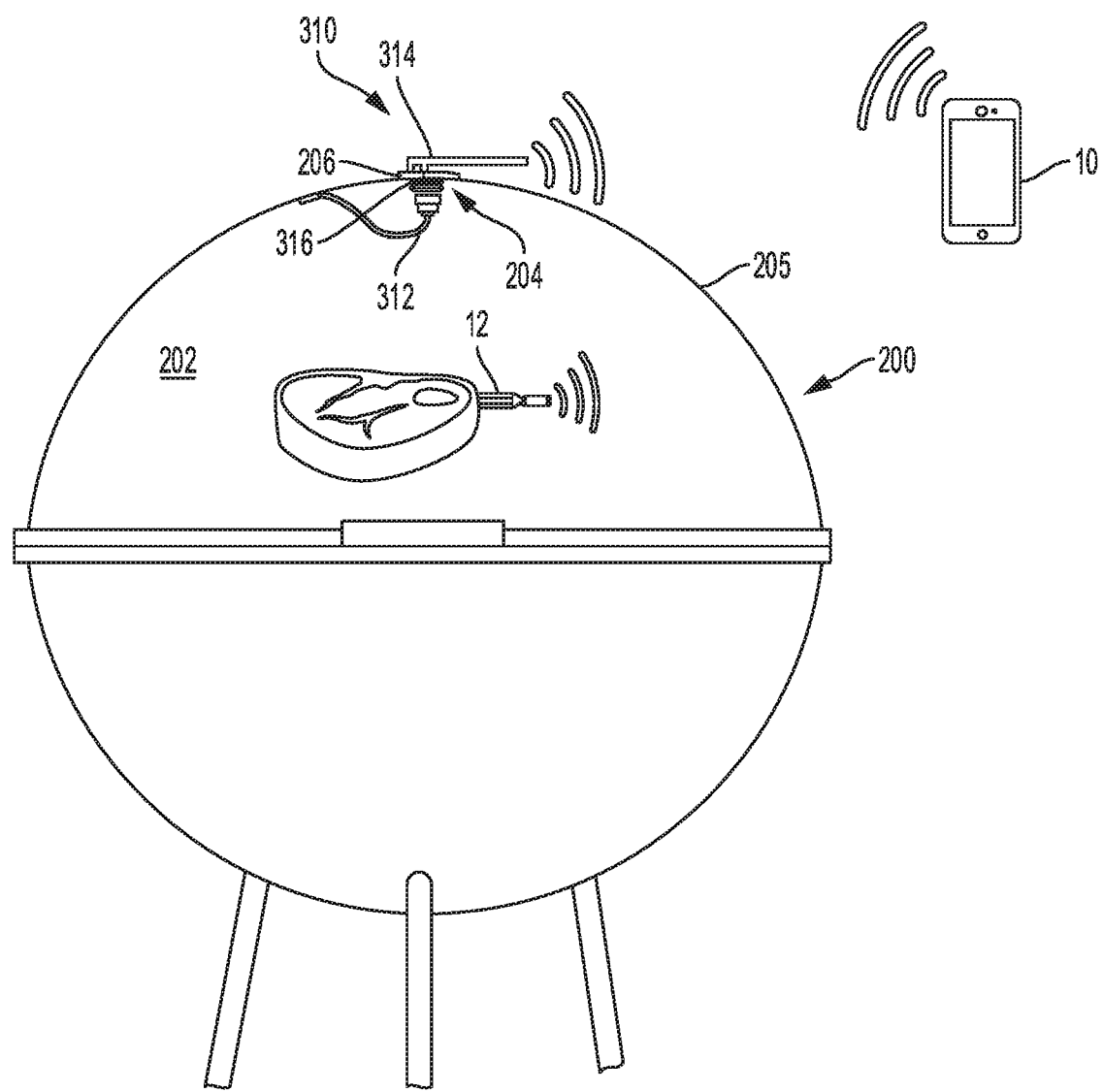
FIG. 3 illustrates a wireless signal repeater installed on or as part of a cooking appliance according to an embodiment.

FIG. 3 illustrates wireless signal repeater 310 installed on cooking appliance 200 according to an embodiment. As shown in FIG. 3, wireless signal repeater 310 includes exterior antenna 314 installed, located, or configured to be affixed on an exterior of cooking appliance 200, and interior antenna 312 installed, located, or configured to be affixed on an interior of cooking chamber 202 located inside cooking appliance 200.

Wireless signal repeater 310 also includes coupling portion 316 configured to connect interior antenna 312 with exterior antenna 314 through hole 206 of wall 205 of cooking appliance 200. Coupling portion 316 is configured to electrically transmit signals between interior antenna 312 and exterior antenna 314 for wirelessly retransmitting wireless signals received by wireless signal repeater 310.

For example, wireless signal repeater 310 may retransmit a wireless signal from a wireless food thermometer inside cooking chamber 202 for reception by remote device 10 outside of cooking appliance 200. In such an example, interior antenna 312 receives a wireless signal from the wireless food thermometer. Coupling portion 316 electrically transmits the received signal from interior antenna 312 to exterior antenna 314, which retransmits the wireless signal to remote device 10.

In other examples, this direction of this retransmission may be reversed, such that wireless signal repeater 310 retransmits a wireless signal from remote device 10 outside cooking appliance 200 for reception by a wireless food thermometer or other wireless device inside cooking chamber 202. In this case, exterior antenna 314 receives a wireless signal from remote device 10. Coupling portion 316 electrically transmits the received signal from exterior antenna 314 to interior antenna 312, which retransmits the wireless signal to the wireless device inside cooking chamber 202.

As shown in FIG. 3, coupling portion 316 is located at top portion 204 of cooking chamber 202. In the example of FIG. 3, a lid or cover of cooking appliance 200 has a parabolic or curved shape. Top portion 204 can include an area surrounding the vertex or apex of the curved shaped lid or cover of cooking appliance 200. This location for coupling portion 316 can ordinarily position interior antenna 312 at or near a focus for the parabolic or curved shape of the lid or cover of cooking appliance 200. As a result, the reflected wireless signals from wireless device 12 within cooking chamber 202 tend to focus or intersect at or near at least a portion of interior antenna 312, thereby allowing interior antenna to receive more of the reflected wireless signal for retransmission by exterior antenna 314. This can result in a higher power signal being retransmitted by exterior antenna 314.

In some implementations, repeater device 310 can be a passive signal repeater that does not need to be internally powered. In such implementations, the energy provided by the wireless signal inside cooking chamber 202 is used to excite the wireless signal retransmitted by exterior antenna 314. Such passive implementations can ordinarily allow for higher temperature operating ranges since temperature sensitive components such as batteries can be avoided. The usable life of passive repeaters is also generally better than active repeaters, which may involve electrically active or other types of active components.

In other implementations, repeater device 310 may be internally powered or remotely powered by, for example, inductive charging to amplify the signal transmitted by exterior antenna 314. In some implementations, wireless signal repeater 310 can include a battery for storing an electrical charge, and an amplifier for amplifying the signal to be wirelessly retransmitted by wireless signal repeater 310. In either active or passive style repeaters, the mechanical durability or physical endurance of the wireless signal repeater can match that of other non-moving parts of cooking appliance 200.

By retransmitting a wireless signal received by interior antenna 312 to outside of cooking appliance 200, it is ordinarily possible to provide a stronger wireless signal to remote device 10 at a farther distance from cooking appliance 200. This can allow a user of remote device 10 to travel farther from cooking appliance 200 (e.g., away from a grill in the backyard and into the house) and still receive at remote device 10 the information transmitted from the wireless device inside cooking chamber 202.

In some implementations, wireless signal repeater 310, or one or more portions thereof, may be integrally formed as part of cooking appliance 200. In this regard, wireless signal repeater 310 may form part of cooking appliance 200 with wireless signal repeater 310 installed on cooking appliance 200 at the factory.

In other implementations, cooking appliance 200 may be retrofitted with wireless signal repeater 310 in the field or at a retail location after leaving the factory. In such implementations, hole 206 may result from a hole drilled through wall 205 or may result from the replacement or modification of an existing component of cooking appliance 200, such as the replacement or modification of a handle on the lid or cover of cooking appliance 200, the replacement or modification of a thermostat gauge on the lid or cover of cooking appliance 200, or the replacement or modification of a brand badge or nameplate on the lid or cover of cooking appliance 200. In other implementations, hole 206 may be a preexisting opening in the lid or cover of cooking appliance, such as an air vent that is used to insert coupling portion 316 of wireless signal repeater 310 in the field. Such an example is provided with reference to FIG. 10 discussed below.

As will be appreciated by those of ordinary skill in the art, other implementations of wireless signal repeater 310 may include a different arrangement of an interior antenna, an exterior antenna, and a coupling portion than shown in FIG. 3. For example, the shape of the antennas shown in FIG. 3 may vary, as in the examples shown in FIGS. 9, 10, and 11A to 11D discussed below, or the location of the wireless signal repeater can be in a different location, such as the location shown in FIG. 4, which is discussed in more detail below.

Figure 4:
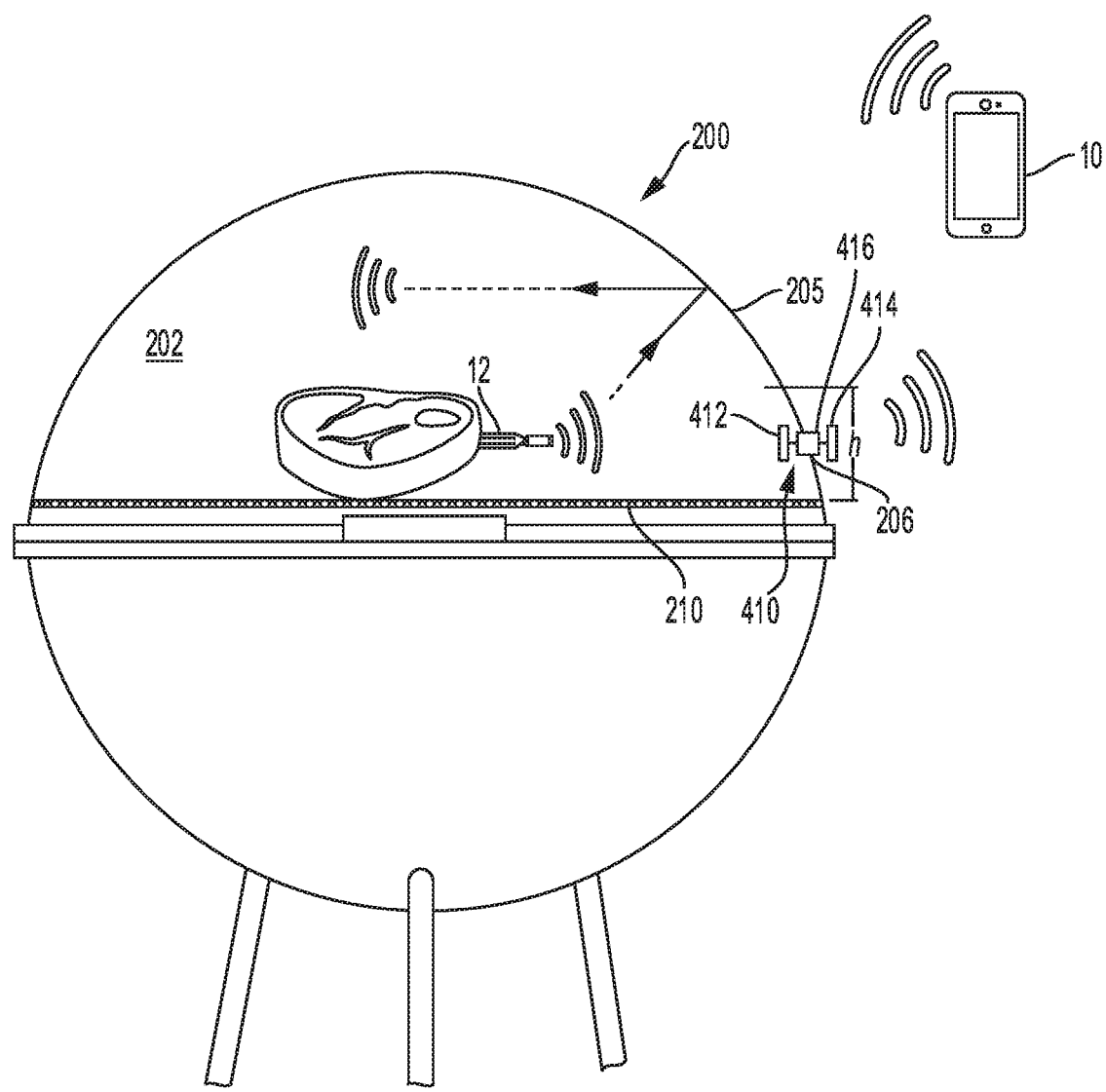
FIG. 4 illustrates the retransmission of a wireless signal outside of a cooking appliance using a wireless signal repeater according to an embodiment.

FIG. 4 illustrates the retransmission of a wireless signal outside of cooking appliance 200 using wireless signal repeater 410 according to an embodiment. As shown in FIG. 4, even when part of the wireless signal reflects back into cooking chamber 202 of cooking appliance 200, another part of the wireless signal is still received by interior antenna 412 of wireless signal repeater 410 for retransmission by exterior antenna 414 of wireless signal repeater 410. Retransmission of even part of the wireless signal to outside cooking appliance 200 can significantly improve the signal strength (i.e., power) and communication range or distance of the wireless signal. In some examples, the use of wireless signal repeater 310 in FIG. 3 or wireless signal repeater 410 in FIG. 4 approximately doubles the range of the wireless signal from wireless device 12 outside of cooking appliance 200.

In addition, and as noted above, the retransmission of wireless signals may be bidirectional in that wireless signal repeater 410 may be used to receive wireless signals from one or more remote devices (e.g., remote device 10 in FIG. 4) and retransmit the wireless signals inside cooking chamber 202 to wireless device 12. Such bidirectional communication may also be required by some wireless communication protocols, such as BLUETOOTH®.

As shown in FIG. 4, interior antenna 412 is electrically connected with exterior antenna 414 through coupling portion 416, which penetrates through wall 205 of cooking appliance 200. In the example of FIG. 4, wireless signal repeater 410 is located within a height h from cooking grate 210. The height h in FIG. 4 generally corresponds to an expected maximum or average height for placement of wireless device 12. For example, when wireless device 12 is a food thermometer, h may correspond to approximately 2 inches to correspond to an expected maximum height location for wireless device 12 when inserted into food being cooked on cooking grate 210. This location can allow for more of the wireless signal to be received by interior antenna 412 for retransmission by exterior antenna 414 when wireless device 12 is placed near interior antenna 412.

Figure 5A:
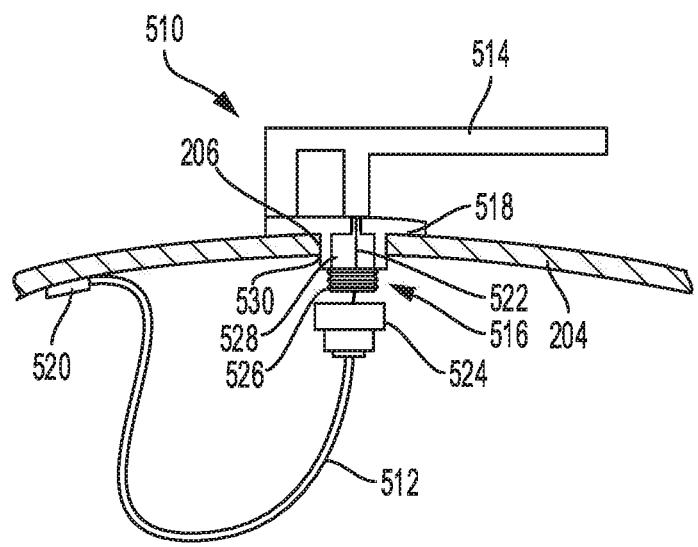
FIG. 5A is a side view of a wireless signal repeater installed on a cooking appliance according to an embodiment.

FIG. 5A is a side view of wireless signal repeater 510 installed on cooking appliance 200 according to an embodiment. As shown in the example of FIG. 5A, exterior antenna 514 of wireless signal repeater 510 has an Inverted F Antenna (IFA) design with a monopole antenna parallel to a ground plane. In more detail, exterior antenna 514 is grounded at one end to metal wall 205 of cooking appliance 200 via mounting plate 518.

Figure 5B:
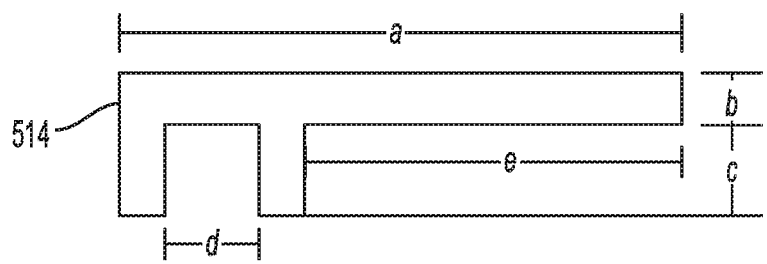
FIG. 5B is a side view of an exterior antenna of the wireless signal repeater of FIG. 5A according to an embodiment.

FIG. 5B is a side view of exterior antenna 514 of wireless signal repeater 510 according to an embodiment. The dimensions of exterior antenna 514 may be sized for a particular frequency and/or wavelength. For example, dimensions a, b, c, d, and e in FIG. 5B may be selected for transmitting and receiving wireless signals at approximately 2.4 GHz for BLUETOOTH® signals. In such an example, dimensions a, b, c, d, and e may correspond to approximately 30 mm, 3 mm, 7 mm, 5 mm, and 19.2 mm, respectively. In other implementations, the exterior antenna may include a different design, including a dipole antenna, a wideband dipole antenna, a type of monopole antenna, a bow-tie antenna, a helical antenna, a corner antenna, or a patch antenna, such as a planar inverted-F antenna or other planar antenna. In some implementations, the exterior antenna may include, for example, a dipole antenna with particular dimensions for transmitting and/or receiving wireless signals of a particular wavelength and/or frequency.

Returning to FIG. 5A, wireless signal repeater 510 includes coupling portion 516, which penetrates through hole 206 of wall 205 of cooking appliance 200. In the example of FIG. 5A, coupling portion 516 includes mounting portion 518 for mounting exterior antenna 514 onto an exterior of cooking appliance 200, and an interior antenna attachment portion 526 for attaching interior antenna 512 to coupling portion 516. Attachment portion 526 in the example of FIG. 5A includes threads for screwing interior antenna 512 onto coupling portion 516, but other implementations may include different methods of attaching or affixing interior antenna to coupling portion 516.

Wire 522 electrically connects exterior antenna 514 with interior antenna 512 through coupling portion 516. Wire 522 can include, for example, a 50 Ohm connector or a particular heat-resistant connector or signal transmission line. In the example of FIG. 5A, coupling portion 516 includes outer shell 530 that surrounds wire 522. An air gap or other dielectric fills space 528 inside outer shell 530 to provide both temperature insulation and electrical insulation for wire 522.

Figure 5C:
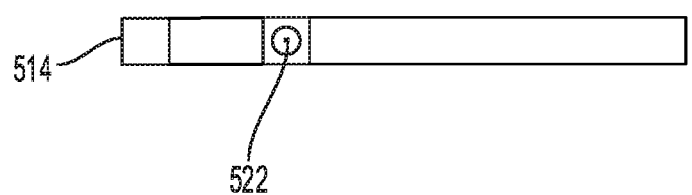
FIG. 5C is a bottom view of the exterior antenna of FIG. 5B according to an embodiment.

FIG. 5C provides a bottom view of exterior antenna 514 according to an embodiment. As shown in FIG. 5C, wire 522 connects to a bottom prong of the IFA exterior antenna 514. A smaller insulation gap may be provided through mounting portion 518 of coupling portion 516 for wire 522 to connect to the bottom prong of exterior antenna 514.

As shown in the example of FIG. 5A, interior antenna 512 may have a looped design that dips or hooks downward into an internal cooking chamber of cooking appliance 200 before looping back up to contact wall 205 of the cooking chamber, which may serve as a ground for the interior antenna. Grounding contact 520 can include a metal connection between interior antenna 512 and wall 205. In some implementations, interior antenna 512 may be welded, brazed, or screwed to wall 205.

In the example of FIG. 5A, the interior antenna can include a magnetic loop antenna, which ordinarily performs well inside cooking chambers that are relatively small metal enclosures. In other implementations, the interior antenna can include an electric field antenna (such as the square shaped interior antenna 912 shown in FIG. 9), which also performs well inside of small metal cooking chambers. In FIG. 5, end portion 524 of interior antenna 512 is screwed onto attachment portion 526 of coupling portion 516. In other implementations, the interior antenna can include, for example, a different design, including a dipole antenna, a wideband dipole antenna, type of monopole antenna, bow-tie antenna, helical antenna, corner antenna, or a patch antenna, such as a planar inverted-F antenna or other planar antenna.

As discussed in more detail below with reference to the helical antenna of FIG. 11B, in cases where the interior antenna is a helical antenna, the circular polarization of the helical antenna reduces the sensitivity of the interior antenna to the polarization of wireless device 12 inside cooking chamber 202. In addition, the helical antenna may use the interior surface of cooking chamber 202 as a reflector.

As discussed in more detail below with reference to FIGS. 11C and 11D, in cases where the interior antenna is a bow-tie antenna or a wide dipole antenna, the additional bandwidth provided by such broadband antenna designs can allow for a wider manufacturing tolerance in the antenna and/or can allow for a greater degree of structural changes to take place over time in the antenna or in other components in cooking chamber 202 due to environmental conditions. As a result, small changes in the shape of the antenna due to manufacturing variances or due to high temperatures will not significantly affect the efficiency of the reception and retransmission of wireless signals at a particular frequency, such as at a BLUETOOTH® frequency of approximately 2.4 GHz.

In some implementations, the wireless signal repeater may also provide for signal coupling using a magnetic field that uses a shorted connection to ground. In other implementations, signal coupling may be accomplished using a capacitive probe.

As will be appreciated by those of ordinary skill in the art, other antenna designs or components, or locations for the interior and/or exterior antennas are possible in different implementations.

For example, the interior antenna design and/or location can also consider the expected location or locations of the wireless device inside the cooking chamber, as discussed above with reference to the example of FIG. 4. In one example, a wireless meat thermometer in a grill may most often be inserted into meat horizontally. This can provide likely or expected locations for an antenna of the wireless meat thermometer at a horizontal location slightly above (e.g., half an inch) above a cooking grate where the meat will cook. The location of the interior antenna may be placed for better signal reception from this position and in light of the geometry of the interior of the cooking chamber.

As another example, the interior antenna may be located at a top portion of a curved cooking chamber lid so that the interior antenna will be located relatively close to any expected position of the wireless device inside the cooking chamber. In some examples, an interior surface of the cooking chamber can also act as a signal reflector to improve signal reception by the interior antenna, as discussed above with reference to the example of FIG. 3. The location and design of the interior antenna may also consider a particular antenna design for the wireless device expected to be used inside the cooking appliance.

Similarly, the exterior antenna may be located so as to improve the broadcast or transmission of the wireless signal from the exterior antenna in consideration of possible obstructions near, or on the exterior of the cooking appliance, or based on remote devices expected to be used with the wireless signal repeater.

In the example of FIGS. 5A to 5C, wireless signal repeater 510 may be installed to retrofit a cooking appliance in the field or at a retail location, such as by drilling a hole through a cover of the cooking appliance and screwing the exterior and interior antennas together with a threaded coupling portion. In other examples, the wireless signal repeater may replace an existing thermometer gauge in a wall of the cooking appliance or fit into another existing opening in a wall of the cooking appliance, such as an air vent hole. One retrofit example may include a replacement handle, which can include at least a portion of the wireless signal repeater, such as the exterior antenna. Yet other examples for retrofitting a cooking appliance with a wireless signal repeater can include a wireless signal repeater that includes at least one magnet to affix the exterior antenna to the exterior surface of the cooking appliance and/or to affix the interior antenna to the interior surface of the cooking chamber. Other methods of mounting the wireless signal repeater to the cooking appliance may be used in other examples.

In some implementations, the wireless signal repeater can be initially included as part of the cooking appliance by the manufacturer. In such implementations, the wireless signal repeater may, for example, be located near or form part of a lid or door handle, a heatshield for a handle, or a brand badge or nameplate. The size and location of the exterior antenna can be such that it has a relatively small effect on the overall appearance or aesthetics of the cooking appliance. In some cases, the wireless signal repeater can be formed as part of a metal stamping or casting process such that additional parts may not be required to construct the wireless signal repeater or portions thereof.

Figure 6A:
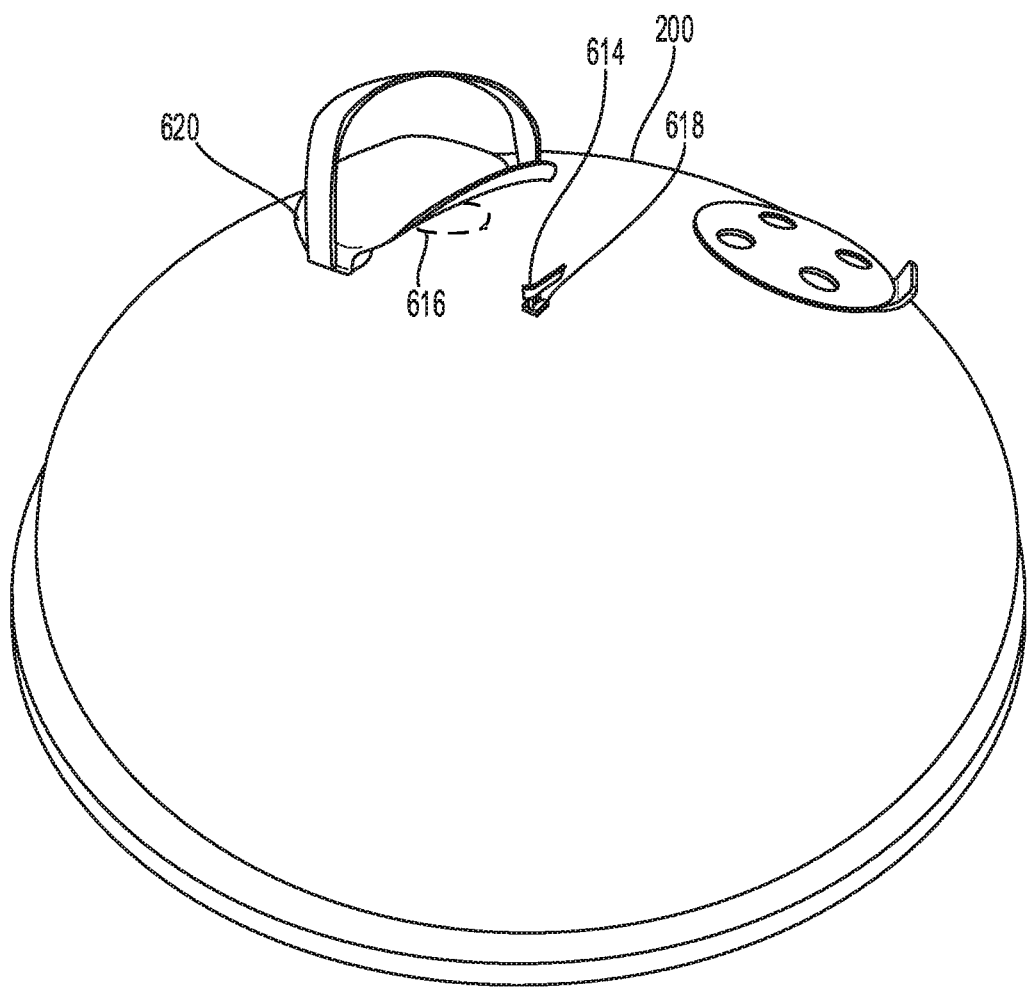
FIG. 6A is a view of a cooking appliance showing an exterior antenna installed on an exterior of a cooking appliance according to an embodiment.
Figure 7:
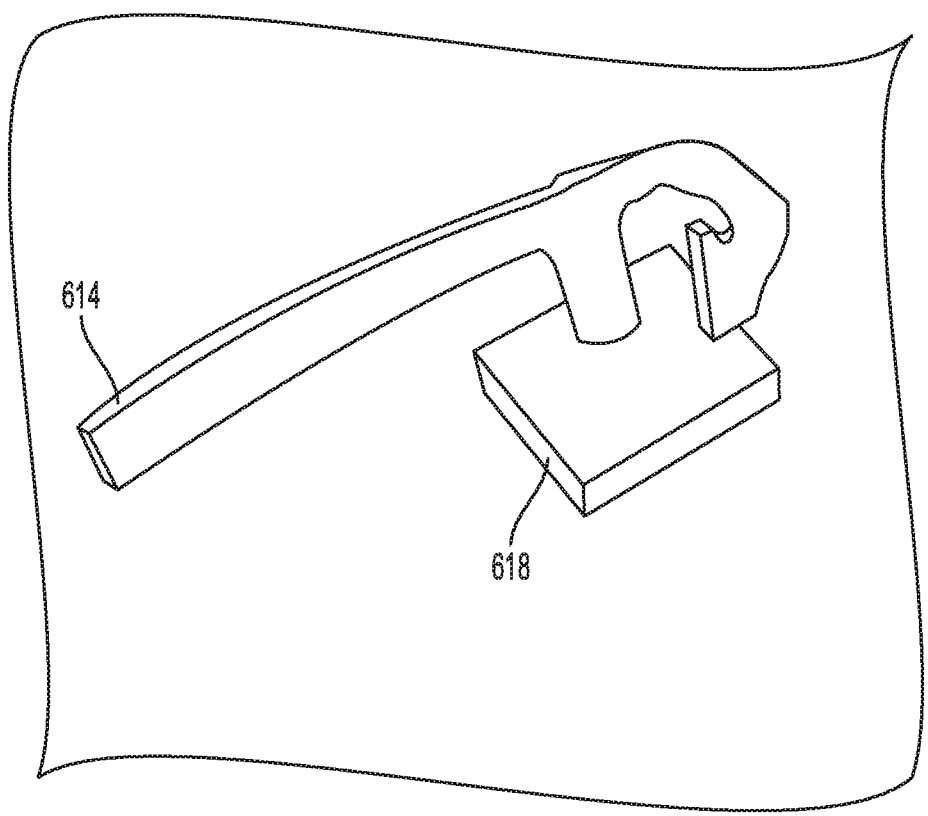
FIG. 7 is a close-up view of the exterior antenna of FIG. 6A.

FIG. 6A is an exterior view of cooking appliance 200 showing exterior antenna 614 installed on an exterior of cooking appliance 200. As shown in FIG. 6A, exterior antenna 614 is mounted on mounting portion 618, which both take up a relatively small area of the exterior of cooking appliance 200. Exterior antenna 614 has an IFA design similar to that of exterior antenna 514 in FIG. 5, but also includes more of a curved design than exterior antenna 514. FIG. 7 provides a close-up view of exterior antenna 614 from FIG. 6A.

As shown in FIG. 6A, the lid or cover of cooking appliance 200 can optionally include an aperture at location 616 under reflector 620, which is beneath a handle for the lid or cover. In such an implementation, reflector 620 is mounted over the aperture and can have a dual purpose as a heat shield for the handle, and as a reflector for reflecting wireless signals from inside cooking appliance 200 in a more horizontal direction to improve the strength or energy of the wireless signals in locations where remote device 10 is more likely to be located. In other words, reflector 620 or another type of reflector, such as a dedicated reflector, can be positioned or mounted over location 616 so that portions or energy from the wireless signal passing through an aperture at location 616 is redirected from a vertical or skyward direction above cooking appliance 200 toward a more horizontal direction from cooking appliance 200. In this regard, reflector 620 may narrow the radiation pattern of wireless signals emitted through the aperture. The aperture may also serve other functions for cooking appliance 200, such as by providing an air vent in a grill or a chimney tube in a smoker.

In other implementations, location 616 may be an alternate location for exterior antenna 614, such that reflector 620 reflects a wireless signal transmitted by exterior antenna 614 to direct the wireless signal along a more horizontal direction or otherwise narrow the radiation pattern of the wireless signal. As noted above, this can ordinarily provide for a stronger signal in areas where remote device 10 is expected to be located by redirecting portions of the wireless signal that would ordinarily be transmitted more directly above the grill. In this regard, the combination of reflector 620 and exterior antenna 614 when located within location 616 acts as a high-gain or directional antenna.

In yet other implementations, cooking appliance 200 may use both a wireless signal repeater and an aperture at location 616 with reflector 620. Such an implementation provides multiple points of wireless signal transmission from cooking appliance 200 and multiple point of wireless signal reception into cooking appliance 200. In the example of FIG. 6A, a first point of transmission and reception is provided by exterior antenna 614, and a second point of transmission and reception is provided by an aperture at location 616.

Figure 6B:
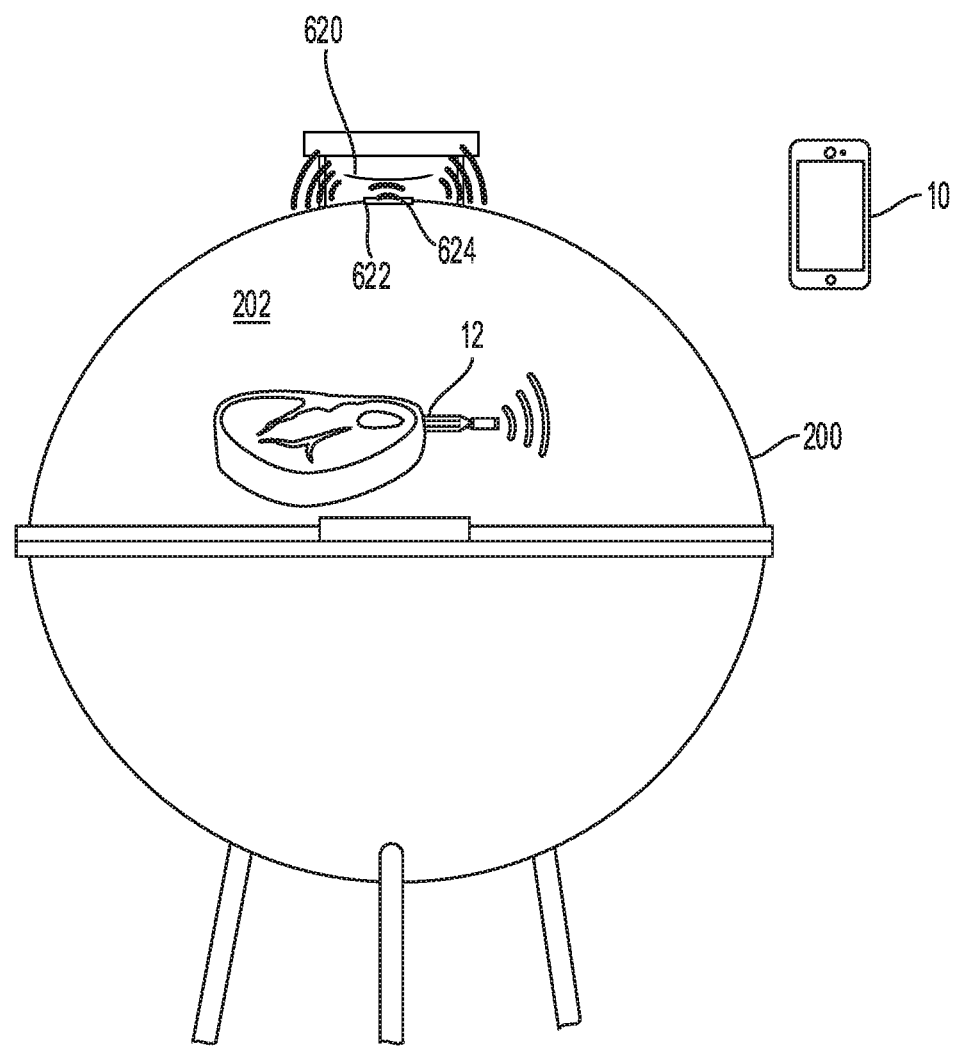
FIG. 6B is a side view of a cooking appliance with an aperture and a reflector for narrowing a radiation pattern according to an embodiment.

In some implementations, reflector 620 may form part of a corner antenna between reflector 620 and an exterior surface of cooking appliance, such that wireless signals emitted from an aperture or an exterior antenna within location 616 are directed in a particular direction away from cooking appliance 200. FIG. 6B provides a side view of such an implementation where cooking appliance 200 includes aperture 622 and reflector 620 mounted over aperture 622 for narrowing a radiation pattern according to an embodiment.

In the example of FIG. 6B, dielectric material 624 is affixed inside of aperture 622 to allow for a reduction in the size of aperture 622 for a given wavelength. Dielectric material 624 may include, for example, a material such as glass, ceramic, or an air gap between such dielectric materials. Dielectric material 624 may also serve other functions, such as by retaining heat inside cooking chamber 202, while allowing wireless signals to travel through dielectric material 624.

As shown in FIG. 6B, wireless signals from wireless device 12 inside cooking chamber 202 pass through dielectric material 624 and aperture 622 before being reflected or narrowed by the space between reflector 620 and the exterior surface of cooking appliance 200. In addition, wireless signals transmitted from remote device 10 are similarly narrowed by the space between reflector 620 and the exterior surface of cooking appliance 200 so as to focus or redirect the wireless signals into aperture 622 via dielectric material 624.

Figure 8:
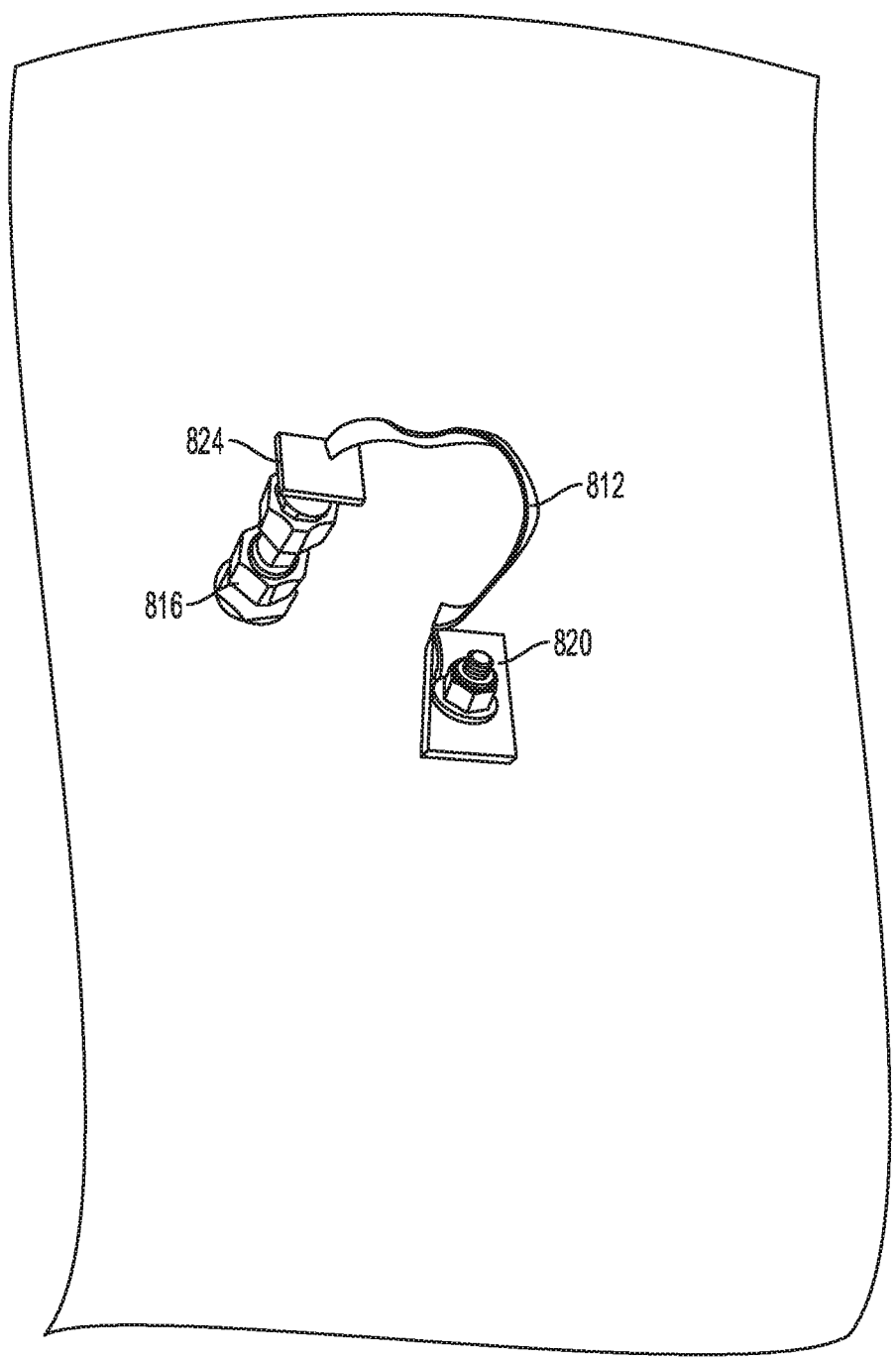
FIG. 8 is a close-up view of an interior antenna installed on a lid of a cooking appliance according to an embodiment.

FIG. 8 provides a close-up view of interior antenna 812 installed on a cover of a cooking appliance. As shown in FIG. 8, interior antenna 812 forms a magnetic loop with the lid of the cooking appliance with grounding at one end of interior antenna 812 at grounding portion 820, and a connection to coupling portion 816 at end portion 824 of interior antenna 812. Similar to the examples discussed above with reference to FIGS. 3 to 5A, coupling portion 816 in FIG. 8 electrically connects interior antenna 812 to an exterior antenna on the exterior of the cooking appliance.

Although grounding portion 820 is shown in FIG. 8 as a being a metal contact plate on the interior surface of a cooking chamber, other implementations may instead affix interior antenna 812 directly onto the interior wall of the cooking chamber. Interior antenna 812 may be affixed using a screw and nut, as shown in FIG. 8, or may be affixed using a different method such as by welding or brazing.

Figure 9:
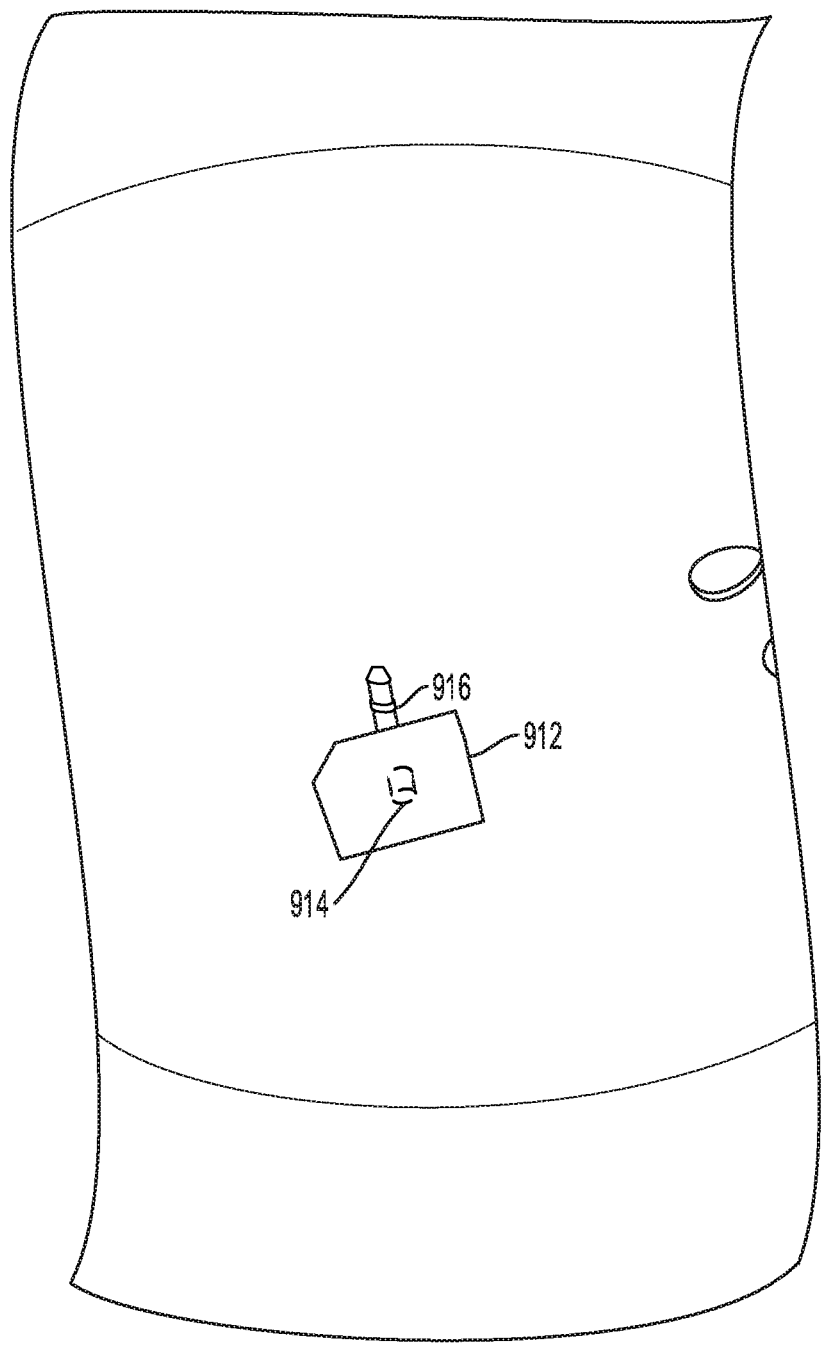
FIG. 9 is a view of an interior antenna installed on a cover of a cooking appliance according to an embodiment.

FIG. 9 is a view of interior antenna 912 installed on a cover of a cooking appliance according to an embodiment. In the example of FIG. 9, interior antenna 912 is connected to coupling portion 916, and is an electric field antenna with a flat plate design that has a relatively square shape. As noted above, such electric field antennas can perform well inside of small metal enclosures in terms of receiving and transmitting wireless signals to a wireless device inside the metal enclosure.

In some implementations, interior antenna 912 may be a high-gain antenna or a directional antenna that reflects and collects wireless signals in a direction toward an expected location of wireless device 12, such as toward a cooking grate of cooking appliance 200. As shown in FIG. 9, interior antenna 912 may optionally include feeder line 914 that uses the flat surface of interior antenna 912 behind feeder line 914 as a reflector to redirect wireless signals emitted from feeder line 914, or redirect received wireless signals toward feeder line 914. In other implementations, the flat surface of interior antenna 912 serving as a reflector may be bent along its center to form a 90-degree or 60-degree angle, for example, such that interior antenna 912 is a corner antenna directed toward a cooking grate below interior antenna 912. An example of a corner antenna is discussed in more detail below with reference to FIG. 11A.

Figure 10:
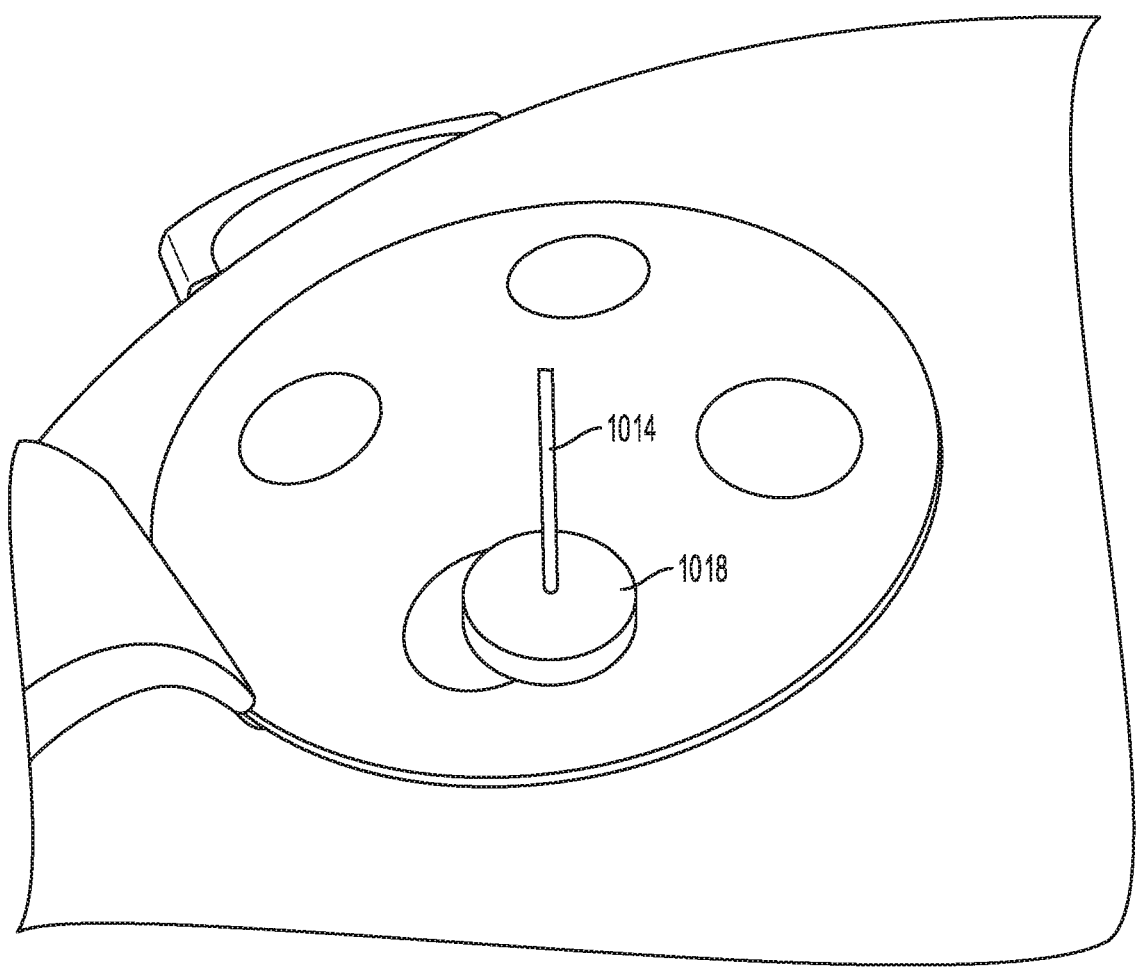
FIG. 10 is an exterior view of a cooking appliance showing an exterior antenna according to an embodiment.

FIG. 10 is an exterior view of a cooking appliance showing exterior antenna 1014 as a monopole antenna according to an embodiment. In the example of FIG. 10, exterior antenna 1014 has been retrofitted or installed through an existing air vent of the cooking appliance using magnet 1018 as a mounting portion. Exterior antenna 1014 of FIG. 10 is mounted perpendicular to the metal cover of the cooking appliance, which may serve as a ground plane.

Figure 11A:
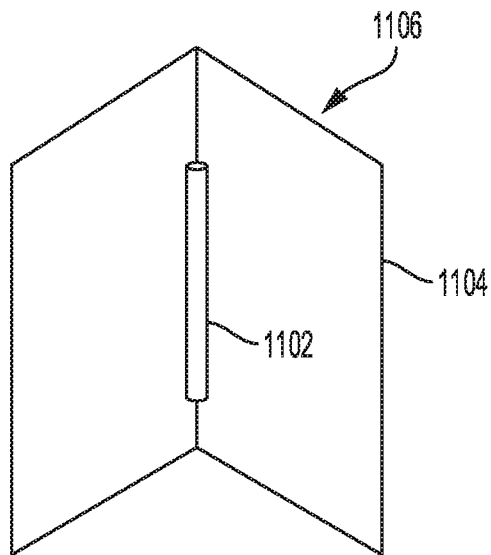
FIG. 11A is a view of a corner antenna of a wireless signal repeater according to an embodiment.

FIG. 11A is a view of corner antenna 1106 of a wireless signal repeater according to an embodiment. Corner antenna 1106 may be used as an interior antenna inside cooking chamber 202 and/or as an exterior antenna outside of, or on an exterior of cooking appliance 200. Corner antenna 1106 is a type of directional antenna that can be used to receive or radiate power in a direction of a cooking grate inside cooking chamber 202 when used as an interior antenna, or in a particular direction outside of cooking appliance 200 when used as an exterior antenna. As shown in FIG. 11A, corner antenna 1106 includes reflector 1104 and feed line 1102 positioned a distance from reflector 1104. Wireless signals retransmitted by feed line 1102 are reflected or redirected away from corner reflector 1104.

In the example of FIG. 11A, corner reflector 1104 is shown as having a 90-degree angle. However, corner reflector 1104 in other implementations can have a different angle depending on the geometry of cooking chamber 202 to direct more of the wireless signal toward the cooking grate or to receive more of the wireless signal from wireless device 12 located near the cooking grate. For example, other implementations may include a corner reflector with a 60-degree bend. In yet other implementations, corner reflector 1104 may be a flat plate without a bend.

Figure 11B:
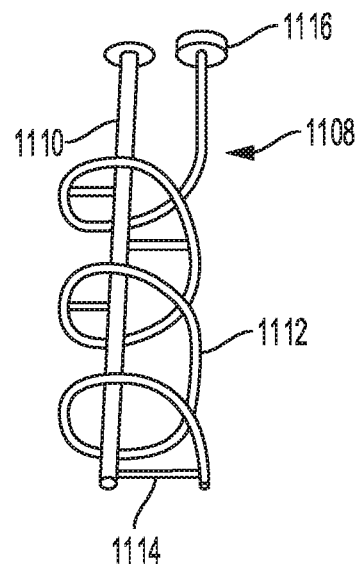
FIG. 11B is a view of a helical antenna of a wireless signal repeater according to an embodiment.

FIG. 11B is a view of helical antenna 1108 of a wireless signal repeater according to an embodiment. Helical antenna 1108 may be used as an interior antenna inside cooking chamber 202 and/or as an exterior antenna outside of or on an exterior of cooking appliance 200. Helical antenna 1108 is a type of directional antenna that can be used to receive or radiate power in a direction of a cooking grate inside cooking chamber 202 when used as an interior antenna, or in a particular direction outside of cooking appliance 200 when used as an exterior antenna.

As shown in FIG. 11B, helical antenna 1108 includes helical wire 1112 for receiving or transmitting wireless signals in a direction along central support 1110. Helical wire 1112 connects to coupling portion 1116 to electrically connect helical antenna 1108 to the other antenna of the wireless signal repeater. Helical antenna 1108 may include insulating supports 1114 as shown in FIG. 11B for stabilizing the location of helical wire 1112 about central support 1110. In some implementations, a metal wall of cooking appliance 200 may serve as a reflector ground plane for helical antenna 1108.

The circular polarization of helical antenna 1108 due to the helical corkscrew shape of helical wire 1112 ordinarily reduces a sensitivity of helical antenna to the polarization of a wireless device, such as a wireless food thermometer inside cooking chamber 202. In addition, helical antenna 1108 can have a relatively wide bandwidth due to its design. This can allow for a wider tolerance in manufacturing the antenna and can better allow for structural changes due to temperature changes in cooking appliance 200, while still being an efficient receiver or transmitter for a particular frequency of wireless signals.

Figure 11C:
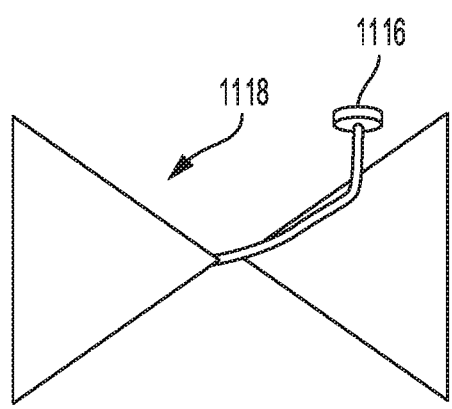
FIG. 11C is a view of a bow-tie antenna of a wireless signal repeater according to an embodiment.

FIG. 11C is a view of bow-tie antenna 1118 of a wireless signal repeater according to an embodiment. As a broadband or wide bandwidth antenna, bow-tie antenna 1118 can similarly allow for a wider variance of dimensions when manufacturing bow-tie antenna 1118 and can allow for more dimensional changes of bow-tie antenna 1118 over a period of use in cooking appliance 200. As shown in FIG. 11C, bow-tie antenna 1118 connects to coupling portion 1116 to electrically connect bow-tie antenna 1118 to the other antenna of the wireless signal repeater. As with the antennas of FIGS. 11A and 11B discussed above, bow-tie antenna 1118 in FIG. 11C may be the interior antenna or the exterior antenna of the wireless signal repeater. In addition, bow-tie antenna 1118 may use a metal wall of cooking appliance 200 as a ground for the antenna.

Figure 11D:
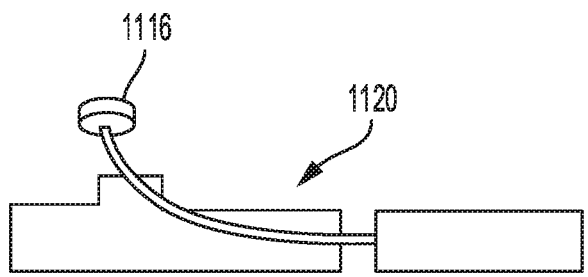
FIG. 11D is a view of a wide dipole antenna of a wireless signal repeater according to an embodiment.

FIG. 11D is a view of wide dipole antenna 1120 of a wireless signal repeater according to an embodiment. As with bow-tie antenna 1118 of FIG. 11C, wide dipole antenna 1120 provides a wider bandwidth that can allow for a wider tolerance of antenna dimensions that may result from manufacturing variations or can allow for some changes in the dimensions of wide dipole antenna 1120 due to environmental conditions of cooking appliance 200. In the example of FIG. 11D, wide dipole antenna 1120 connects to coupling portion 1116 to electrically connect wide dipole antenna 1120 to the other antenna of the wireless signal repeater. As with the antennas of FIGS. 11A and 11C discussed above, wide dipole antenna 1120 in FIG. 11D may be the interior antenna or the exterior antenna of the wireless signal repeater. In addition, wide dipole antenna 1120 may use a metal wall of cooking appliance 200 as a ground for the antenna.

Figure 12:
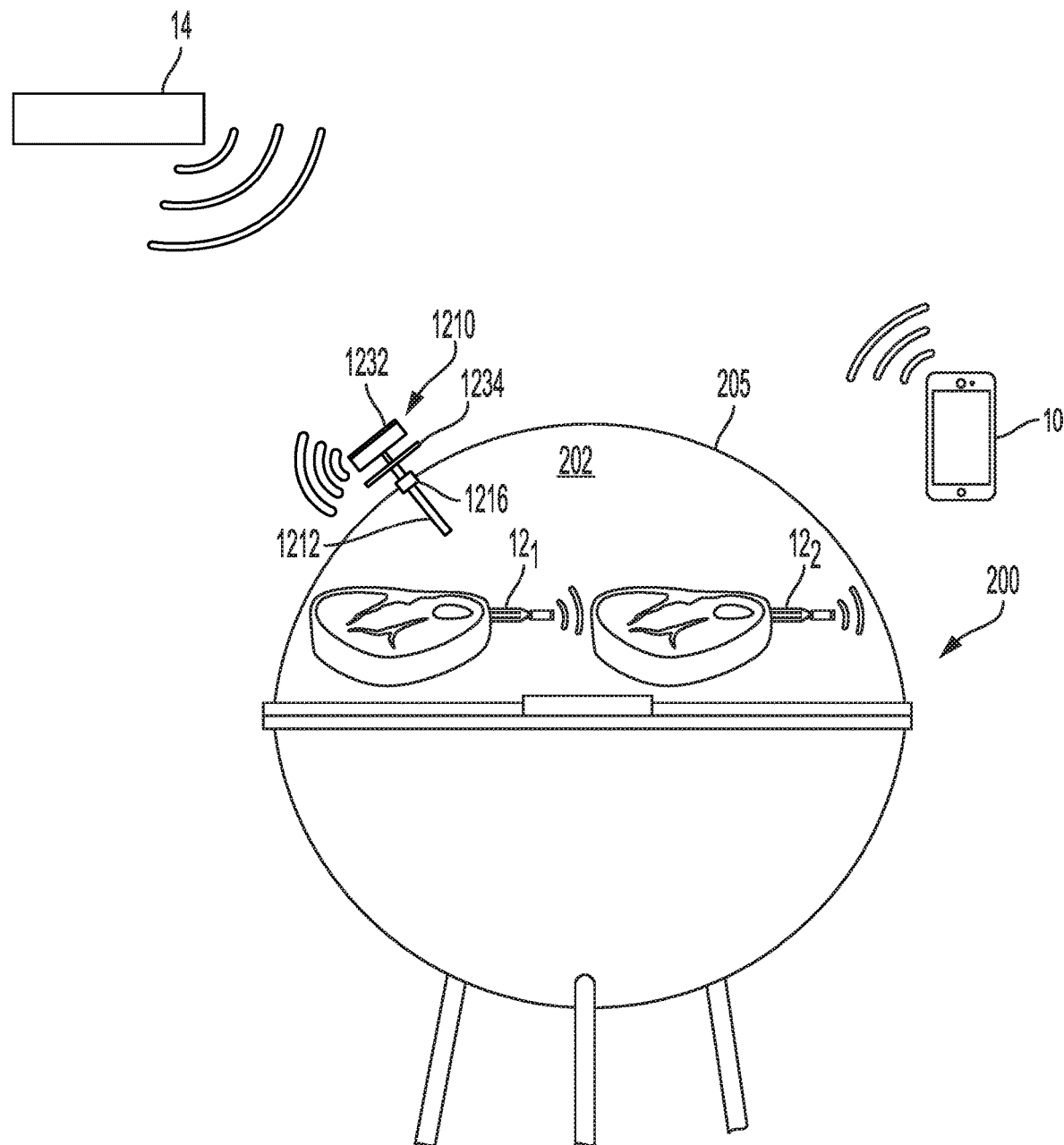
FIG. 12 illustrates an example of two wireless devices inside a cooking appliance and a temperature sensing device for the cooking appliance that wirelessly communicates with remote external electronic devices outside of the cooking appliance.

FIG. 12 illustrates an example of wireless devices $12_1$ and $12_2$ inside cooking chamber 202, and temperature sensing device 1210 mounted on cooking appliance 200. Temperature sensing device 1210 wirelessly communicates with wireless devices $12_1$ and $12_2$, in addition to wirelessly communicating with external electronic devices 10 and 14 outside of cooking appliance 200. In this regard, temperature sensing device 1210 serves as a wireless signal repeater for wireless signals between external electronic devices (e.g., external electronic devices 10 and 14) and wireless devices inside cooking chamber 202 (e.g., wireless devices $12_1$ and $12_2$).

As shown in FIG. 12, temperature sensing device 1210 includes temperature measurement probe 1212, coupling portion 1216, heat shield 1234, and housing 1232. In the example of FIG. 12, temperature measurement probe 1212 serves as an interior cooking chamber antenna for wirelessly communicating with wireless devices inside cooking chamber 202, and housing 1232 includes one or more exterior antennas for wirelessly communicating with external or remote electronic devices. Unlike the foregoing examples of passive wireless signal repeaters, temperature sensing device 1210 can include a battery to power circuitry configured to process, convert, and/or amplify a received signal before wirelessly retransmitting the signal.

In addition to serving as a wireless signal repeater, temperature sensing device 1210 provides a temperature measurement of cooking chamber 202. Temperature sensing device 1210 can indicate a measured ambient temperature of cooking chamber 202 on a display or gauge of housing 1232, and/or wirelessly communicate the measured temperature to external electronic devices, such as external electronic devices 10 and 14. Unlike conventional temperature gauges, temperature sensing device 1210 can provide a more accurate measurement and indication of the ambient temperature of cooking chamber 202 due to its electronic control. Prior art temperature gauges mounted on cooking appliances, such as barbeques, smokers, ovens, and grills, typically rely on purely thermomechanical actuation to move a needle that provides an indication of a temperature inside the cooking chamber. In contrast, temperature sensing device 1210 and the following temperature sensing devices disclosed herein include electronics in a housing mounted on a cooking appliance to provide a more accurate measurement and indication of the cooking chamber temperature. The use of heat-sensitive electronics is accomplished in the present disclosure with one or more novel insulating layers in addition to other novel features discussed in more detail below to shield the electronics of the temperature sensing device from the high temperatures of cooking chamber 202.

In the example of FIG. 12, wireless devices $12_1$ and $12_2$ inside cooking chamber 202 are wireless food thermometers. As shown in FIG. 12, wireless devices $12_1$ and $12_2$ transmit wireless signals to temperature sensing device 1210, which serves as a wireless signal repeater to transmit the signals from wireless devices $12_1$ and $12_2$ through the wall of lid 205 for reception by external electronic device 10 and external electronic device 14 outside of cooking appliance 200. In some implementations, the wireless signals received from wireless devices $12_1$ and $12_2$ can include RF signals such as, for example, a BLUETOOTH® signal, or other wireless communication signal.

Remote devices 10 and 14 can include, for example, a smartphone, a laptop, a tablet, a smart watch, a desktop computer, or user interface or charger for wireless devices $12_1$ and $12_2$. In some implementations, external electronic device 14 may include a wireless router for a Wi-Fi network. In this regard, temperature sensing device 1210 may also communicate using Wi-Fi in addition to or as an alternative to other RF standards, such as BLUETOOTH®.

In FIG. 12, temperature sensing device 1210 includes housing 1232 mounted on cooking appliance 200 via coupling portion 1216. Coupling portion 1216 can include, for example, nuts screwed onto opposite sides of lid 205 or other components to secure housing 1232 onto lid 205. Housing 1232 can include a digital display or a motor actuated needle to indicate an ambient temperature of cooking chamber 202. Examples of such temperature indicators are provided in FIGS. 14A and 22 discussed below.

As with the wireless signal repeaters discussed above, temperature sensing device 1210, or one or more portions thereof, may be integrally formed as part of cooking appliance 200. In this regard, temperature sensing device 1210 may form part of cooking appliance 200 with temperature sensing device 1210 installed on cooking appliance 200 at the factory.

In other implementations, cooking appliance 200 may be retrofitted with temperature sensing device 1210 in the field or at a retail location after leaving the factory. In such implementations, a hole may be drilled through lid 205 or may result from the replacement or modification of an existing component of cooking appliance 200, such as the replacement or modification of a handle on lid 205, the replacement of a previous thermostat gauge on lid 205, or the replacement or modification of a brand badge or nameplate on lid 205. In other cases, the hole may be a preexisting opening in lid 205, cover, or other portion of cooking appliance 200, such as an air vent that is used to insert coupling portion 1216 of temperature sensing device 1210 in the field. In this regard, temperature sensing device 1210 may be installed or located on a portion of a cooking appliance other than a cover, lid, or door.

Figure 13A:
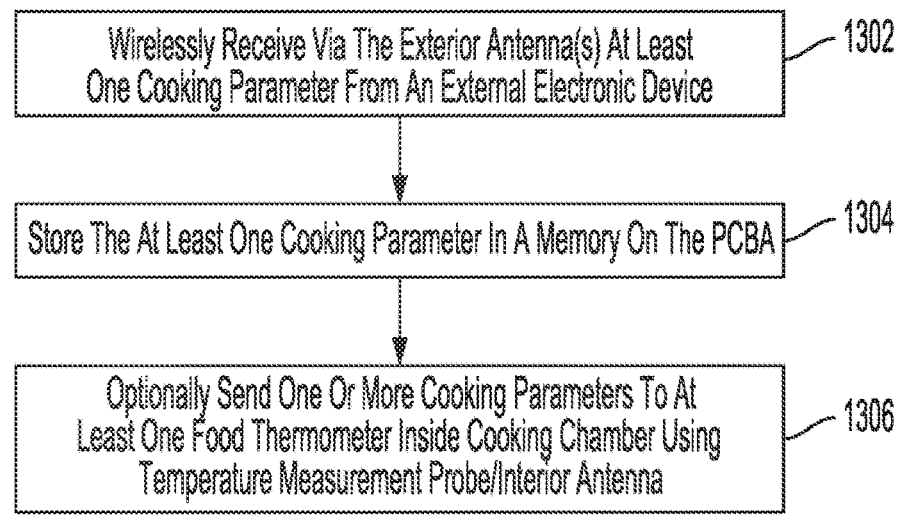
FIG. 13A is a flowchart for a wireless communication process for a temperature sensing device according to an embodiment.

FIG. 13A is a flowchart for a wireless communication process for a temperature sensing device, such as temperature sensing device 1210. The process of FIG. 13A can be performed, for example, by a controller or control circuitry of the temperature sensing device. In this regard, the control circuitry of the temperature sensing device can include, for example, circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, the control circuitry can include a System on a Chip (SoC).

In block 1302, at least one cooking parameter is wirelessly received via one or more exterior antennas from an external electronic device. With reference to the example of FIG. 12 discussed above, temperature sensing device 1210 receives at least one cooking parameter via one or more exterior antennas in housing 1232 from external electronic device 10 or 14. The at least one cooking parameter can include, for example, a minimum temperature setting for cooking chamber 202 or a maximum temperature setting for cooking chamber 202 that can trigger an alert. In other cases, the at least one cooking parameter can include information on food being cooked, a desired doneness of the food (e.g., rare, medium, well-done), or a food temperature setpoint. In block 1304, store the at least one cooking parameter in a memory on the PCBA.

In block 1306, one or more cooking parameters are wirelessly sent from the temperature sensing device to at least one food thermometer inside the cooking chamber using a temperature measurement probe of the temperature sensing device (e.g., temperature measurement probe 1212 in FIG. 12). As discussed above, a temperature measurement probe extending into the cooking chamber can serve as an interior cooking chamber antenna to send and receive wireless signals from one or more wireless devices, such as wireless food thermometers, inside the cooking chamber. The foregoing wireless communication process can allow for cooking parameters to be received from one or more external electronic devices by the temperature sensing device for use by the temperature sensing device and/or electronic devices inside the cooking chamber.

Figure 13B:
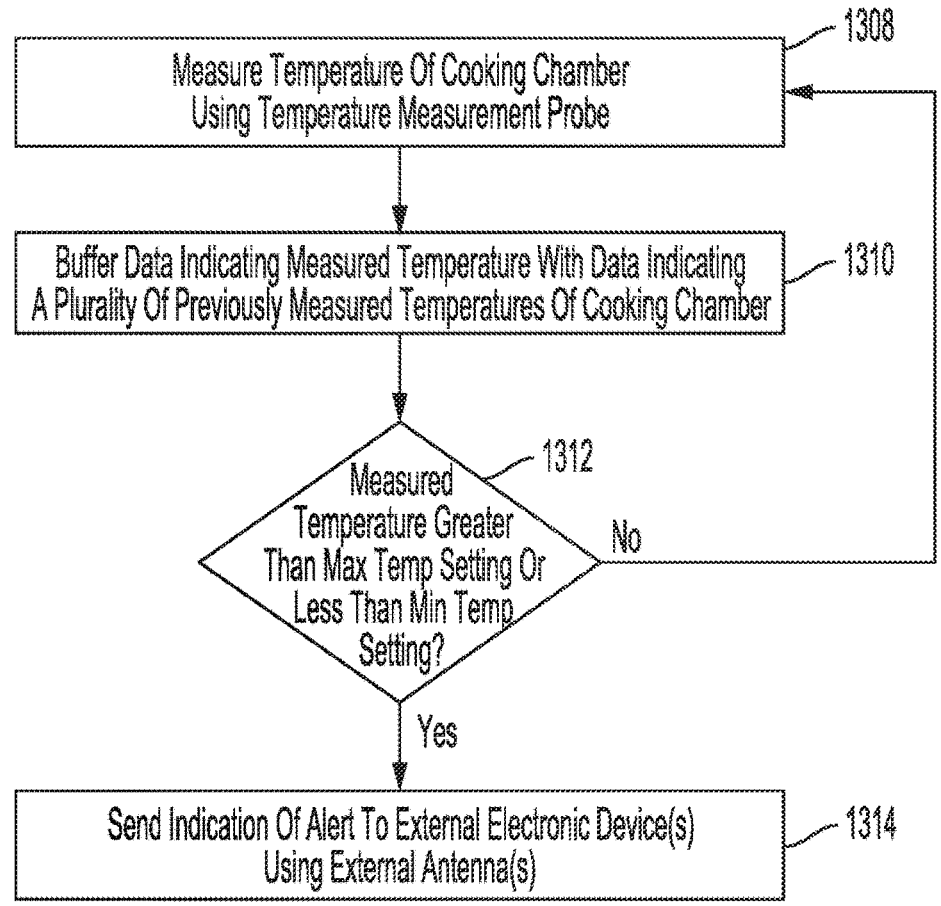
FIG. 13B is a flowchart for an alert process for a temperature sensing device according to an embodiment.

FIG. 13B is a flowchart for an alert process for a temperature sensing device according to an embodiment. The process of FIG. 13B can be performed by, for example, a controller or control circuitry of the temperature sensing device. As discussed in more detail below, the temperature sensing device can monitor the ambient temperature of the cooking chamber and send indications of an alert condition when the measured temperature is greater than a maximum temperature setting or less than a minimum temperature setting. In this regard, the maximum temperature setting and minimum temperature setting may be wirelessly received from an external electronic device as a cooking parameter, as discussed above for the process of FIG. 13A.

In block 1308, the temperature sensing device measures the temperature of the cooking chamber using the temperature measurement probe of the temperature sensing device. In the example of FIG. 12 discussed above, temperature measurement probe 1212 of temperature sensing device 1210 extends into cooking chamber 202 and includes one or more temperature sensors for measuring the ambient temperature of cooking chamber. In some examples, one or more wireless devices inside cooking chamber 202, such as a wireless food thermometer, may also measure an ambient temperature of the cooking chamber. In such examples, the temperature sensing device may receive ambient temperature data from such wireless devices to compare or average with the ambient temperature measured by the temperature sensing device.

In block 1310, data indicating the measured temperature is buffered with previously collected data indicating a plurality of previously measured temperatures of the cooking chamber. As discussed in more detail below, a history of measured temperatures for the cooking chamber can be used by an application executed by an external electronic device, the temperature sensing device, and/or a wireless device inside the cooking chamber to improve cooking time estimates, resting temperature rise estimates, and/or update cooking states (e.g., preheating, cooking, scaring) automatically. In addition, the history of measured temperatures for the cooking chamber may be graphed on a user interface of an external electronic device (e.g., a smartphone or tablet) to show a change in cooking chamber temperature over time, which may be displayed concurrently with a change in temperature for food being cooked inside the cooking chamber via a wireless food thermometer.

In block 1312, it is determined whether the temperature measured in block 1308 is greater than a maximum temperature setting or less than a minimum temperature setting. The maximum temperature setting may be a default temperature setting for a particular type of cooking appliance or may be set based on a recipe of food being cooked in the cooking chamber. The minimum temperature setting may be similarly set as a default for a particular type of cooking appliance, such as a smoker, to maintain a minimum cooking temperature, or may be set based on a recipe for cooking food in the cooking chamber. As discussed below with reference to FIG. 19, the minimum temperature setting may also be used to indicate a low fuel condition, such as when more charcoal needs to be added or a propane tank needs to be replaced.

If it is determined in block 1312 that the measured temperature is not greater than the maximum temperature setting or less than the minimum temperature setting, the process returns to block 1308 to continue to measure the temperature of the cooking chamber using the temperature measurement probe. On the other hand, if the measured temperature is greater than the maximum temperature setting or less than the minimum temperature setting, an indication of the alert is sent in block 1314 using one or more external antennas of the temperature sensing device to one or more external electronic devices, such as to a smartphone, smartwatch, or gateway device (e.g., a BLUETOOTH® to Wi-Fi bridge). The external electronic device or devices may display an alert on a user interface or may otherwise communicate the alert to a user, such as with an audible notification.

In other embodiments, the temperature sensing device may only wirelessly send temperature data to one or more external electronic devices, which in turn, use the temperature data to determine an alert condition for the cooking chamber (e.g., a high temperature alert, low temperature alert, or low fuel alert) and/or a cooking stage for following a recipe (e.g., preheating reached, baste food, turn or flip food, ready to sear, turn off grill). In this regard, FIG. 13C discussed below provides for wirelessly transmitting data to one or more external electronic devices.

Figure 13C:
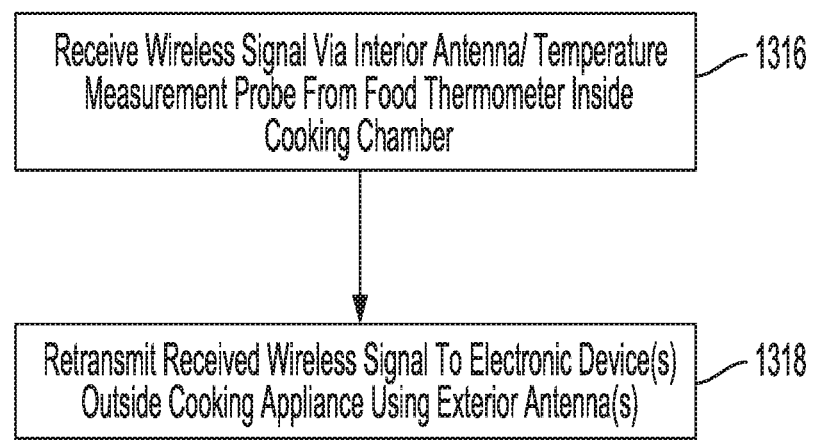
FIG. 13C is a flowchart for a signal repeater process for a temperature sensing device that serves as a wireless signal repeater between a temperature sensing device inside a cooking chamber and an electronic device outside of a cooking appliance according to an embodiment.

FIG. 13C is a flowchart for a wireless signal repeater process for a temperature sensing device that serves as a wireless signal repeater between a wireless device, such as a wireless food thermometer, inside a cooking chamber and an electronic device outside of a cooking appliance. According to an embodiment, the process of FIG. 13C can be performed by, for example, a controller or control circuitry of the temperature sensing device executing a firmware of the temperature sensing device.

In block 1316, a wireless signal is received by the temperature sensing device via a temperature measurement probe of the temperature sensing device. In this regard, the temperature measurement probe serves as an interior antenna for the cooking chamber. The wireless signal may include, for example, temperature data for food being cooked in the cooking chamber or for an ambient temperature measured near the food. In other cases, the wireless signal may include data indicating an alert or other condition of food being cooked in the cooking chamber, such as a completion state for the food being cooked.

In block 1318, the temperature sensing device retransmits the received wireless signal received in block 1316 to one or more electronic devices outside of the cooking appliance using one or more exterior antennas of the temperature sensing device. In some implementations, the received signal may be processed by circuitry of the temperature sensing device, such as an amplification, retiming, repackaging, or conversion to a different wireless protocol, such as from a BLUETOOTH® signal to a Wi-Fi signal, for example. In such implementations, the temperature sensing device can use power from a battery of the temperature sensing device to retransmit the wireless signal.

The use of a temperature sensing device to serve as a wireless signal repeater can extend the range of wireless devices inside the cooking chamber to reach electronic devices outside the cooking appliance with a stronger signal. This ordinarily allows for better monitoring of food being cooked inside the cooking chamber, in addition to the better monitoring of the ambient temperature of the cooking chamber via the temperature sensing device.

In addition, one or more external electronic devices (e.g., a smartphone) can use the wirelessly transmitted data to determine whether to activate an alert or other indication in an application executed by the external electronic device. For example, the retransmitted signal in block 1318 may include temperature data indicating a temperature inside the cooking chamber and/or a food temperature measured by a food thermometer inside the cooking chamber. An external electronic device may then determine an alert condition for the cooking chamber (e.g., a high temperature alert, low temperature alert, or low fuel alert) and/or a cooking stage for following a recipe (e.g., preheating reached, baste food, turn or flip food, ready to sear, turn off grill).

In some implementations, the external electronic device may provide an interactive recipe for cooking food that is updated or that progresses at least in part based on temperature data received from the temperature sensing device. A user interface of the external electronic device may display instructions for proceeding to a next cooking stage or an indication that the next cooking stage has begun or is ready to begin. For example, an instruction to baste food, turn, or flip food inside the cooking chamber can be automatically updated or progressed to a next cooking stage based on data received from the temperature sensing device that a lid or door of the cooking chamber has been opened, which assumes the user tended to the basting, turning, or flipping instruction.

As another example, a preheat temperature may be instructed by the user interface of the external electronic device, and a recipe followed by the external electronic device may automatically progress or provide a notification to begin the next cooking stage after temperature data received from the temperature sensing device indicates that a preheat temperature has been reached. As another example, the external electronic device may indicate that a searing stage is ready after receiving temperature data from the temperature sensing device indicating that a searing temperature has been reached inside the cooking chamber. As yet another example, a user interface of the external electronic device may provide a reminder to turn off the cooking appliance based on temperature data received from the temperature sensing device after the completion of a cooking stage. Such a reminder may automatically be dismissed or skipped based on temperature data indicating that the temperature inside the cooking chamber is cooling down.

Figure 14A:
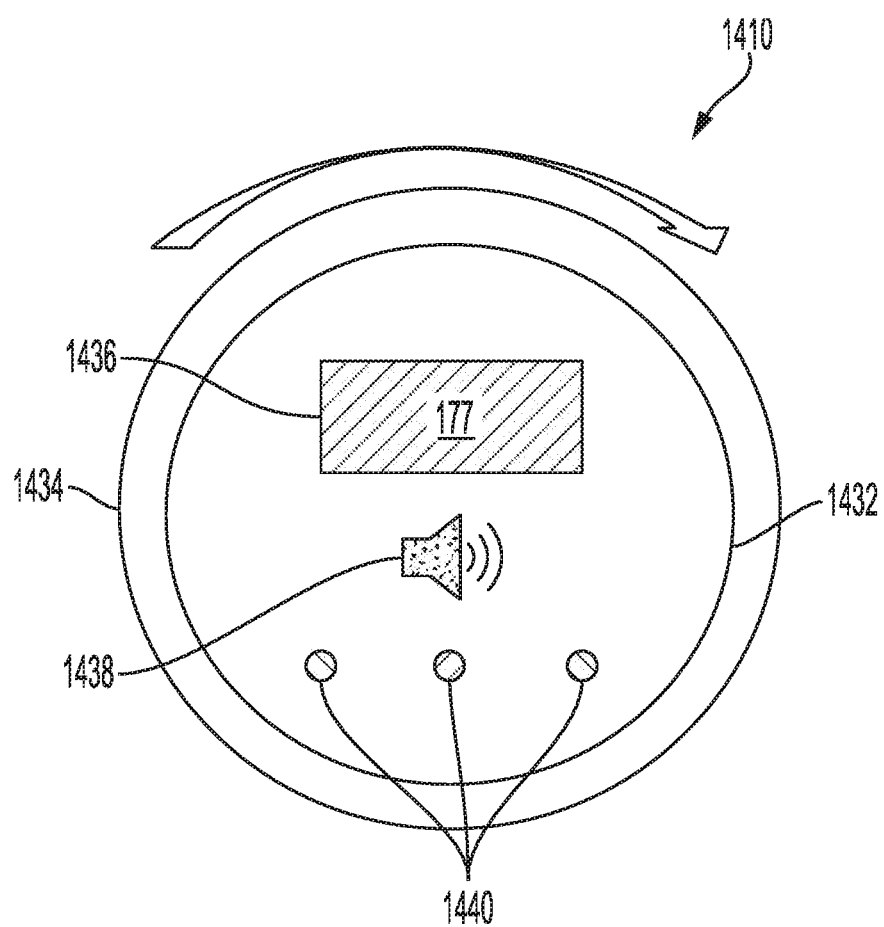
FIG. 14A is a top view of a temperature sensing device according to an embodiment.

FIG. 14A is a top view of a temperature sensing device 1410 according to an embodiment. In the example of FIG. 14A, housing 1432 of temperature sensing device 1410 includes display 1436 configured to display a temperature measured by a temperature sensor of temperature sensing device 1410. Display 1436 can include, for example, a Liquid Crystal Display (LCD) or an e-paper display.

As shown in FIG. 14A, temperature sensing device 1410 also includes heat shield 1434 below housing 1432 to reflect heat from cooking appliance 200 away from housing 1432. Heat shield 1434 may serve as an insulating layer to protect heat-sensitive electronics inside housing 1432, such as a battery, control circuitry, display 1436, Light Emitting Diodes (LEDs) 1440, and speaker 1438. In this regard, heat shield 1434 may include a heat reflective material, such as a gold coating or steel to reflect heat away from housing 1432. As discussed in more detail below, temperature sensing device 1410 may include additional insulating layers or components for protecting heat-sensitive electronics of housing 1432.

The example of temperature sensing device 1410 in FIG. 14A includes speaker 1438 and LEDs 1440 for indicating different states of the cooking chamber and/or of temperature sensing device 1410. In some implementations, different LEDs of LEDs 1440 can be used to indicate a high temperature setting has been reached in the cooking chamber (e.g., a red LED), a low temperature setting has been reached in the cooking chamber (e.g., a blue LED), or the cooking chamber has been preheated (e.g., a green LED). In addition, LEDs 1440 may be used to indicate a condition of temperature sensing device 1410, such as, for example, a low battery condition (e.g., a flashing red LED), that the battery is being charged (e.g., a solid red LED), a signal strength of wireless signals received by temperature sensing device 1410 (e.g., different flashing rates of the LEDs), or a firmware update process (e.g., a flashing green LED). Such conditions of temperature sensing device 1410 may also or alternatively be indicated by display 1436.

In some implementations, temperature sensing device 1410 can include an adjustment ring (e.g., adjustment ring 1442 in FIG. 14B) for accepting user input, such as for inputting temperature settings. In such implementations, housing 1432 can be configured so that pushing housing 1432 toward heat shield 1434 engages a button to select options displayed on display 1436.

FIG. 14B is a side view of temperature sensing device 1410 of FIG. 14A according to an embodiment. As shown in FIG. 14B, housing 1432 further includes exterior antenna 1444, which can include, for example a slot antenna formed in a side of housing 1432. Other implementations may include a different type of exterior antenna or a different number of exterior antennas, which may or may not be exposed to an exterior of housing 1432.

In the example of FIG. 14B, housing 1432 is mounted on lid 205 via coupling portion 1416, which fastens or attaches temperature sensing device 1410 to lid 205. In some implementations, coupling portion 1416 can include one or more threaded portions, such as a nut and wingnut, that screw tight onto lid 205. In other implementations, coupling portion may be affixed onto lid 205, such as by welding or brazing. In addition, housing 1432 may be mounted on a different portion of a cooking appliance other than a lid or cover, such as on a side wall of the cooking appliance.

As discussed above, heat shield 1434 protects housing 1432 from heat coming from cooking chamber 202. Heat shield 1434 can help protect heat-sensitive electronics in housing 1432 from damage and can also allow for the safe use of adjustment ring 1442 by a user during operation of cooking appliance 200 so that the user is not burned by touching adjustment ring 1442.

Temperature sensing device 1410 further includes temperature measurement probe 1412, which includes one or more temperature sensors configured to measure a temperature of cooking chamber 202. In addition, temperature measurement probe 1412 or a portion thereof may also serve as an interior antenna for communicating with wireless devices inside cooking chamber 202. In some implementations, temperature measurement probe 1412 can include a hollow metal tube, such as a stainless-steel tube that includes a temperature sensor, such as a thermocouple, Resistance Temperature Detector (RTD), or thermistor as a temperature sensor inside the hollow tube.

Figure 15:
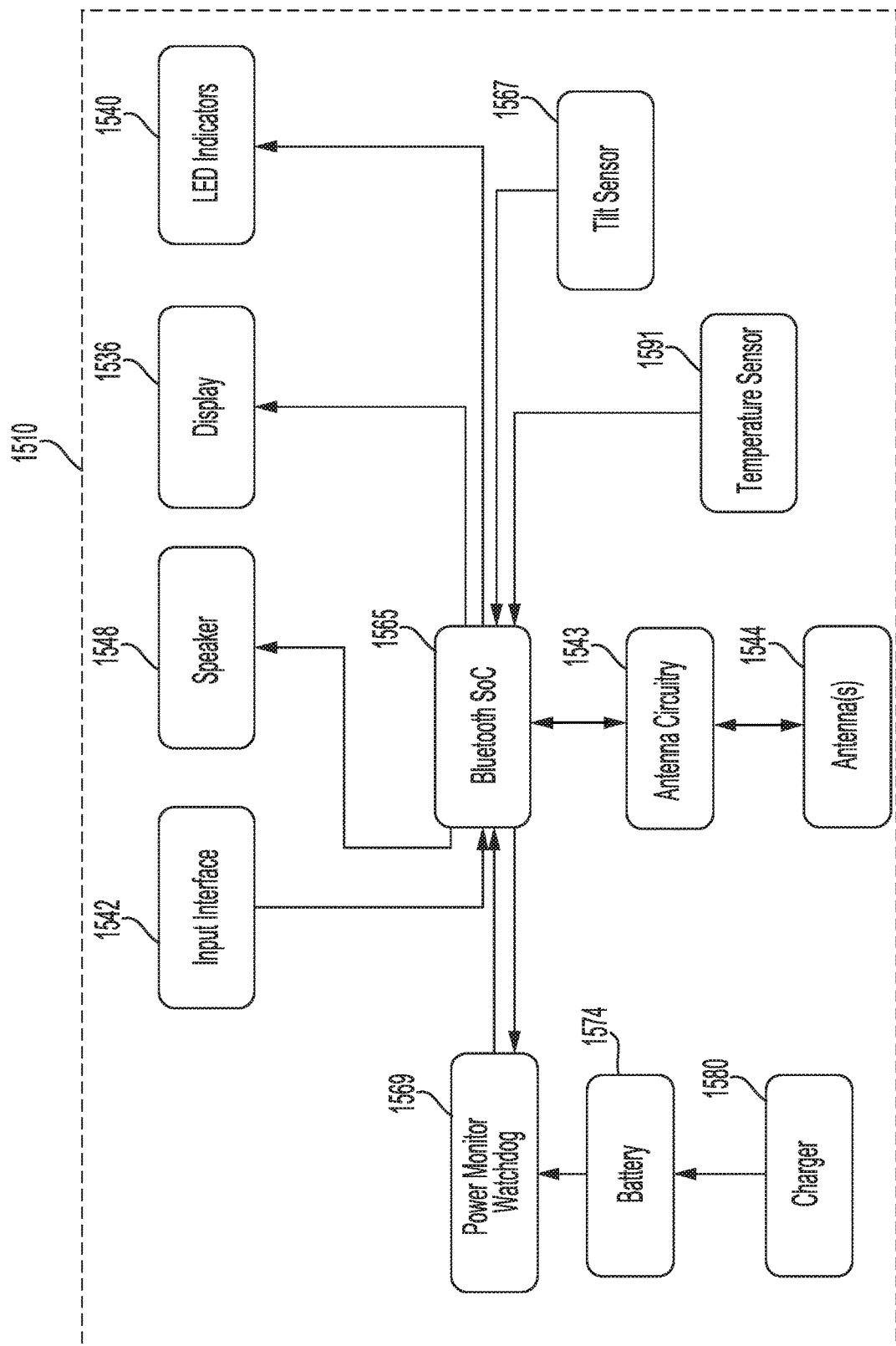
FIG. 15 is a module diagram for a temperature sensing device according to an embodiment.

FIG. 15 is a module diagram for temperature sensing device 1510 according to an embodiment. In the example of FIG. 15, BLUETOOTH® SoC 1565 serves as control circuitry that is coupled to various sensors and components of temperature sensing device 1510. As indicated in FIG. 15, SoC 1565 provides BLUETOOTH® communication for communicating via antennas 1544, which includes an interior cooking chamber antenna, such as with temperature measurement probe 1212 in FIG. 12 or temperature measurement probe 1412 in FIG. 14B. In addition, antennas 1544 include one or more exterior antennas, such as exterior antenna 1444 in FIG. 14B. As noted above, some implementations may use one RF communication protocol for an interior cooking chamber antenna, such as BLUETOOTH®, and use a different RF communication protocol for one or more exterior antennas, such as Wi-Fi.

Antenna circuitry 1543 can include, for example, a multiplexer, a switch, and/or a mixer or coupler for processing signals sent or received via antennas 1544. In some implementations, antenna circuitry 1543 or BLUETOOTH® SoC 1565 may detect which exterior antenna of a plurality of exterior antennas provides a stronger signal for communication with an external electronic device and select the exterior antenna with the stronger signal to use to communicate with the external electronic device. In addition, some implementations may provide for simultaneous use of an interior antenna inside a cooking chamber and one or more exterior antennas by mixing two different signals. This can ordinarily allow for concurrent communication with both a device inside the cooking chamber, such as a food thermometer, and with an external device, such as a smartphone, using the same BLUETOOTH® SOC without switching between the signals. In such implementations, the mixing may also be performed so as to favor the exterior antenna. For example, a 1 dB attenuation may be applied for an exterior antenna, while a 10 dB attenuation may be applied for an interior antenna, to allow for a stronger signal to be used with the exterior antenna than for the interior antenna.

SoC 1565 is also coupled to temperature sensor 1591 configured to measure an ambient temperature inside a cooking chamber (e.g., cooking chamber 202 in FIGS. 12 and 14B). Temperature sensor 1591 can include, for example, a thermistor, a thermocouple, or RTD. Temperature data or measurements provided by temperature sensor 1591 to SoC 1565 can be temporarily stored or buffered in a memory of SoC 1565 before being wirelessly sent to an external electronic device (e.g., electronic devices 10 and 14 in FIG. 12) via one or more exterior antennas of antennas 1544.

Temperature sensing device 1510 is powered by battery 1574, which is configured to be charged by charger 1580. In some implementations, charger 1580 can include a Universal Serial Bus (USB) charger, for example. Charger 1580 may serve as an internal power hub and can conform to a particular form factor, such as a USB type A, type B, mini-A, micro-A, mini-B, micro-B, or type C. In this regard, charger 1580 can be connected to an external power source (e.g., an AC mains) via an adapter for charging battery 1574. Some implementations may also include a photovoltaic cell for charging battery 1574, such as with photovoltaic cell 2378 in the example of FIG. 23 discussed below. In addition, charger 1580 may provide a wired communications connection for updating a firmware of temperature sensing device 1510 via a connection to a computer or flash drive, for example. In other implementations, updates to the firmware may be performed wirelessly via communication with an external electronic device, such as a smartphone, using one or more exterior antennas of antennas 1544.

In some implementations, battery 1574 may include a lithium battery or other type of battery with a wider temperature operating range than other types of batteries to accommodate for being in a housing mounted on a hot cooking appliance and/or for being outside when it is cold or hot, as in the case of an outdoor grill or smoker. For example, battery 1574 may provide a wide temperature range of operation with respect to a loss in stored charge due to temperature. In addition, battery 1574 may have a relatively low self-discharge rate to allow for a longer life. Such a low voltage range can be well suited for BLUETOOTH® Low Energy (BLE) SoC chips. In this regard, SoC 1565 can be a BLE SoC executing firmware for low power BLUETOOTH® communications to reduce the amount of power used to send wireless signals and reduce a data rate for wireless communication.

Power monitor watchdog 1569 monitors operation of battery 1574 and can turn off power to components, such as to SoC 1565 or portions thereof, to conserve power. For example, power monitor watchdog 1569 may power off at least a portion of SoC 1565 due to the circuitry being powered for longer than a predetermined period of time. In this regard, if a fully operational or partially operational communication mode remains on, the capacity of battery 1574 could be drained in days or weeks, instead of in years. In addition, to reducing unnecessary use for wireless communications, power monitor watchdog 1569 can also monitor and limit the use of battery 1574 based on temperature. Extremely low temperatures, for example, may limit current capability. In such cases, power monitor watchdog 1569 may only allow a full operational mode when there is a sufficient output capacity from battery 1574. For example, winter temperatures of −20 degrees Celsius could cause a very low output available from battery 1574 such that power monitor watchdog 1569 may disable power from battery 1574. Although this would prevent use of temperature sensing device 1510 during such low temperatures, this would protect temperature sensing device 1510 from undefined functionality when attempting to operate without sufficient power, and thereby can prevent firmware of SoC 1565 from crashing or other undesired behavior. In addition, SoC 1565 may enable power from battery 1574 to at least a portion of SoC 1565 or turn on temperature sensing device 1510 based on a temperature detected by temperature sensor 1591 indicating that the cooking appliance is being used. Power monitor watchdog 1569 may be implemented in firmware or in hardware.

Temperature sensing device 1510 also includes tilt sensor 1567, which may be used to indicate whether an orientation of a lid or door of the cooking appliance (e.g., lid 205 in FIGS. 12 and 14B) is in an open or closed position. SoC 1565 may then enable or disable at least a portion of SoC 1565 or other control circuitry based on a determination that the lid or door is in an open or closed position to automatically turn temperature sensing device 1510 on or off. For example, SoC 1565 may enable power from battery 1574 in response to determining that the lid or door has been opened based on an input from tilt sensor 1567 to automatically turn temperature sensing device 1510 on, and disable power from battery 1574 in response to determining that the lid or door has been open for more than a predetermined period of time to turn temperature sensing device 1510 off.

In other cases, SoC 1565 may disable activation of a low temperature alert based on an indication from tilt sensor 1567 that the lid or door is open. Tilt sensor 1567 can include, for example, a Micro-Electro-Mechanical System (MEMS) gyroscope, an accelerometer, a gravity switch, a contact switch for the lid or door, or other type of circuitry capable of detecting a change in orientation of the lid or door of the cooking appliance. In some implementations, tilt sensor 1567 can be included on the same Printed Circuit Board Assembly (PCBA) as SoC 1565 or in the same housing as SoC 1565 (e.g., housing 1432 in FIG. 14B). In other implementations, tilt sensor 1567 may be external to such a housing.

Temperature sensing device 1510 includes user interface components, such as input interface 1542, speaker 1548, display 1536, and LED indicators 1540. Input interface 1542 can include, for example, an adjustment ring (e.g., adjustment ring 1442 in FIG. 14) for adjusting settings shown on display 1536 and a button for selecting a setting, such as by pushing the adjustment ring inward toward the cooking chamber. In other implementations, input interface 1542 may include a different type of dial and/or one or more buttons for receiving user input.

Display 1536 can include an LCD, as with the example of display 1436 discussed above for FIG. 14A or may include, for example, a low power display such as e-paper, which may not require any power to maintain an image on the display. In other implementations, display 1536 may be replaced with a mechanical needle to point to different temperatures indicated on a background of a gauge, as with the examples of temperature sensing devices in FIGS. 21, 22, 23, 26, and 27 discussed in more detail below.

Speaker 1548 can provide an audible alert and/or sounds when using input interface 1542. In some implementations, SoC 1565 may use speaker 1548 to indicate when a high temperature setting or low temperature setting has been reached in the cooking chamber, or when the cooking chamber has reached a preheat temperature, as measured by temperature sensor 1591. In yet other implementations, SoC 1565 may use speaker 1548 to indicate other conditions, such as a low battery level, a low wireless signal strength or poor connection with an external electronic device or a wireless device inside the cooking chamber, or a low fuel condition determined by SoC 1565, as discussed in more detail below with reference to the process of FIG. 19. SoC 1565 may alternatively or additionally use display 1536 and/or LED indicators 1540 for such alerts or conditions.

Figure 16:
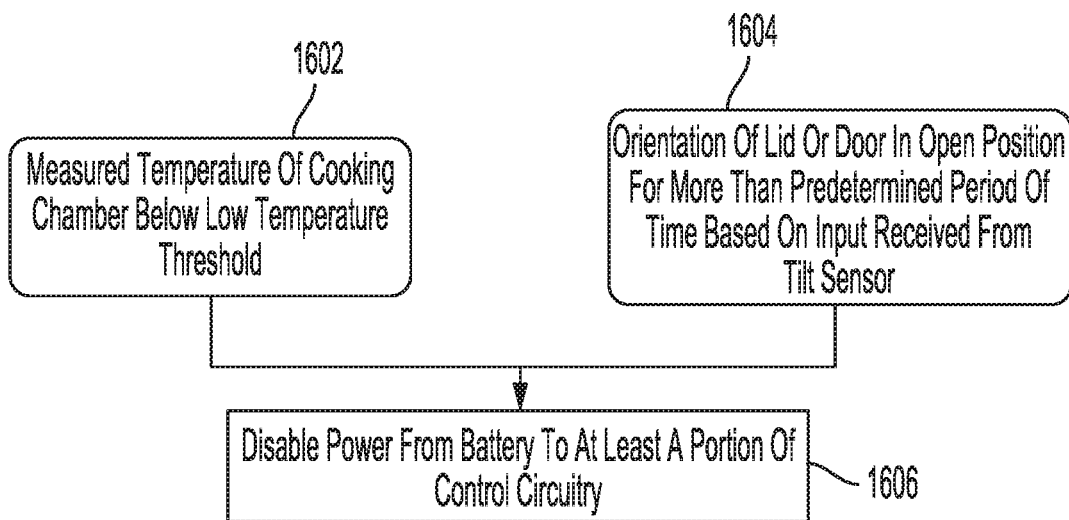
FIG. 16 is a flowchart for an automatic power off process according to an embodiment.

FIG. 16 is a flowchart for an automatic power off process according to an embodiment. The process of FIG. 16 can be performed by, for example, a controller or control circuitry (e.g., SoC 1565 in FIG. 15) of a temperature sensing device executing a firmware of the temperature sensing device.

In block 1602, the control circuitry of the temperature sensing device determines that a measured temperature of a cooking chamber is below a low temperature threshold. The temperature of the cooking chamber is measured by a temperature sensor of the temperature sensing device, such as temperature sensor 1591 in FIG. 15. The low temperature threshold may be set by a user via an application on an external electronic device (e.g., electronic device 10 in FIG. 12) or may be manually set at the temperature sensing device using a user input interface, such as input interface 1542 in FIG. 15. If the measured temperature is below the low temperature threshold, this can indicate that the cooking appliance is no longer in use since it has cooled off.

In block 1604, the control circuitry determines that an orientation of a lid or door of the cooking appliance (e.g., lid 205 in FIG. 12) has been in an open position for more than a predetermined period of time based on input received from a tilt sensor of the temperature sensing device (e.g., tilt sensor 1567 in FIG. 15). The predetermined period of time may be a default setting in the firmware of the temperature sensing device or may be set by a user via an input interface or via an application of an external electronic device, such as a smartphone. The orientation of the lid or door being open for more than the predetermined period of time can indicate that the cooking appliance is no longer in use.

In block 1606, the control circuitry disables power from a battery of the temperature sensing device to at least a portion of the control circuitry in response to the measured temperature being below the low temperature threshold in block 1602 or in response to the orientation of the lid or door being in the open position for more than a predetermined period of time in block 1604. The foregoing automatic power off process ordinarily conserves the power of the battery during conditions where the cooking appliance is no longer in use, as determined by the measured temperature of the cooking chamber or the orientation of the lid or door being in an open position for more than a predetermined period of time. Other implementations may optionally include only one of block 1602 or 1604, such that only the low temperature condition or the lid or door being open for more than the predetermined period of time disables power in block 1606.

Figure 17:
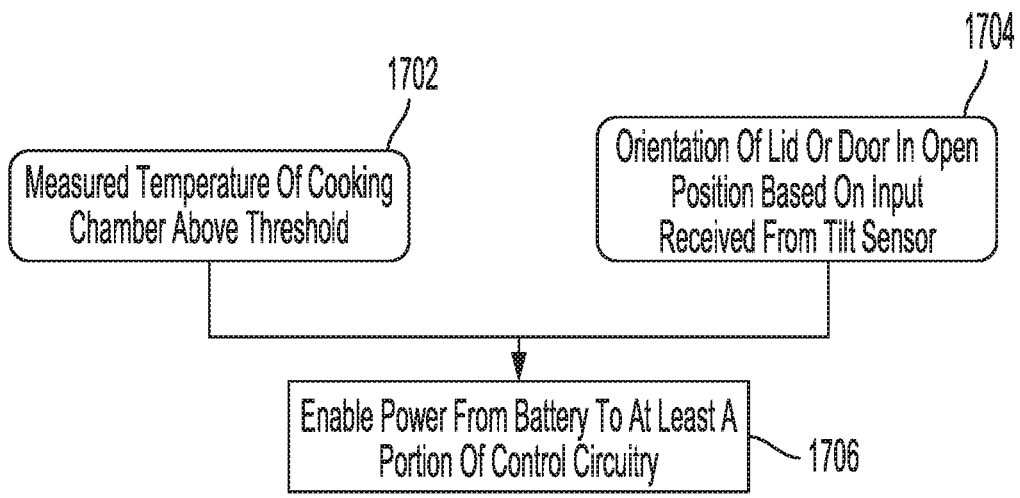
FIG. 17 is a flowchart for an automatic power on process according to an embodiment.

FIG. 17 is a flowchart for an automatic power on process according to an embodiment. The process of FIG. 17 can be performed by, for example, a controller or control circuitry (e.g., SoC 1565 in FIG. 15) of a temperature sensing device executing a firmware of the temperature sensing device.

In block 1702, the control circuitry of the temperature sensing device determines that a measured temperature of a cooking chamber is above a temperature threshold. The temperature of the cooking chamber is measured by a temperature sensor of the temperature sensing device, such as temperature sensor 1591 in FIG. 15. The temperature threshold may be set by a user via an application on an external electronic device (e.g., electronic device 10 in FIG. 12) or may be manually set at the temperature sensing device using a user input interface, such as input interface 1542 in FIG. 15. In some implementations, the temperature threshold in block 1702 may be the same as the low temperature threshold in block 1602 for the automatic power off process of FIG. 16. In other implementations, these temperature thresholds may differ. If the measured temperature is above the temperature threshold, this can indicate that the cooking appliance is in use since it has been heated above the temperature threshold.

In block 1704, the control circuitry determines that an orientation of a lid or door of the cooking appliance (e.g., lid 205 in FIG. 12) is in an open position based an input received from a tilt sensor of the temperature sensing device (e.g., tilt sensor 1567 in FIG. 15). As with the measured temperature in block 1702 being above a temperature threshold, the orientation of the lid or door being open in block 1704 can indicate that the cooking appliance is now in use.

In block 1706, the control circuitry enables power from a battery of the temperature sensing device to at least a portion of the control circuitry in response to the measured temperature being above the low temperature threshold in block 1702 or in response to the orientation of the lid or door being in the open position in block 1704. The foregoing automatic power on process ordinarily improves user interaction with the temperature sensing device, since the user does not need to manually turn the temperature sensing device on. Other implementations may optionally include only one of block 1702 or 1704, such that only the temperature condition in 1702 or the lid or door being open in block 1704 enables power in block 1706.

Figure 18A:
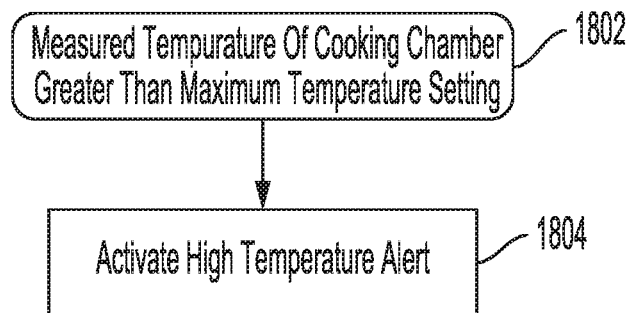
FIG. 18A is a flowchart for a high temperature alert process according to an embodiment.

FIG. 18A is a flowchart for a high temperature alert process according to an embodiment. The process of FIG. 18A can be performed by, for example, a controller or control circuitry (e.g., SoC 1565 in FIG. 15) of a temperature sensing device executing a firmware of the temperature sensing device. In other implementations, the process of FIG. 18A can be performed by circuitry of an external electronic device outside of the temperature sensing device (e.g., circuitry of electronic device 10 in FIG. 12).

In block 1802, the control circuitry of the temperature sensing device or the circuitry of the external electronic device determines that a measured temperature of a cooking chamber is greater than a maximum temperature setting. The temperature of the cooking chamber is measured by a temperature sensor of the temperature sensing device, such as temperature sensor 1591 in FIG. 15, and may be wirelessly transmitted to the external electronic device in some implementations.

The maximum temperature setting may be set by a user via an application on the external electronic device or may be manually set at the temperature sensing device using a user input interface, such as input interface 1542 in FIG. 15. In other cases, the maximum temperature setting can be a default setting of the firmware of the temperature sensing device or may be a maximum temperature setting for a particular recipe or type of food being cooked. In such cases, input from a user at an external electronic device, such as a type of food to be cooked and/or a desired doneness of the food, may provide the control circuitry with the maximum temperature setting. If the measured temperature is greater than the maximum temperature setting, this can indicate that the temperature of the cooking chamber needs to be reduced.

In block 1804, a high temperature alert is activated by the control circuitry of the temperature sensing device or by the circuitry of the external electronic device in response to the measured temperature being greater than the maximum temperature setting in block 1802. In some implementations, the activation of the high temperature alert can include using at least one of a speaker and light of the temperature sensing device. For example, an audible sound may indicate that the maximum temperature setting has been exceeded or a red LED may flash indicating the maximum temperature setting has been exceeded. In addition, the control circuitry may wirelessly send an indication of the alert to one or more external electronic devices (e.g., a smartphone and/or a charger for a wireless food thermometer) via one or more exterior antennas.

In other implementations, the circuitry of the external electronic device may activate the high temperature alert in block 1804. For example, the measured temperature in block 1802 can be provided to the external electronic device by the temperature measurement device, and the circuitry of the external electronic device in block 1804 may activate the high temperature alert using a user interface of the external electronic device.

Figure 18B:
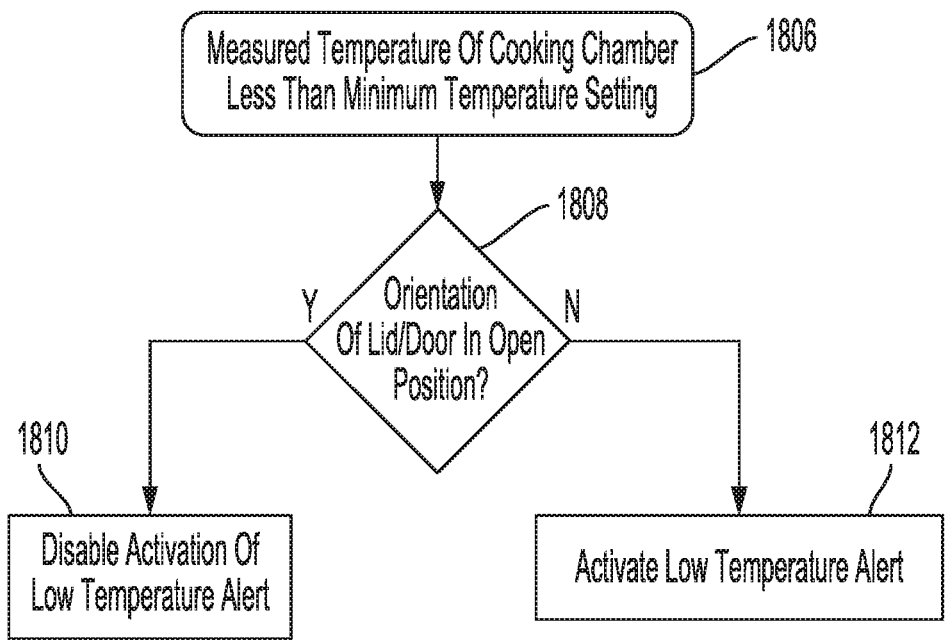
FIG. 18B is a flowchart for a low temperature alert process according to an embodiment.

FIG. 18B is a flowchart for a low temperature alert process according to an embodiment. The process of FIG. 18B can be performed by, for example, a controller or control circuitry (e.g., SoC 1565 in FIG. 15) of a temperature sensing device executing a firmware of the temperature sensing device. In other implementations, the process of FIG. 18B can be performed by circuitry of an external electronic device (e.g., external electronic device 10 in FIG. 12) outside of the temperature sensing device.

In block 1806, the control circuitry of the temperature sensing device or the circuitry of the external electronic device determines that a measured temperature of a cooking chamber is less than a minimum temperature setting. The temperature of the cooking chamber is measured by a temperature sensor of the temperature sensing device, such as temperature sensor 1591 in FIG. 15, and may be wirelessly transmitted to the external electronic device.

The minimum temperature setting may be set by a user via an application on the external electronic device or may be manually set at the temperature sensing device using a user input interface, such as input interface 1542 in FIG. 15. In other cases, the minimum temperature setting can be a default setting of the firmware of the temperature sensing device or may be a minimum temperature setting for a particular recipe or type of food being cooked. In such cases, input from a user at the external electronic device, such as a type of food to be cooked and/or a desired doneness of the food, may provide the control circuitry with the minimum temperature setting. If the measured temperature is less than the minimum temperature setting, this can indicate that the temperature of the cooking chamber needs to be increased.

In block 1808, it is determined whether an orientation of a lid or door of the cooking chamber is in an open position. The control circuitry of the temperature sensing device may determine that the lid or door of the cooking appliance is in an open position based on an input received from a tilt sensor of the temperature sensing device. In some implementations, an indication of the lid or door position may be wirelessly transmitted to the external electronic device. If it is determined that the lid or door is in an open position, the control circuitry of the temperature sensing device or the circuitry of the external electronic device disables the activation of a low temperature alert in block 1810. This ordinarily prevents nuisance alerts caused by a sudden decrease in temperature when opening the door or lid of the cooking chamber.

On the other hand, if it is determined in block 1808 that the orientation of the lid or door is not in an open position, a low temperature alert is activated in block 1812 in response to the measured temperature being less than the minimum temperature setting in block 1806. The activation of the low temperature alert may be made by the control circuitry of the temperature sensing device or by the circuitry of the external electronic device. In some implementations, the activation of the low temperature alert can include using at least one of a speaker and light of the temperature sensing device. For example, an audible sound may indicate that the measured temperature has fallen below the minimum temperature setting or a blue LED may flash indicating the measured temperature has fallen below the minimum temperature setting. In addition, the control circuitry may wirelessly send an indication of the alert to one or more external electronic devices (e.g., a smartphone and/or a charger for a wireless food thermometer) via one or more exterior antennas. In other implementations, circuitry of the external electronic device activates the alert in block 1812 using a user interface of the external electronic device and/or an audible notification.

Figure 19:
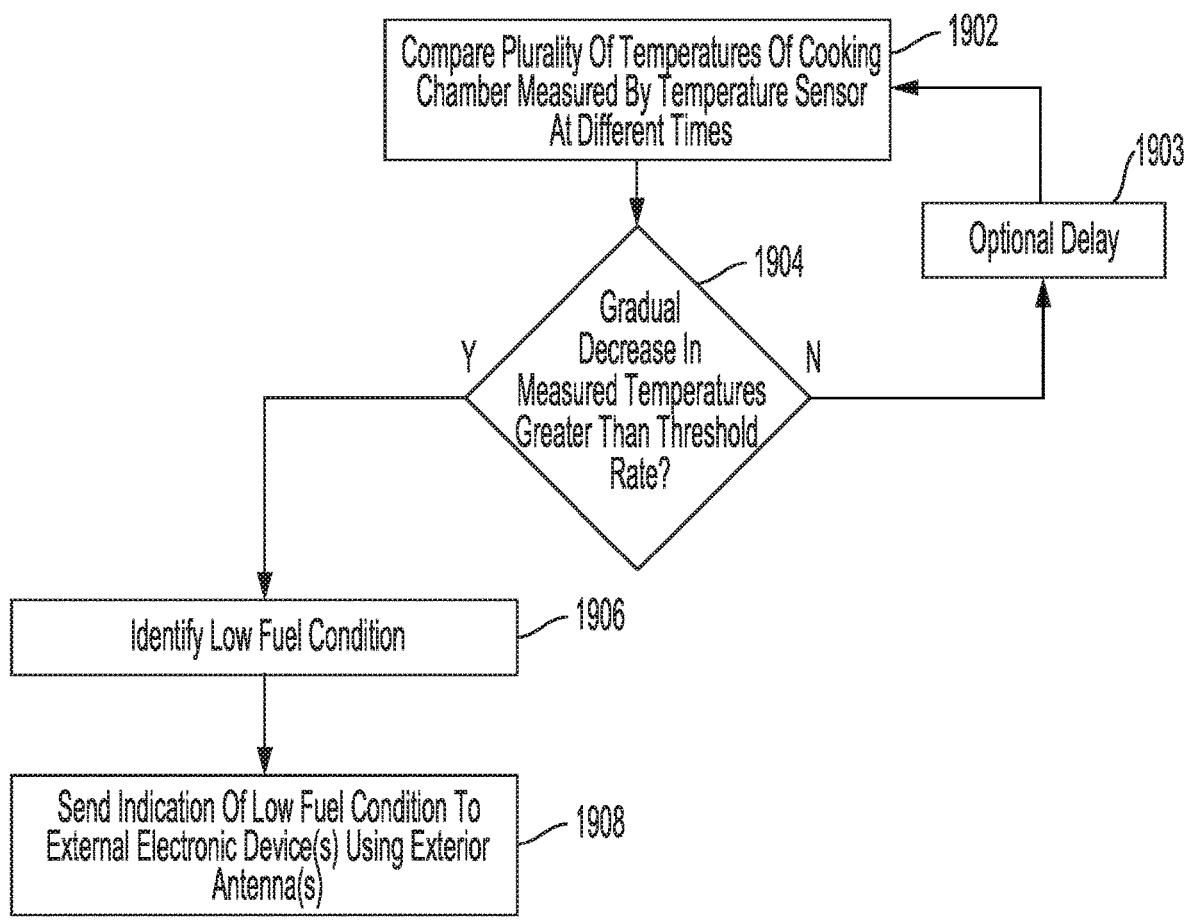
FIG. 19 is a flowchart for a low fuel detection process according to an embodiment.

FIG. 19 is a flowchart for a low fuel detection process according to an embodiment to detect when a fuel, such as charcoal or gas has run out. The process of FIG. 19 can be performed by, for example, a controller or control circuitry (e.g., SoC 1565 in FIG. 15) of a temperature sensing device executing a firmware of the temperature sensing device.

In block 1902, the control circuitry compares a plurality of temperatures of the cooking chamber measured by a temperature sensor (e.g., temperature sensor 1591 in FIG. 15) of the temperature sensing device at different times. The temperature sensing device may include a local memory or storage for storing temperature data indicating the ambient temperature of the cooking chamber at different times. For example, a memory of the temperature sensing device may retain temperature data for the past five minutes for detecting a low fuel condition and/or for providing the stored temperature data to external electronic devices.

An application executed at the external electronic device may use the temperature data to estimate a completion time for cooking food or to indicate a different stage in the cooking process or recipe, such as the end of preheating, a time to flip, baste, or move the food, or a searing stage. In cases where communication is lost with the external electronic device, the stored temperature data can be wirelessly sent by the temperature sensing device to make up for a lack of temperature data received by the external electronic device due to a lost signal.

With reference to the low fuel detection process of FIG. 19, the control circuitry in block 1904 determines whether there has been a gradual decrease in measured temperatures over a period of time that is greater than a threshold rate. For example, the control circuitry may compare temperatures in block 1902 to determine whether there has been a linear or nearly linear decrease in temperature over a five-minute period resulting in more than a 10-degree drop. In this regard, a temperature decrease that is too rapid may indicate a different condition, such as gas being shut off or the opening of a lid or door of the cooking appliance.

If it is determined that there has not been a gradual decrease in the measured temperature that is greater than the threshold rate, the process returns to block 1902 after an optional delay in block 1903 to compare a different plurality of temperatures over a different or shifted time period. In some implementations, the process of FIG. 19 may iterate or return to block 1902 from block 1904 in intervals equal to the period of time used to determine a rate of temperature decrease (e.g., every five minutes). In other implementations, the iterations of the process of FIG. 19 may occur more frequently than the period of time used to calculate the rate of temperature change.

If it is determined in block 1904 that there has been a gradual decrease in the measured temperature that is greater than the threshold rate, the process proceeds to block 1906 to identify the decrease in temperature as a low fuel condition. By considering the rate of change, it is ordinarily possible to discern between a more sudden decrease in temperature due to a change in a setting on the cooking appliance or an opening of a door or lid of the cooking appliance, as opposed to the more gradual decrease in heat caused by a low fuel condition.

In block 1908, the control circuitry sends an indication of a low fuel condition to one or more external electronic devices using one or more exterior antennas of the temperature sensing device. The external electronic devices may alert a user of the detected low fuel condition via an application executing on the external electronic device. In some implementations, the control circuitry of the temperature sensing device may also use at least one of a speaker and a light of the temperature sensing device to alert a user as to the low fuel condition. By using the foregoing low fuel detection process, it is ordinarily possible to automatically detect a low fuel condition before the temperature of the cooking chamber falls significantly so that a user can add more fuel for the cooking appliance (e.g., add more charcoal or attach a new propane tank).

Figure 20:
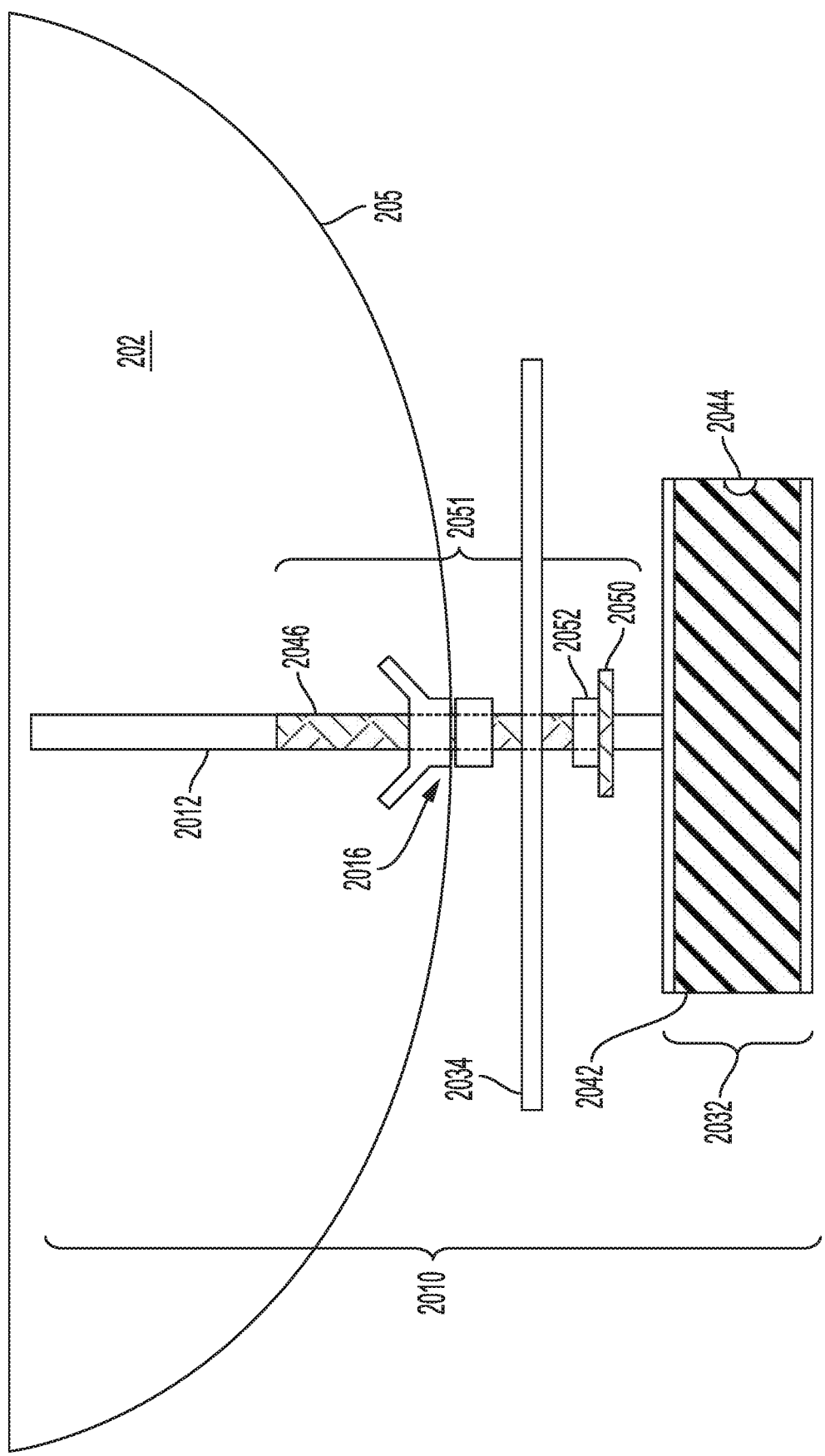
FIG. 20 is a side view of a temperature sensing device including a thermoelectric generator according to an embodiment.

FIG. 20 is a side view of temperature sensing device 2010 including thermoelectric generator 2051 according to an embodiment. Temperature sensing device 2010 is similar to temperature sensing device 1410 discussed above for FIG. 14B, but differs in that it includes thermoelectric generator 2051 for charging a battery of the temperature sensing device, such as battery 1574 in FIG. 15.

Thermoelectric generator 2051 includes first element 2046 located partially inside cooking chamber 202 and partially adjacent cooking chamber 202. First element 2046 conducts heat from cooking chamber 202 to generating component 2052 of thermoelectric generator 2051. In other implementations, first element 2046 may be located completely inside cooking chamber 202 or located completely adjacent to cooking chamber 202. First element 2046 can include, for example, a thermally conductive material such as aluminum or copper.

Thermoelectric generator 2051 also includes second element 2050 outside of cooking chamber 202. Second element 2050 serves as a heat sink for generating component 2052. As with first element 2046, second element 2050 can include a thermally conductive material, such as aluminum or copper. For its part, generating component 2052 can include a thermoelectric effect device, such as a Peltier device, by which a temperature difference is converted into a voltage due to electrons transferring from a hot side (i.e., first element 2046) to a cold side (i.e., second element 2050). In some implementations, the temperature difference between first element 2046 and second element 2050 during operation of cooking chamber 202 can be approximately a 40-degree Celsius temperature difference.

Heat shield 2034 of temperature sensing device 2010 can help maintain the temperature difference between first element 2046 and second element 2050. Generating component 2052 can also provide heat protection or insulation between first element 2046 and second element 2050. In addition, heat shield 2034 protects housing 2032 from heat coming from cooking chamber 202. Heat shield 2034 can help protect heat-sensitive electronics in housing 2032 from damage and can also allow for the safe use of adjustment ring 2042 by a user during operation of cooking appliance 200 so that the user is not burned by touching adjustment ring 2042.

The voltage generated by generating component 2052 is used to charge a battery of temperature sensing device 2010. This can allow for a longer timeframe of use between charging sessions from an external component, such as from an adapter plugged into a charger of the temperature sensing device, or before replacement of the battery in the case of a non-rechargeable battery.

In the example of FIG. 20, thermoelectric generator 2051 is shown as being primarily along temperature measurement probe 2012. In more detail, first element 2046 is located inside temperature measurement probe 2012, while generating component 2052 and second element 2050 are located in and surrounding temperature measurement probe 2012. In other implementations, one or both of generating component 2052 and second element 2050 can be located in housing 2032 of the temperature sensing device. In addition, other implementations may include multiple pairs of first elements and second elements with or without additional generating components to further increase the amount of voltage that can be generated for charging the battery.

As shown in FIG. 20, housing 2032 of temperature sensing device 2010 includes exterior antenna 2044, which can include, for example a slot antenna formed in a side of housing 2032. Other implementations may include a different type of exterior antenna or a different number of exterior antennas, which may or may not be exposed to an exterior surface of housing 2032.

In the example of FIG. 20, housing 2032 is mounted on lid 205 via coupling portion 2016, which fastens or attaches temperature sensing device 2010 to lid 205. In some implementations, coupling portion 2016 can include a threaded portion or opposing threaded portions that screw tight onto lid 205. In other implementations, coupling portion 2016 may be affixed onto lid 205, such as by welding or brazing. In other implementations, housing 2032 may be mounted on a different portion of a cooking appliance other than a lid or cover, such as on a side wall of the cooking appliance.

In addition to including first element 2046, temperature measurement probe 2012 of temperature sensing device 2010 further includes one or more temperature sensors configured to measure a temperature of cooking chamber 202. In addition, temperature measurement probe 2012 may also include an interior antenna for communicating with wireless devices inside cooking chamber 202. In some implementations, temperature measurement probe 2012 can include a hollow metal tube, such as a stainless-steel tube that includes a temperature sensor, such as a thermocouple, RTD, or thermistor as a temperature sensor inside the hollow tube.

Figure 21:
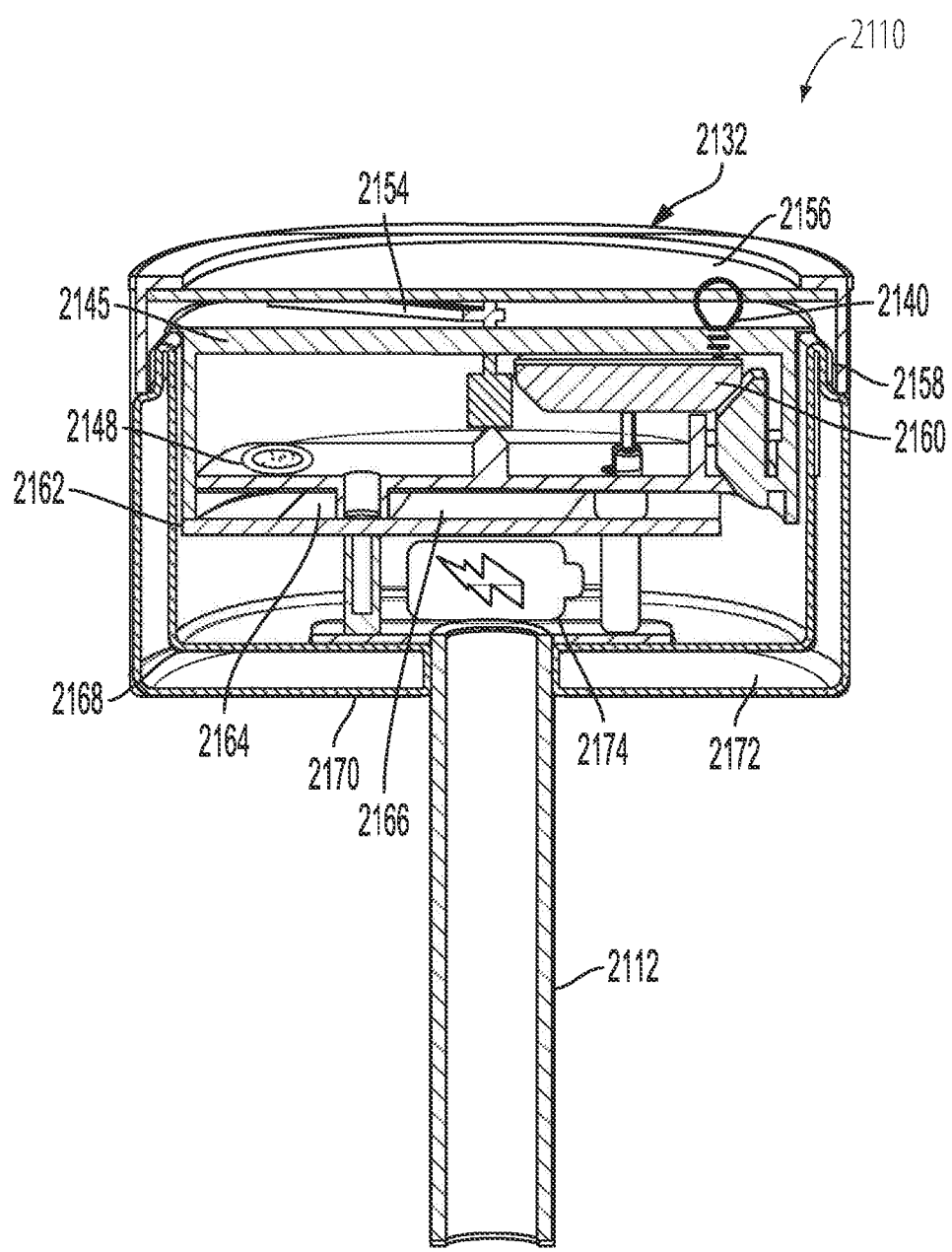
FIG. 21 is a side cross-section view of a temperature sensing device according to an embodiment.

FIG. 21 is a side cross-section view of temperature sensing device 2110 according to an embodiment. As shown in FIG. 21, temperature sensing device 2110 includes temperature gauge 2156 with needle 2154 configured to indicate a measured temperature of a cooking chamber on backing 2145. Temperature gauge 2156 also includes a window to protect housing 2132 from weather, while allowing a user to see the temperature indicated on backing 2145 by needle 2154. In addition, LED or light 2140 is visible through the window of temperature gauge 2156. As noted above, light 2140 can be used to indicate an alert condition or other condition of temperature sensing device 2110 or of a cooking chamber. Backing 2145 may also include one or more exterior antennas for communicating with an external electronic device, such as a smartphone. In addition, at least a portion of backing 2145 may include a photovoltaic cell for charging battery 2174.

Housing 2132 can include a two-part construction, with a bottom container portion and a top portion screwed onto or otherwise attached to the bottom portion at attachment location 2158. In some implementations, the bottom portion of housing 2132 can be threaded.

Motor 2160 inside housing 2132 is configured to actuate needle 2154 based on an input received from control circuitry 2164 on PCBA 2162. In other implementations, motor 2160 and needle 2154 may be omitted or replaced by a digital display, such as display 1436 in FIG. 14A.

Speaker 2148 is coupled to PCBA 2162 and allows control circuitry 2164 to audibly indicate an alert or other condition. Light 2140 is also coupled to PCBA 2162 for control-by-control circuitry 2164. In the example of FIG. 21, PCBA 2162 also includes memory 2166, which may be used to store temperature data received from a temperature sensor of temperature measurement probe 2112 and/or other data, such as cooking parameters received from an external electronic device or temperature data received from a wireless device inside a cooking chamber. In some implementations, memory 2166 may include a non-volatile memory such as a flash memory or may include a volatile memory such as a Dynamic Random-Access Memory (DRAM).

Housing 2132 in FIG. 21 is also shown as having battery 2174 for providing power to various components of temperature sensing device 2110, such as control circuitry 2164, memory 2166, an exterior antenna, a temperature sensor, speaker 2148, motor 2160, and light 2140. In some implementations, housing 2132 may be removable from temperature measurement probe 2112 to facilitate replacement or charging of battery 2174, such as by wireless charging or by a plug for charging battery 2174.

As shown in FIG. 21, housing 2132 includes an insulating layer 2172 outside interior wall 2168 of housing 2132. In the example of FIG. 21, insulating layer 2172 is located between interior wall 2168 and exterior wall 2170, and can include properties for protecting heat sensitive electronics, such as battery 2174, control circuitry 2164, memory 2166, and motor 2160, from heat received from the cooking appliance. Even in implementations where electronics within housing 2132 provide a relatively high temperature operation, such as an upper operating temperature of 85 degrees Celsius, temperatures within housing 2132 can exceed such high temperature operating conditions without insulating layer 2172 when mounted on a cooking appliance. Insulating layer 2172 can include, for example, a vacuum space, an air gap, an aerogel material, a mineral wool material, or a polyurethane foam.

Exterior wall 2170 can include a material such as stainless steel for its durability and its heat reflective properties, while interior wall 2168 can include a different material with greater heat reflective properties but lower durability. For example, interior wall 2168 can include a material such as copper or gold for its greater heat reflective properties. In this regard, interior wall 2168 can include a heat reflective surface facing an exterior surface of the cooking appliance to reflect heat away from the interior of housing 2132. By using the double wall construction shown in FIG. 21, it is possible to significantly increase the amount of heat reflected away from the interior of the housing by having an interior wall with a heat reflective surface and an exterior wall with a heat reflective surface. In some implementations, the outside of interior wall 2168 adjacent to insulating layer 2172 or at least a bottom portion of interior wall 2168 facing a cooking appliance can be lined with a heat reflective film or coating, such as a MYLAR® coating or heat reflective paint.

As discussed above, the foregoing use of insulating layer 2172, one or more heat reflective surfaces, and/or the double walled construction of housing 2132 improves the heat resistance of the interior of housing 2132, thereby making it possible to include electronics inside housing 2132 that would otherwise become damaged or malfunction when exposed to heat if in a conventional housing mounted on a cooking appliance.

Figure 22:
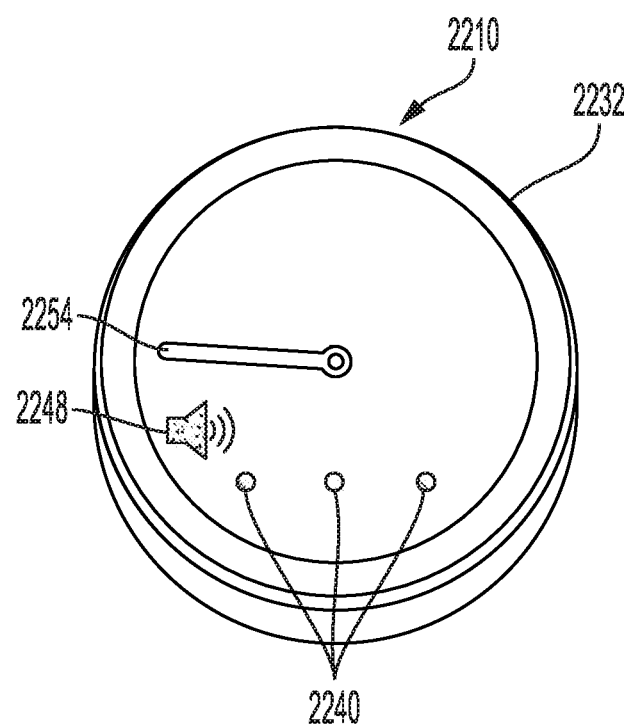
FIG. 22 is a top view of a temperature sensing device according to an embodiment.

FIG. 22 is a top view of temperature sensing device 2210 according to an embodiment. In the example of FIG. 22, housing 2232 includes needle 2254, speaker 2248, and lights or LED indicators 2240. As discussed above, needle 2254 is actuated by a motor powered by a battery inside housing 2232. Needle 2254 can be used to indicate a temperature of a cooking chamber measured by temperature sensing device 2310.

Speaker 2248 and/or one or more of LED indicators 2240 can be used to indicate an alert, such as the low temperature alert or high temperature alert, discussed above with reference to the processes of FIGS. 18A and 18B. In other cases, speaker 2248 and/or one or more of LED indicators 2240 can be used to indicate a condition, such as the low fuel condition discussed above with reference to the process of FIG. 19. Other conditions can include, for example, a low battery condition of temperature sensing device 2210, or a lost or weak signal with a wireless device inside a cooking chamber or an external electronic device outside the cooking appliance. In addition, temperature sensing device 2210 may also wirelessly send an alert or indication of a condition to one or more external electronic devices for an audible or visual indication by the external electronic device.

Figure 23:
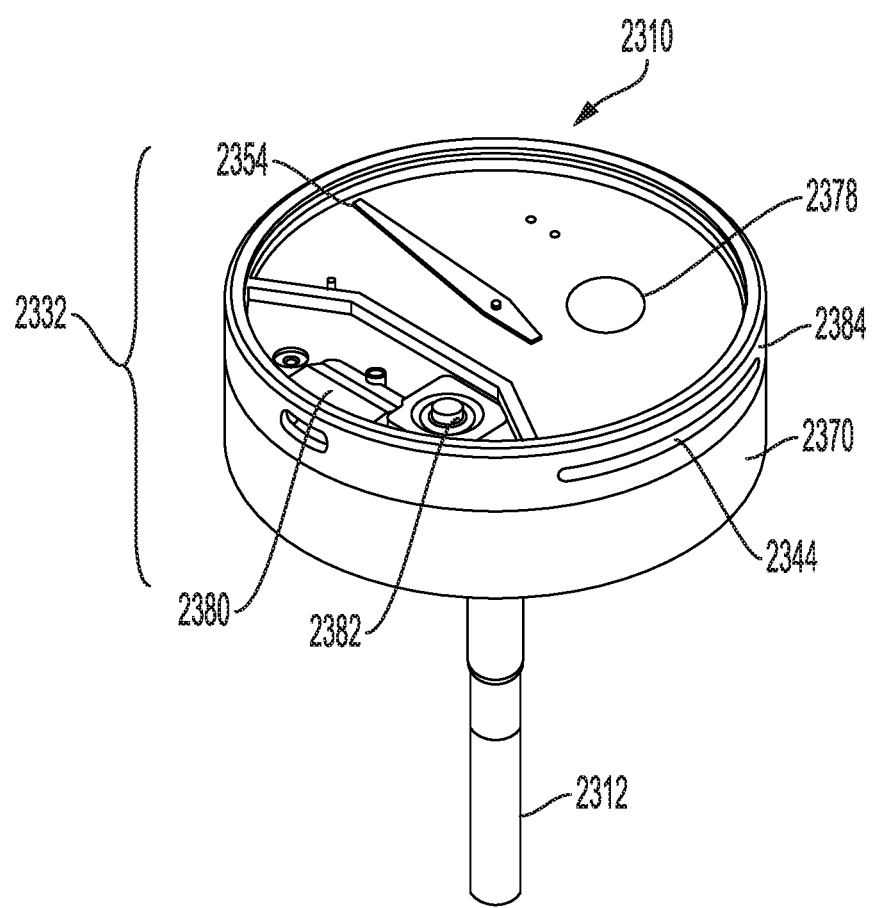
FIG. 23 is a perspective of a temperature sensing device with a gauge backing removed according to an embodiment.

FIG. 23 is a perspective of temperature sensing device 2310 with a gauge backing removed according to an embodiment. As shown in FIG. 23, temperature sensing device 2310 includes temperature measurement probe 2312 and housing 2332. Charger 2380 can be externally accessed via an opening in top portion 2384 of housing 2332. A battery of temperature sensing device 2310 inside housing 2332 can be charged by connecting charger 2380 to a power outlet or other power source, such as a laptop. Charger 2380 can include, for example, a USB Type-C connector or another USB form factor. In some implementations, the connection provided by charger 2380 may also be configured to receiving firmware updates, such as from a desktop or laptop.

In some implementations, housing 2332 may be removable from temperature measurement probe 2312, such as by unscrewing or unfastening housing 2332 from temperature measurement probe 2312, to facilitate charging the battery of temperature sensing device 2310. In some cases, a battery of temperature sensing device 2310 may be wirelessly charged using inductive charging, such as via a charger employing the Qi wireless charging standard, for example.

Temperature sensing device 2310 also includes photovoltaic cell 2378 for charging the battery. In the example of FIG. 23, photovoltaic cell 2378 is mounted beneath the backing (not shown in FIG. 23) of the gauge, which has a hole so that photovoltaic cell 2378 is exposed to the sun.

In addition, temperature sensing device 2310 includes multifunction button 2382, which can be configured to, for example, check a battery charge level, wake up temperature sensing device 2310 from a low power mode, or perform a factory reset to restore temperature sensing device 2310 to default settings. In some implementations, a glass or plastic window may cover the area above the range of motion for needle 2354, while an opaque material may cover the area above multifunction button 2382 and allow for a user to press button 2382.

Slot antenna 2344 is formed in the side of top portion 2384 of housing 2332. As discussed above, the temperature sensing devices disclosed herein can include one or more exterior antennas for wirelessly communicating with one or more external electronic devices, such as smartphones, tablets, laptops, or a charger for a wireless food thermometer. In other implementations, antenna 2344 may be located on the backing of the temperature gauge or on bottom portion 2370 of housing 2332.

Figure 24:
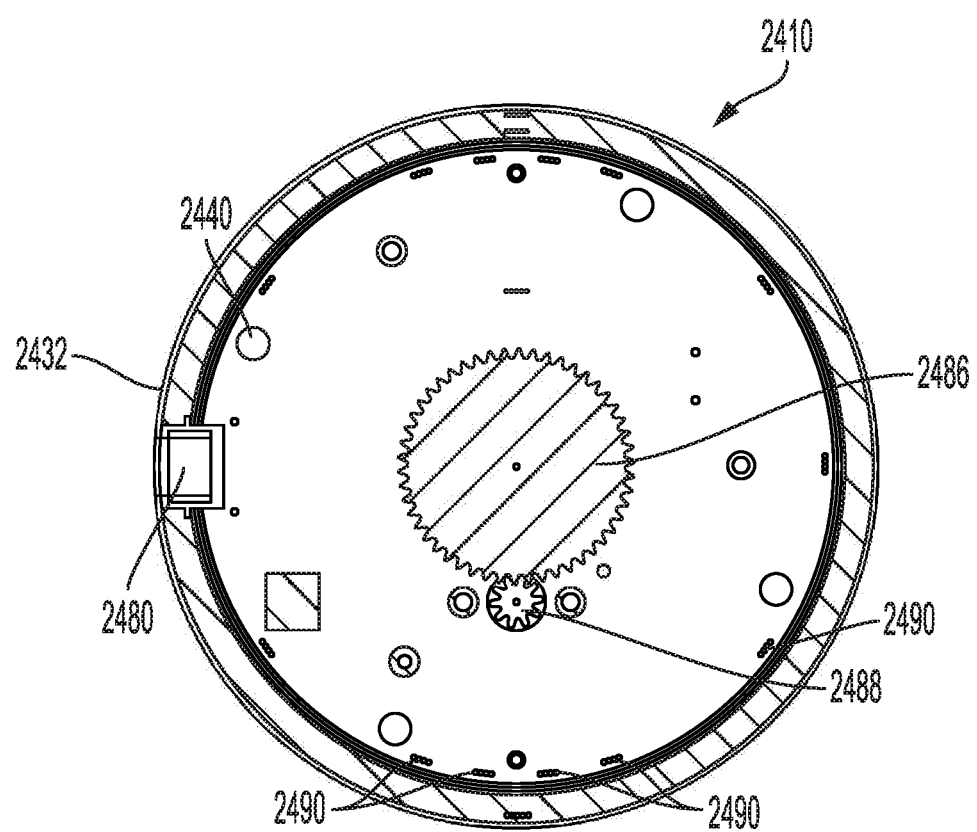
FIG. 24 is a top cross-section view of a temperature sensing device according to an embodiment.

FIG. 24 is a top cross-section view of temperature sensing device 2410 according to an embodiment. As shown in FIG. 24, temperature sensing device 2410 includes LED indicator 2440 for indicating an alert or condition, as discussed above. In addition, temperature sensing device 2410 includes charger 2480, which can provide externally supplied power for charging a battery of temperature sensing device 2410. In some implementations, charger 2480 may also serve as an input for updating a firmware of temperature sensing device 2410. In other implementations, charger 2480 may be omitted or may only serve as an input for wired communications, as opposed to charging a battery of temperature sensing device 2410. In such implementations, a battery of temperature sensing device 2410 may not be rechargeable or may be wirelessly charged.

In the example of FIG. 24, ground connections 2490 provide a ground connection from a PCBA of temperature sensing device 2410 to the main body of housing 2432, which can include a conductive metal construction. Ground connections 2490 may also serve as a ground for one or more antennas of temperature sensing device 2410, such as for an interior cooking chamber antenna and an exterior antenna for communication outside of the cooking appliance.

Temperature sensing device 2410 also includes motor output shaft gear 2488, which engages with and drives needle shaft gear 2486 for moving a needle to indicate a temperature measured by a temperature sensor of temperature sensing device 2410. In other implementations, such as where a digital display is used to display a measured temperature, motor output shaft gear 2488 and needle shaft gear 2486 can be omitted.

In the example of FIG. 24, the use of a motor to digitally control movement of motor output shaft gear 2488 and needle shaft gear 2486 ordinarily improves the accuracy of temperature readings from temperature sensing device 2410, as compared to conventional cooking appliance gauges that use thermomechanical actuation to move a needle. In such conventional temperature gauges, the materials used to actuate a needle, such as a bimetal construction, lose accuracy over time as the properties of the materials change due to the high heat conditions in the cooking chamber. The use of an insulating layer combined with any of a heat shield, double walled construction including an interior wall reflective surface, and a phase change material inside of the housing (as discussed in more detail below with reference to FIG. 27), can ordinarily provide a safe operating environment inside the housing for electronics that are not found in conventional temperature gauges mounted on a cooking appliance.

Figure 25A:
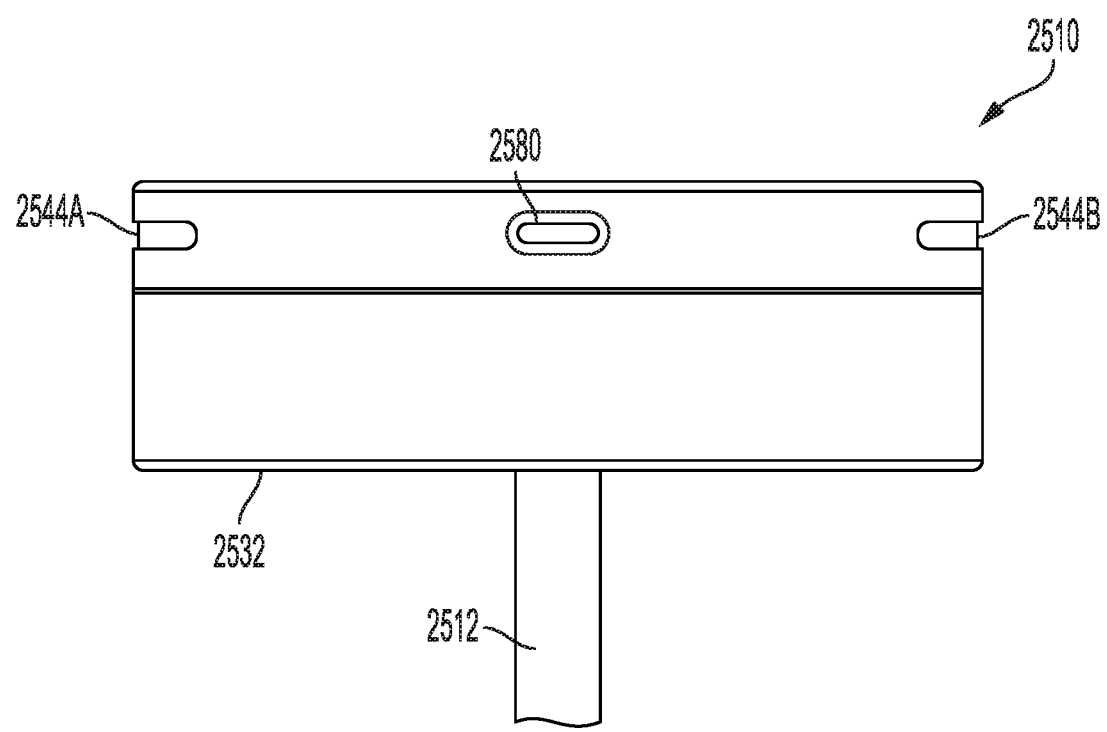
FIG. 25A is a side view of a temperature sensing device including a USB connector according to an embodiment.

FIG. 25A is a side view of temperature sensing device 2510 including housing 2532 and temperature measurement probe 2512 according to an embodiment. Similar to other temperature sensing devices discussed above, USB connector 2580 in housing 2532 can allow for charging of a battery of temperature sensing device 2510 from an external power supply. In addition, USB connector 2580 can allow for updates to a firmware of temperature sensing device 2510 via a USB cable or USB flash drive.

Figure 25B:
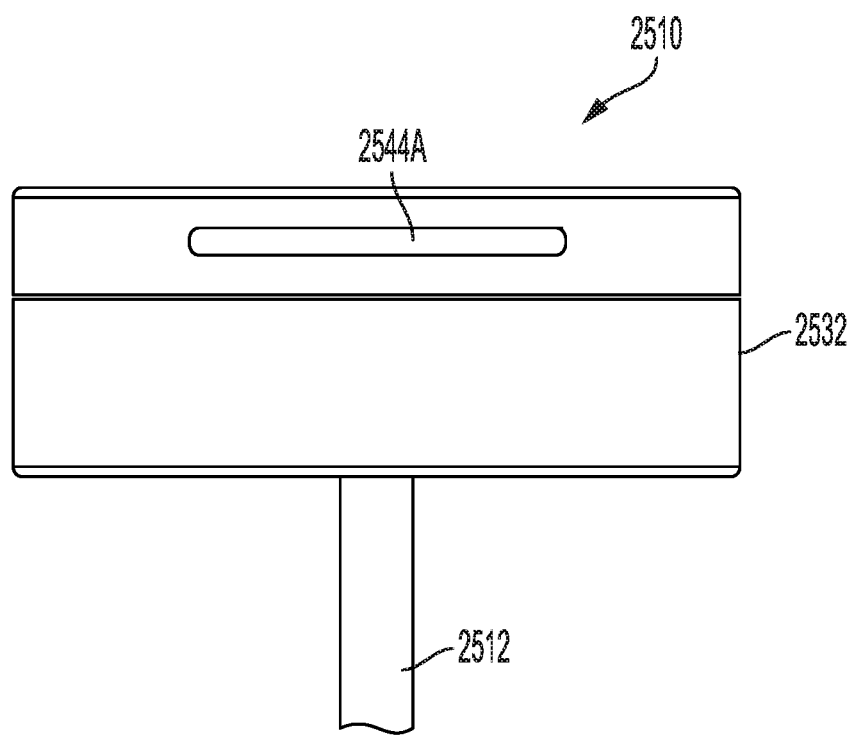
FIG. 25B is a side view of a temperature sensing device including a slot antenna according to an embodiment.

As shown in the example of FIG. 25A, temperature sensing device 2510 includes two exterior slot antennas 2544A and 2544B on opposite sides of a top portion of housing 2532. This arrangement of antennas 2544A and 2544B on opposing sides of temperature sensing device 2510 can provide a wider range for wireless communication with external electronic devices, such as smartphones, tablets, laptops, or a charger for a wireless food thermometer. FIG. 25B provides a side view of temperature sensing device 2510 showing the full length of the portion of slot antenna 2544A that is exposed to an exterior of housing 2532 according to an embodiment.

Figure 26:
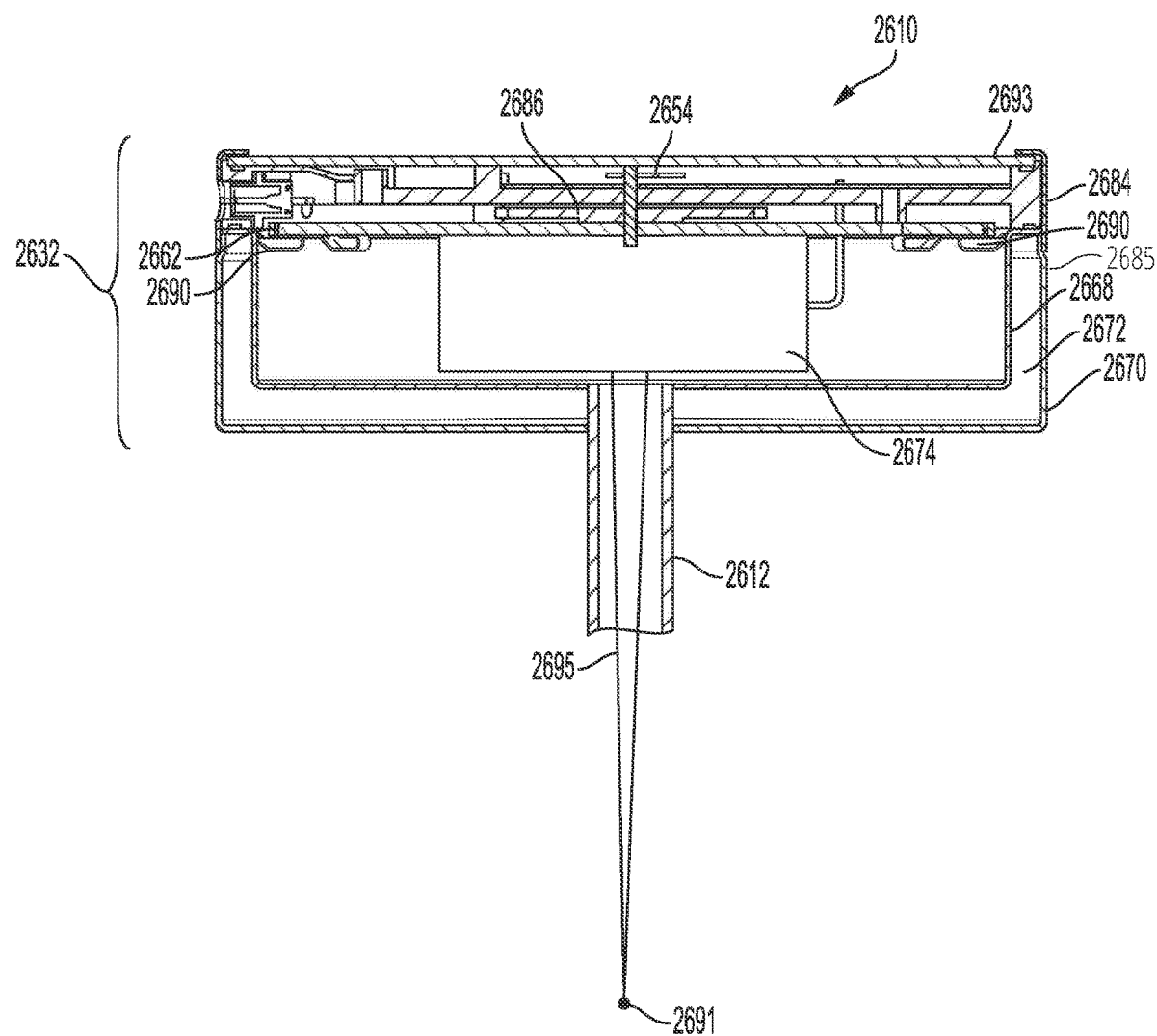
FIG. 26 is a side cross-section view of a temperature sensing device including an insulating layer according to an embodiment.

FIG. 26 is a side cross-section view of temperature sensing device 2610 including insulating layer 2672 according to an embodiment. As shown in FIG. 26, temperature sensing device 2610 includes needle and shaft assembly 2654 configured to indicate a measured temperature of a cooking chamber through window 2693. Needle and shaft assembly 2654 is actuated by needle and shaft gear 2686, which is driven by a motor (not shown) in housing 2632 via one or more gear stages.

Housing 2132 can include a two-part construction, with a bottom portion 2685 and a top portion 2684 screwed onto or otherwise attached to bottom portion 2685. In some implementations, top portion 2684 and bottom portion 2685 of housing 2132 can be threaded. In other implementations, top portion 2684 may be attached onto bottom portion 2685 using a press fitting, tabs, an adhesive, or by brazing or welding the portions together.

In the example of FIG. 26, temperature sensing device 2610 includes spring loaded ground contacts 2690, which provide an electrical ground for circuitry on PCBA 2662 between PCBA 2662 and housing 2632. The circuitry on PCBA 2662 and the motor used to actuate needle and shaft assembly 2654 is powered by battery 2674, which can include, for example, a lithium battery for relatively fast charging, long life, and extreme temperature operation. Battery 2674 may also power other components of temperature sensing device 2610, such as one or more exterior antennas, temperature sensor 2691, a speaker and/or one or more lights.

As shown in FIG. 26, housing 2632 includes insulating layer 2672 outside interior wall 2668 of housing 2632. In the example of FIG. 26, insulating layer 2672 is located between interior wall 2668 and exterior wall 2670, and can include properties for protecting heat sensitive electronics, such as battery 2674 and circuitry on PCBA 2662, from heat coming from the cooking appliance. Insulating layer 2672 can include, for example, a vacuum space, an air gap, an aerogel material, a mineral wool material, or a polyurethane foam.

Exterior wall 2670 can include a material such as stainless steel for its durability and its heat reflective properties, while interior wall 2668 can include a different material with greater heat reflective properties but lower durability. For example, interior wall 2668 can include a material such as copper or gold for its greater heat reflective properties. In this regard, interior wall 2668 can include a heat reflective surface facing an exterior surface of the cooking appliance to reflect heat away from the interior of housing 2632. By using the double wall construction shown in FIG. 26, it is possible to significantly increase the amount of heat reflected away from the interior of the housing by having an interior wall with a heat reflective surface and an exterior wall with a heat reflective surface. In some implementations, the outside of interior wall 2668 adjacent to insulating layer 2672 or at least a bottom portion of interior wall 2668 facing a cooking appliance can be lined with a heat reflective film or coating, such as a MYLAR® coating or heat reflective paint.

Temperature measurement probe 2612 may include a material or a separate insulating layer inside temperature measurement probe 2612 to reduce heat from the cooking chamber from entering into housing 2632. As shown in FIG. 26, the interior of temperature measurement probe 2612 includes temperature sensor wiring 2695 for receiving temperature data or measurements from temperature sensor 2691. As discussed in more detail below with reference to FIGS. 28 and 29, temperature sensor wiring, such as temperature sensor wiring 2695, in some implementations may also serve as an interior cooking chamber antenna for wirelessly communicating with wireless devices (e.g., wireless food thermometers) inside the cooking chamber.

The foregoing use of insulating layer 2672, one or more heat reflective surfaces, and/or the double walled construction of housing 2632 improves the heat resistance of the interior of housing 2632, thereby making it possible to include electronics inside housing 2632 that would otherwise become damaged or malfunction when exposed to heat in a conventional housing mounted on a cooking appliance.

Figure 27:
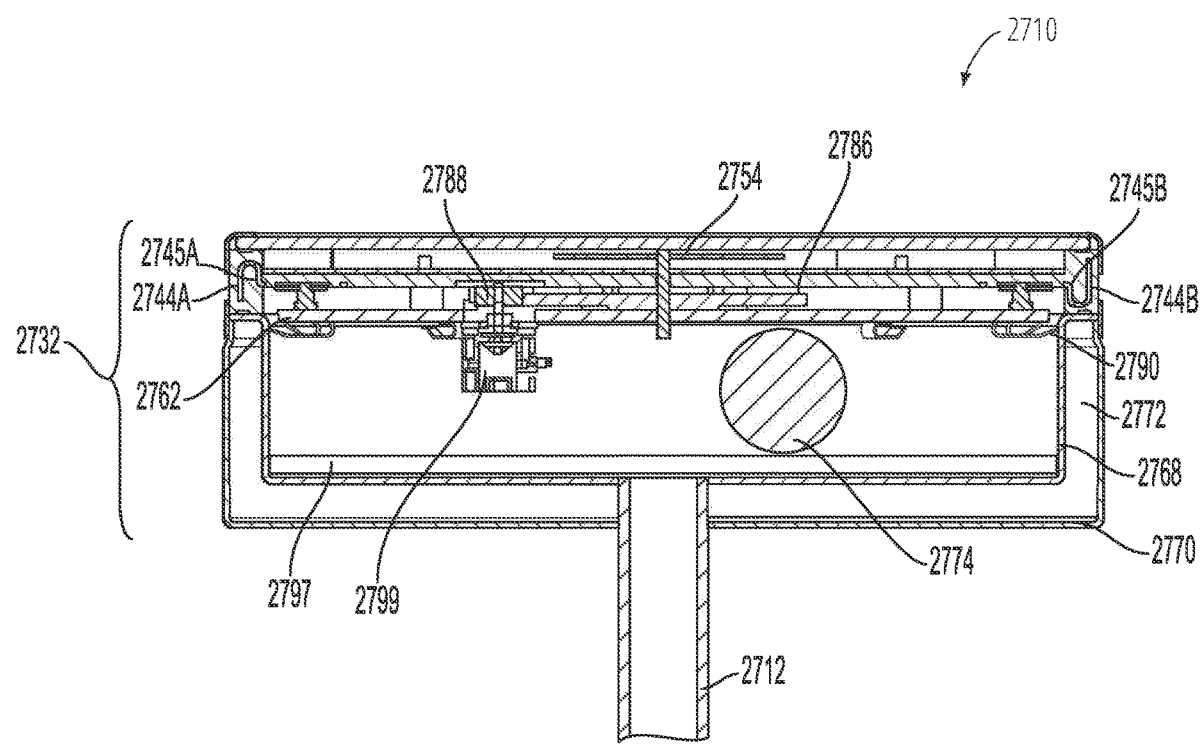
FIG. 27 is a side cross-section view of a temperature sensing device including a phase change material according to an embodiment.

FIG. 27 is a side cross-section view of temperature sensing device 2710 according to an embodiment where housing 2732 includes phase change material 2797 for absorbing heat. Phase change material 2797 can include, for example, paraffin that changes state at a particular melting point while absorbing heat. In this regard, phase change material 2797 may change from a solid state to a liquid state while absorbing a latent heat that does not change the temperature of phase change material 2797. Phase change material 2797 may be encapsulated in an outer shell of plastic or metal to contain the resulting liquid. The use of phase change material 2797 can act as a buffer to provide for additional thermal protection in cases where housing 2732 heats up to temperatures that approach an unsafe operating temperature for electronics that could overheat in housing 2732. The selection of a material for phase change material 2797 can depend on the heat sensitivity of the electronics in housing 2732. For example, the melting point of phase change material 2797 may correspond to an approximate temperature for a maximum operating temperature for battery 2774. In some cases, phase change material 2797 can provide protection against short-term, high heat conditions, such as a flare up in the cooking chamber.

In the example of FIG. 27, temperature sensing device 2710 also includes insulating layer 2772, defined by interior wall 2768 and exterior wall 2770 of housing 2732. Insulating layer 2772 provides thermal protection for the electronics in housing 2732, and can include, for example, a vacuum space, an air gap, an aerogel material, a mineral wool material, or a polyurethane foam. Temperature measurement probe 2712 may also include a material or a separate insulating layer inside temperature measurement probe 2712 to reduce heat from the cooking chamber entering into housing 2732.

Exterior wall 2770 can include a material such as stainless steel for its durability and its heat reflective properties, while interior wall 2768 can include a different material with greater heat reflective properties but lower durability. For example, interior wall 2768 can include a material such as copper or gold for its greater heat reflective properties. In this regard, interior wall 2768 can include a heat reflective surface facing an exterior surface of the cooking appliance to reflect heat away from the interior of housing 2732. In some implementations, the outside of interior wall 2768 adjacent to insulating layer 2772 or at least a bottom portion of interior wall 2668 facing a cooking appliance can be lined with a heat reflective film or coating, such as a MYLAR® coating or heat reflective paint. An outside surface of exterior wall 2770 may also include a heat reflective film or coating facing the cooking appliance. In addition, some implementations of temperature sensing device 2710 may include a heat shield between housing 2732 and the cooking appliance, such as heat shield 1234 in FIG. 12, heat shield 1434 in FIG. 14B, or heat shield 2034 in FIG. 20.

The cross-section view of FIG. 27 is in a different orientation than the cross-section view of FIG. 26. In this regard, battery 2774 is viewed across its circumference, as opposed to along its length, and motor 2799 can be seen in FIG. 27. Motor 2799 is powered by battery 2774 and controlled by control circuitry on PCBA 2762. Motor 2799 may include, for example, a low power DC motor. An output shaft of motor 2799 drives output gear 2788, which in turn, engages and drives needle shaft gear 2786, which rotates needle 2754 to indicate a temperature.

In addition to controlling movement of needle 2754, control circuitry on PCBA 2762 controls wireless communication with external electronic devices, such as smartphones, via exterior antennas 2745A and 2745B. As shown in FIG. 27, openings 2744A and 2744B allow for propagation of wireless signals from exterior antennas 2745A and 2745B outside of housing 2732. The exterior antennas and the control circuitry on PCBA 2762 are electrically grounded to interior wall 2768 via ground contact springs 2790. In the example of FIG. 27, interior wall 2768 connects to exterior wall 2770 and both walls are comprised of metal to provide for grounding.

Figure 28:
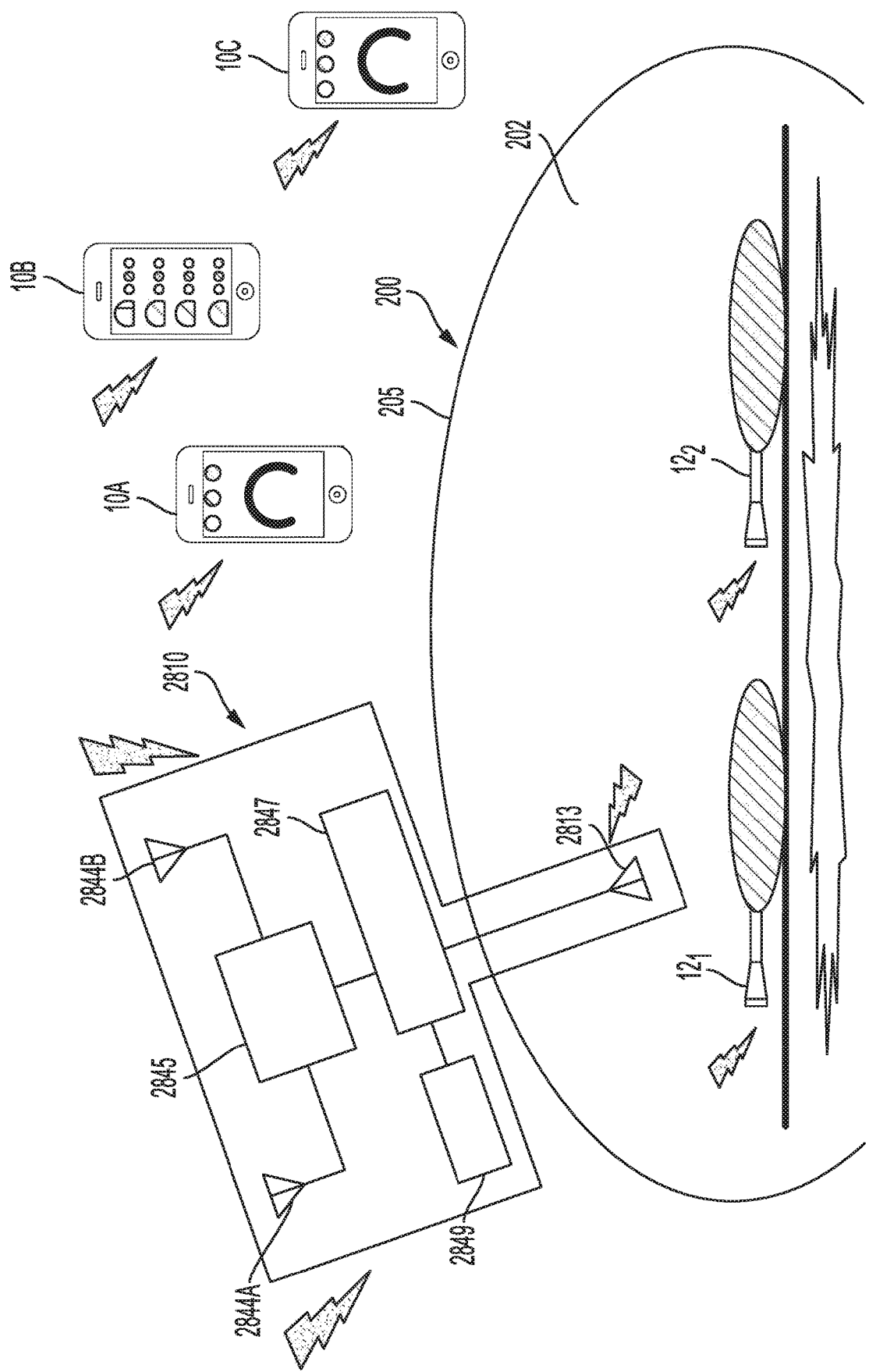
FIG. 28 illustrates an example of two wireless devices inside a cooking appliance and a wireless signal repeater for the cooking appliance including multiple exterior antennas that wirelessly communicate with remote external electronic devices outside of the cooking appliance.

FIG. 28 illustrates an example of wireless food thermometer $12_1$ and wireless food thermometer $12_2$ inside cooking appliance 200 and wireless signal repeater 2810 mounted on lid or wall 205 of cooking appliance 200 to transmit signals through lid or wall 205. As shown in FIG. 28, wireless signal repeater 2810 includes exterior antennas 2844A and 2844B that wirelessly communicate with remote external electronic devices 10A, 10B, and 10C outside of cooking appliance 200. In addition, wireless signal repeater 2810 includes interior cooking chamber antenna 2813 extending into cooking chamber 202. In some implementations, interior cooking chamber antenna 2813 may be located in a temperature measurement probe that includes a temperature sensor configured to measure an ambient temperature of cooking chamber 202. In this regard, wireless signal repeater 2810 can also serve as a temperature sensing device in some implementations.

In the example of FIG. 28, wireless signal repeater 2810 includes filter 2847 for separating control circuitry 2849 and antenna circuitry 2845. In some implementations, control circuitry 2849 or other circuitry of wireless signal repeater 2810 can include RF power coupling circuitry for splitting power between interior antenna 2813 on one hand, and exterior antennas 2844A and 2844B on the other hand. In some implementations, more power is provided to exterior antennas 2844A and 2844B than to interior antenna 2813, since the distance between interior antenna 2813 and wireless devices inside cooking chamber 202, such as food thermometers $12_1$ and $12_2$, is less than a typical distance between exterior antennas 2844A and 2844B and external electronic devices, such as external electronic devices 10A, 10B, and 10C.

Control circuitry 2849 may control processing and retransmission of signals received via either exterior antennas 2844 or interior antenna 2813. In this regard, the wireless communication in FIG. 28 is two-way in that external electronic devices 10 may send signals to wireless signal repeater 2810 for wireless retransmission to food thermometers 12 in some cases, and food thermometers 12 may send signals to wireless signal repeater 2810 for wireless retransmission to external electronic devices 10. Control circuitry 2849 may analyze packet headers or other data included in the received signals to determine whether the signals will be retransmitted, as opposed to retaining the data in a local memory or storage of wireless signal repeater 2810. For example, in an implementation where wireless signal repeater 2810 performs a low fuel condition detection process as in FIG. 19 discussed above, wireless signal repeater 2810 may store temperature data received from food thermometers 12 indicating an ambient temperature of cooking chamber 202 to determine if there is a low fuel condition.

In some implementations, control circuitry 2849 can include, for example, BLUETOOTH® RF circuitry for BLUETOOTH® wireless communications. Such circuitry may be located on a PCBA of a housing of wireless signal repeater 2810, such as PCBA 2162 in FIG. 21, PCBA 2662 in FIG. 26, or PCBA 2762 in FIG. 27. In such examples, control circuitry 2849 may form part of a larger chip, such as an SoC or may be a separate chip on a PCBA. In some implementations, control circuitry 2849 may convert the received signals from one wireless communication protocol to a different wireless communication protocol, such as from a BLUETOOTH® protocol to a Wi-Fi protocol.

Wireless signal repeater 2810 also includes antenna circuitry 2845. In some implementations, antenna circuitry 2845 can include a multiplexer or switch for selecting between using exterior antenna 2844A or exterior antenna 2844B to send and/or receive a signal. In other implementations, antenna circuitry 2845 may include a coupling circuit to mix signals received and/or sent by exterior antennas 2844A and 2844B, or a combine both a multiplexer or switch and a coupling circuit or mixer. As discussed above, multiple exterior antennas can extend the range of wireless signal repeater 2810 to improve wireless communication with external electronic devices, such as external electronic devices 10. However, as will be appreciated by those of ordinary skill in the art, other embodiments of wireless signal repeater 2810 may only include one exterior antenna 2844.

In addition, antenna circuitry 2845 may process signals from interior antenna 2813. For example, antenna circuitry 2845 may mix or change a frequency of a signal received by interior antenna 2813 or process a signal for transmission to a wireless device inside cooking chamber 202, such as to food thermometers $12_1$ and/or $12_2$.

Figure 29:
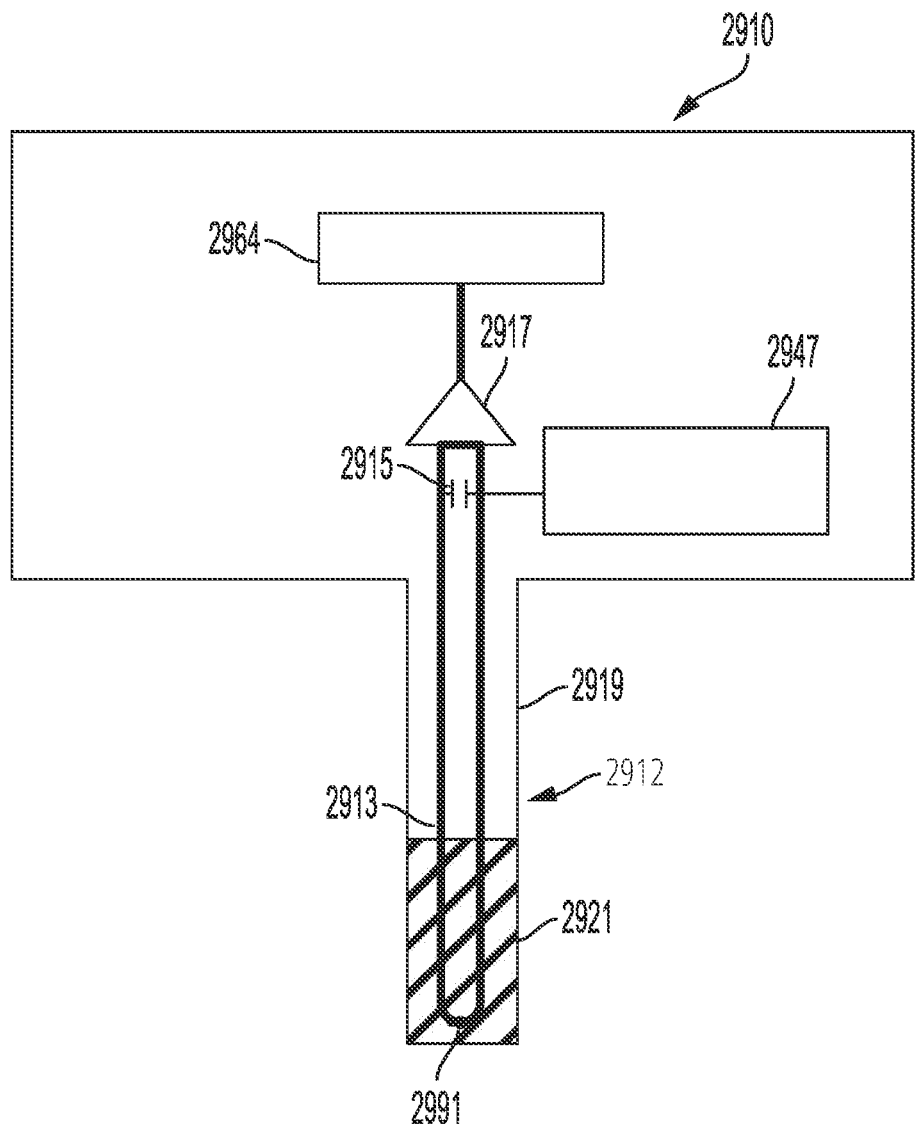
FIG. 29 is a diagram showing an arrangement of components inside a temperature sensing device that serves as a wireless signal repeater according to an embodiment.

FIG. 29 is a diagram showing an arrangement of components inside temperature sensing device 2910, which serves as a wireless signal repeater according to an embodiment. In cases where wireless signal repeater 2810 of FIG. 28 includes a temperature sensor for measuring an ambient cooking chamber temperature, the arrangement shown in FIG. 29 can be included in wireless signal repeater 2810.

As shown in FIG. 29, coupling 2915 provides an in-phase signal to RF circuitry 2947 for one or more exterior antennas of temperature sensing device, such as exterior antennas 2844 in FIG. 28. RF circuitry 2947 may include, for example, one or more filters and an amplifier, or other circuitry for providing a signal for transmission from an exterior antenna.

Interior antenna 2913 also serves as wiring for temperature sensor 2991, which is configured to measure an ambient temperature of a cooking chamber. Temperature sensor 2991 and interior antenna 2913 are located inside temperature measurement probe 2912, which can include, for example, hollow metal container 2919 and ceramic container 2921 at a distal end of temperature measurement probe 2912. Temperature sensor 2991 can include an RTD sensor or a thermistor. In other implementations, interior antenna 2913 can include thermocouple wires for measuring temperature and for receiving and sending wireless signals inside the cooking chamber.

Thermocouple 2917 can provide an electrical signal or temperature dependent voltage from interior antenna 2913 or temperature sensor 2991 to temperature measurement circuitry 2964. Interior antenna 2913 can be, for example, a monopole antenna. As will be appreciated by those of ordinary skill in the art, other types of antennas may be used as an interior antenna, as discussed above.

The arrangement shown in FIG. 29 of using temperature sensor wiring or the temperature sensor itself as an interior antenna can reduce the amount of wiring needed to provide temperature measurements and wireless communication with wireless devices inside the cooking chamber. In addition, electrical interference or noise can be reduced by having a dual function for temperature sensor wiring as sensor wiring and as an interior cooking chamber antenna. Such interference or noise could otherwise be a problem when temperature sensor wiring and an antenna are enclosed in the same tight space of a temperature measurement probe.

As discussed above, the foregoing examples of wireless signal repeaters, apertures, reflectors, and/or temperature sensing devices that act as wireless signal repeaters ordinarily improve the signal strength and range for wireless devices located inside a cooking appliance, such as those in an oven, grill, or smoker. This can allow a remote device communicating with the wireless device inside the cooking appliance to be located farther from the cooking appliance while still communicating with the wireless device inside the cooking appliance.

In addition, the use of an insulating layer, phase change material, and/or one or more heat reflective surfaces allow for heat-sensitive electronics, such as a battery, memory, motor, and control circuitry, to be included in a housing that is mounted on a cooking appliance. The resulting electrical control and temperature measurement of a cooking chamber temperature can then provide a more accurate indication of the temperature inside the cooking chamber over the life of the temperature sensing device.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A temperature sensing device for use with a cooking appliance, the temperature sensing device comprising:
   a temperature sensor configured to measure a temperature of a cooking chamber of the cooking appliance;
   a housing configured to be mounted on the cooking appliance;
   a temperature gauge including a needle configured to indicate the measured temperature of the cooking chamber;
   a motor inside the housing and configured to actuate the needle of the temperature gauge; and
   a phase change material located between the motor and an exterior surface of the cooking appliance, the phase change material is configured to absorb heat from the cooking appliance without an increase temperature thereof at a phase change temperature of the phase change material.

2. The temperature sensing device of claim 1, further comprising an insulating layer outside an interior wall of the housing.

3. The temperature sensing device of claim 2, wherein the insulating layer includes a vacuum space, an air gap, an aerogel material, a mineral wool material, or a polyurethane foam.

4. The temperature sensing device of claim 2, wherein the interior wall includes a heat reflective surface facing an exterior surface of the cooking appliance.

5. The temperature sensing device of claim 1, further comprising: a battery configured to provide power to the motor; and
   control circuitry located in the housing that is configured to:
      determine that a power level from the battery has fallen below a threshold power level or that at least a portion of the control circuitry has been powered for more than a predetermined period of time; and
      power off the at least a portion of the control circuitry in response to determining that the power level has fallen below the threshold power level or that the at least a portion of the control circuitry has been powered for more than the predetermined period of time.

6. The temperature sensing device of claim 1, further comprising: a battery configured to provide power to the motor; and
   a thermoelectric generator including a first element with at least a portion thereof adjacent to or inside the cooking chamber and a second element outside the cooking chamber, wherein the thermoelectric generator is configured to charge the battery based on a temperature difference between the first element and the second element.

7. The temperature sensing device of claim 1, further comprising:
   a gauge backing including a hole formed therein, wherein the needle is configured to indicate the temperature on the gauge backing;
   a battery positioned within the housing and configured to provide power to the motor; and
   at least one photovoltaic cell mounted in the housing beneath the gauge backing and configured to charge the battery via exposure to the sun, wherein the hole exposes the at least one photovoltaic cell to an exterior of the housing.

8. The temperature sensing device of claim 1, further comprising a memory inside the housing that is configured to buffer data indicating a plurality of previously measured temperatures of the cooking chamber.

9. The temperature sensing device of claim 1, further comprising:
   an antenna configured to wirelessly communicate with an electronic device external to the temperature sensing device; and
   a memory located in the housing that is configured to store one or more cooking parameters that are wirelessly received from the electronic device external to the temperature sensing device via the antenna.

10. The temperature sensing device of claim 1, further comprising a temperature measurement probe configured to extend into the cooking chamber and including the temperature sensor, wherein at least part of the temperature measurement probe serves as an interior cooking chamber antenna that is configured to receive data wirelessly from at least one food thermometer inside the cooking chamber.

11. The temperature sensing device of claim 10, further comprising:
   an antenna configured to wirelessly communicate with an electronic device external to the temperature sensing device; and
   control circuitry located in the housing that is configured to:
   receive via the antenna one or more cooking parameters from the electronic device external to the temperature sensing device; and
   send the received one or more cooking parameters to the at least one food thermometer inside the cooking chamber using the temperature measurement probe.

12. The temperature sensing device of claim 1, further comprising control circuitry located in the housing that is configured to:
   determine that the measured temperature of the cooking chamber has fallen below a low temperature threshold; and
   power off at least a portion of the control circuitry in response to determining that the measured temperature has fallen below the low temperature threshold.

13. The temperature sensing device of claim 1, further comprising: a battery configured to provide power to the motor;
a tilt sensor; and
control circuitry configured to:
determine that an orientation of a lid or door of the cooking appliance is in an open position based on an input received from the tilt sensor; and
power on at least a portion of the control circuitry in response to determining that the orientation of the lid or door is in the open position.

14. The temperature sensing device of claim 1, further comprising: a battery configured to provide power to the motor; and
control circuitry configured to power on at least a portion of the control circuitry based on the temperature of the cooking chamber measured by the temperature sensor.

15. The temperature sensing device of claim 1, further comprising:
an antenna for wirelessly communicating with an electronic device external to the temperature sensing device; and
control circuitry located in the housing that is configured to:
determine whether the measured temperature of the cooking chamber is greater than a maximum temperature setting or less than a minimum temperature setting; and
send an indication of an alert to the external electronic device using the antenna in response to determining that the measured temperature of the cooking chamber is greater than the maximum temperature setting or less than the minimum temperature setting.

16. The temperature sensing device of claim 15, further comprising: a tilt sensor; and
wherein the control circuitry is further configured to:
determine that an orientation of a lid or door of the cooking appliance is in an open position based on an input from the tilt sensor; and
disable activation of a low temperature alert indicating that the measured temperature of the cooking chamber is less than the minimum temperature setting in response to determining that the orientation of the lid or door is in the open position.

17. The temperature sensing device of claim 1, further comprising control circuitry located in the housing that is configured to identify a low fuel condition for heating the cooking chamber by comparing a plurality of temperatures of the cooking chamber measured by the temperature sensor at different times.

18. The temperature sensing device of claim 1, further comprising a memory located in the housing that is configured to store at least one of a maximum temperature setting and a minimum temperature setting.

19. The temperature sensing device of claim 1, further comprising:
an antenna for wirelessly communicating with an electronic device external to the temperature sensing device; and
control circuitry in the housing that is configured to send the measured temperature of the cooking chamber to the external electronic device via the antenna.

20. The temperature sensing device of claim 1, further comprising:
a wireless signal repeater configured to transmit signals through a wall of the cooking appliance, the wireless signal repeater comprising:
an interior antenna configured to be located in the cooking chamber of the cooking appliance at a location chosen from among an interior of the wall of the cooking appliance and in a probe for the temperature sensor, the probe extending from the housing into the cooking chamber; an exterior antenna configured to be located outside the cooking appliance;
a battery located in the housing for powering at least one of the interior antenna and the exterior antenna; and
an insulating layer located outside an interior wall of the housing.

21. The wireless signal repeater of claim 20, wherein the insulating layer includes a vacuum space, an air gap, an aerogel material, a mineral wool material, or a polyurethane foam.

22. The wireless signal repeater of claim 20, further comprising a phase change material located between the battery and an exterior surface of the cooking appliance, wherein the phase change material is configured to store heat from the cooking appliance.

23. The wireless signal repeater of claim 20, wherein the interior wall includes a heat reflective surface facing an exterior surface of the cooking appliance.

24. The wireless signal repeater of claim 20, wherein the interior antenna is located in a temperature measurement probe that extends into the cooking chamber and includes a temperature sensor configured to measure a temperature of the cooking chamber.

25. The wireless signal repeater of claim 20, further comprising control circuitry located in the housing that is configured to:
receive via the interior antenna a wireless signal from a wireless food thermometer inside the cooking chamber; and
retransmit the received wireless signal to an electronic device outside the cooking appliance using the exterior antenna.

26. The wireless signal repeater of claim 25, wherein the electronic device outside the cooking appliance retransmits the wireless signal to another electronic device outside the cooking appliance.

27. The wireless signal repeater of claim 20, further comprising control circuitry located in the housing that is configured to:
receive via the exterior antenna a wireless signal indicating one or more cooking parameters sent from an electronic device external to the cooking appliance; and
retransmit the received wireless signal to at least one wireless food thermometer inside the cooking chamber using the interior antenna.

28. A temperature sensing device for use with a cooking appliance, the temperature sensing device comprising:
a temperature sensor configured to measure a temperature of a cooking chamber of the cooking appliance;
a housing configured to be mounted on the cooking appliance;
a temperature gauge including a needle configured to indicate the measured temperature of the cooking chamber;
a motor inside the housing and configured to actuate the needle of the temperature gauge;
a battery configured to provide power to the motor; and
a thermoelectric generator including a first element with at least a portion thereof adjacent to or inside the cooking chamber and a second element outside the cooking chamber, wherein the thermoelectric generator is configured to charge the battery based on a temperature difference between the first element and the second element.

* * * * *